US007409976B2

(12) United States Patent
Chevalier et al.

(10) Patent No.: US 7,409,976 B2
(45) Date of Patent: Aug. 12, 2008

(54) METHOD AND DEVICE FOR THE EFFICIENT USE OF LONG-ACTING ADHESIVE IN THE FACTORY AND DURING PERSONAL USE

(75) Inventors: Pierre André Marc Chevalier, deceased, late of Villennes sur Seine (FR); by Simone Chevalier, legal representative, Boulogne Billancourt (FR); Gilbert Eugène Veniard, Paris (FR); Patrick André Martial Chevalier, Villennes sur Seine (FR)

(73) Assignee: Valco Cincinnati, Inc., Cincinnati, OH (US)

( * ) Notice: Subject to any disclaimer, the term of this patent is extended or adjusted under 35 U.S.C. 154(b) by 363 days.

(21) Appl. No.: 10/505,530

(22) PCT Filed: Feb. 19, 2003

(86) PCT No.: PCT/FR03/00551

§ 371 (c)(1),
(2), (4) Date: May 25, 2005

(87) PCT Pub. No.: WO03/078078

PCT Pub. Date: Sep. 25, 2003

(65) Prior Publication Data

US 2006/0049065 A1 Mar. 9, 2006

(30) Foreign Application Priority Data

Feb. 20, 2002 (FR) .................................. 02 02136

(51) Int. Cl.
*B32B 41/00* (2006.01)

(52) U.S. Cl. ....................... 156/356; 156/358; 156/510; 156/529; 156/548; 156/549

(58) Field of Classification Search ................. 156/356, 156/358, 498, 510, 529, 548, 549, 578
See application file for complete search history.

(56) References Cited

U.S. PATENT DOCUMENTS

| | | | |
|---|---|---|---|
| 1,546,725 | A | 7/1925 | Gaylord |
| 5,375,722 | A | 12/1994 | Santefort et al. |
| 5,443,678 | A | 8/1995 | Chevalier |
| 5,882,470 | A | 3/1999 | Scheller et al. |
| 2001/0022319 | A1 | 9/2001 | Chavalier |

FOREIGN PATENT DOCUMENTS

| | | |
|---|---|---|
| WO | WO 9100216 | 1/1991 |

*Primary Examiner*—George R Koch, III
(74) *Attorney, Agent, or Firm*—Dinsmore & Shohl LLP

(57) ABSTRACT

The invention relates to a method of producing a product comprising a support having a long-acting adhesive and a protective tape disposed thereon, so that said adhesive can be used at a later time. The inventive method is characterised in that it consists in: determining a reference plane (P) which is close to the location of the adhesive deposit and which is either below the plane containing the lower face of the support or above the plane containing the upper face of said support; establishing the distance (D) separating the reference plane (P) and the level (N) at which the adhesive (2) is delivered, which is close to the plane containing the application face of the support; delivering the long-acting adhesive (2); delivering a protective tape (20) which is disposed on top of the adhesive (2) either simultaneously using a prefabricated transfer tape or separately; moving the support in relation to the deposit station; exerting a transverse force on the support such that one of the faces thereof is applied continuously against the reference plane (P); and exerting a pressure, counter to the transverse force, on the protective tape (20) and the adhesive (2).

59 Claims, 20 Drawing Sheets

Fig.24
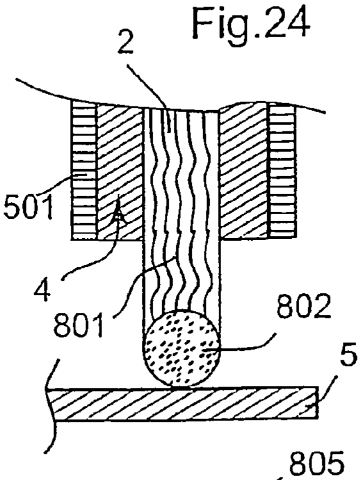
Fig.25
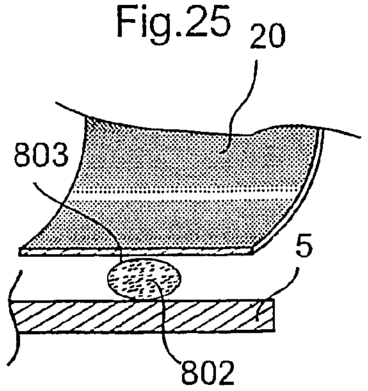
Fig.26
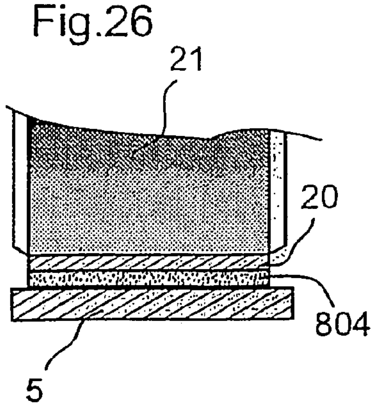
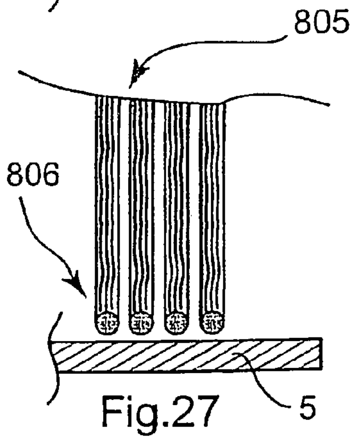
Fig.27
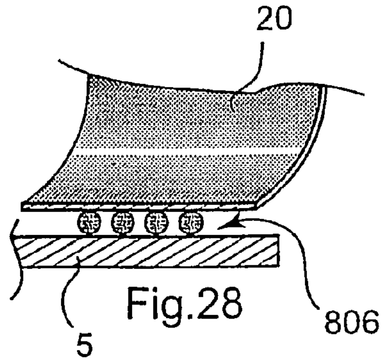
Fig.28
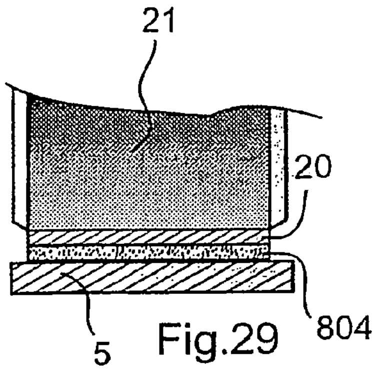
Fig.29
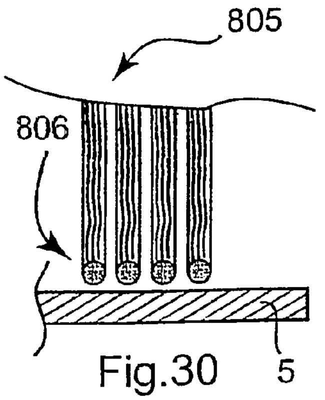
Fig.30
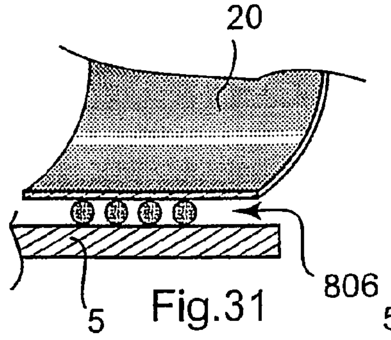
Fig.31
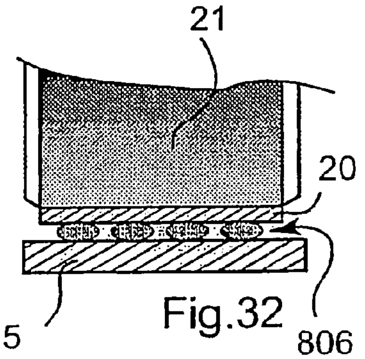
Fig.32
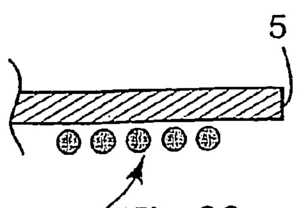
Fig.33
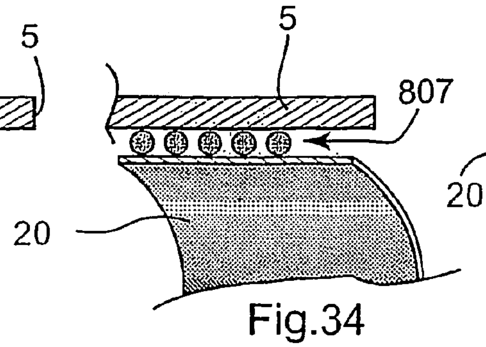
Fig.34
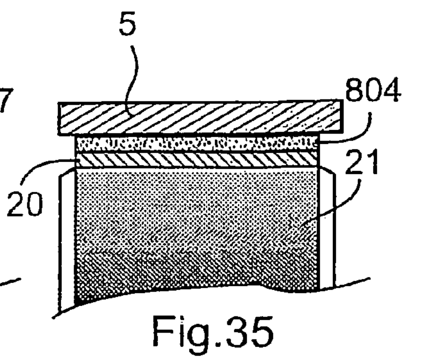
Fig.35

21
21a
21b
21c
21d
E1
301
5
20
2
6
10
x

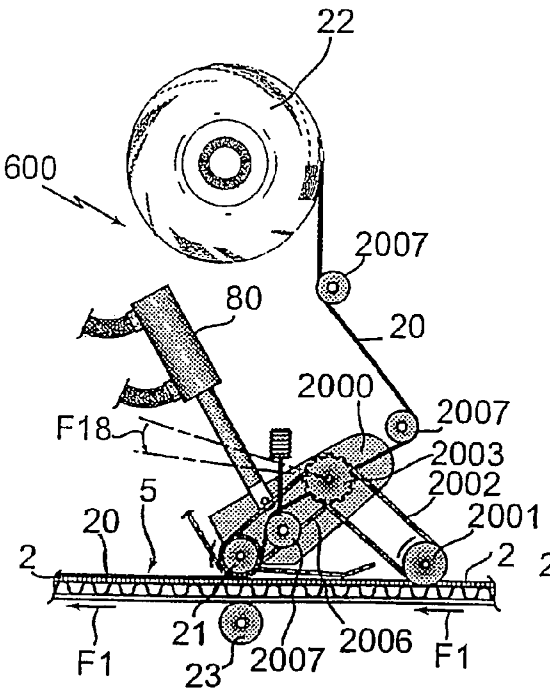
Fig.60
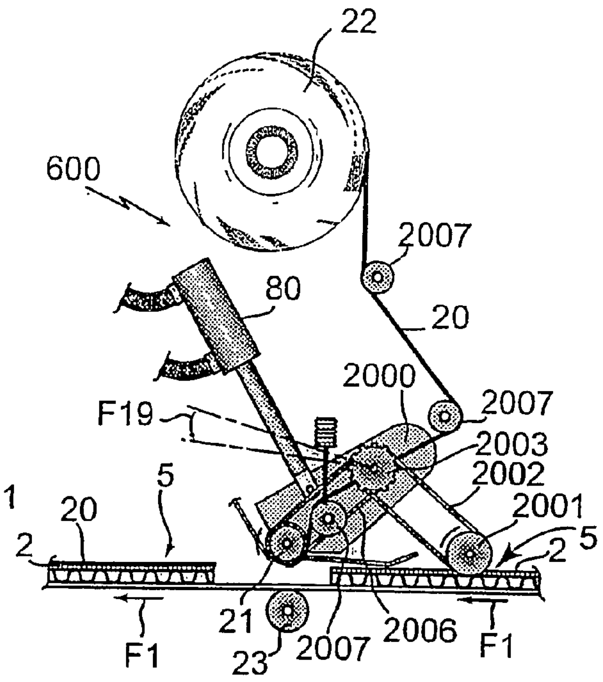
Fig.61
Fig.62
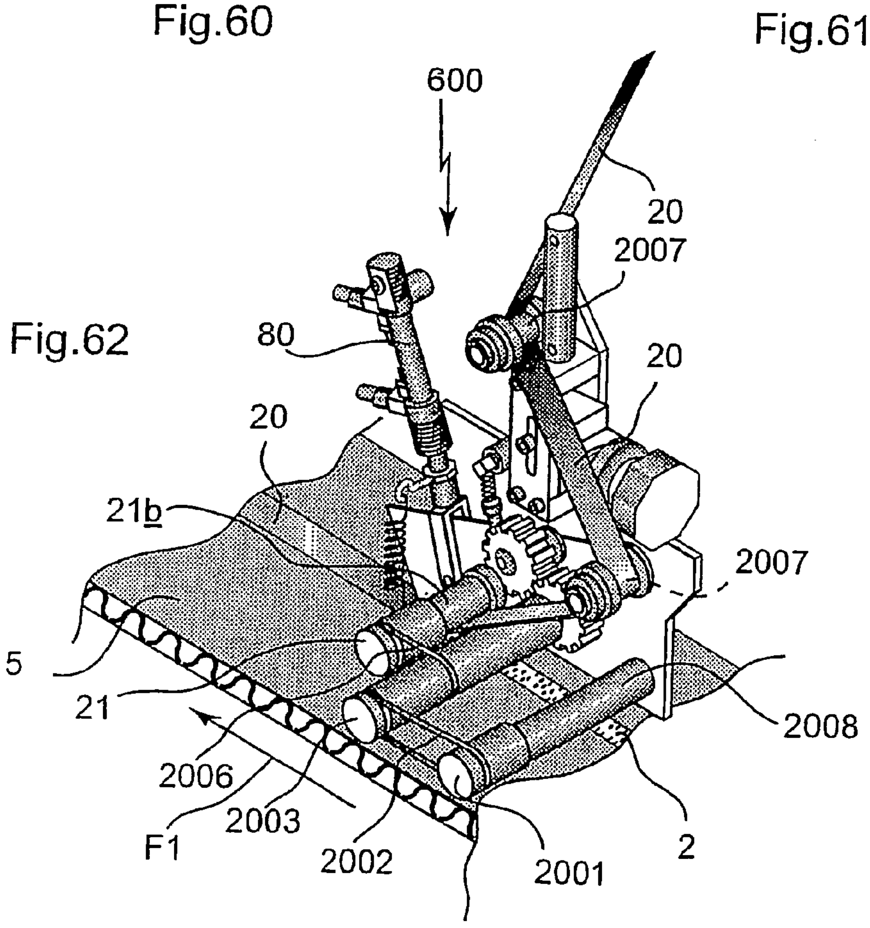

METHOD AND DEVICE FOR THE EFFICIENT USE OF LONG-ACTING ADHESIVE IN THE FACTORY AND DURING PERSONAL USE

This application is a 371 of PCT/FR03/00551, filed Feb. 19, 2003.

The present invention relates to the application of long-acting adhesive to products made of compact cardboard, corrugated cardboard or similar material.

In the following description, reference will essentially be made to cardboard (compact or corrugated), but solely for reasons of simplicity, the invention in no way being limited only to this material.

Likewise, with reference to most current adhesives, it is noted that they are often used by heating so as to make them malleable, but it must be understood that the important thing is to apply a long-acting adhesive, whether it be applied hot or not. There are known, for example, long-acting adhesives of the mastic type which extrude very well cold and which adhere to the supports to which they are applied, by virtue of a pressure that is exerted on them, the invention thus relating to any adhesive that is sufficiently malleable to be applied hot or cold.

Adhesives have reached an excellent degree of efficiency and they are generally tending to replace other means of assembly.

The invention applies in particular to the manufacture of panels and preforms intended to create containers designed for dispatch by post or by parcel service, but also relates to any type of application which requires the presence of an adhesive that is to be used a long time after it has been applied.

It is known that only an adhesive makes it possible to join two elements such that they are inviolable, in particular to close and keep the volume of a container obtained by folding a previously cut and grooved preform.

This is particularly the case for containers delivered flat in the form of preforms that are sometimes partially preassembled, and which users use one by one (and of course manually) to place therein articles that are to be dispatched. Following closure, it is necessary to avoid accidental opening of the container during handling and transport thereof.

A closure known as a "security closure" must be very strong to withstand a maximum force but, with respect to cardboard, it is obvious that the material in itself is not robust enough to prevent fraudulent or simply accidental access. In reality, it is necessary that any abnormal opening, carried out without the permission of the addressee, should be visible.

The general problem of fixing by means of an adhesive can be divided into two families: immediate bonding using glue and delayed fixing using an adhesive.

The present invention does not relate to gluing but rather to the second family which groups together all the cases where it is necessary firstly to deposit a long-acting adhesive (and not a glue) on a part, or element, of a support, then to store the support coated with adhesive, which is not to be used until later, sometimes a very long time following application, to join this first element to a second element, which is often another part of the same product: cardboard sheet, panel or preform for example.

The place where the adhesive is deposited in the factory is known as the "application surface" and the place where a second element is to be brought into contact with said adhesive is known as the "destination surface", this latter operation usually consisting in closing a container, such as a box, for the purpose of sending articles placed in said container by post or parcel service.

This closing operation takes place after all types of events have taken place: printing, shaping, storage, packaging, transport, delivery, storage again, removal from storage when required, various handling operations, etc.

The technique of immediate gluing has become relatively simple since, ultimately, it is now reduced to selecting a family of glues and, where necessary, adapting the selected glue to the problem posed, by adjusting its composition and/or its setting time, since two elements are fixed at the same time and there is no longer any need to distinguish between an application surface and a destination surface since their mutual gluing is simultaneous.

By contrast, delayed use of adhesive is much more complex since highly varied requirements have to be met, these stemming from the existence of three separate situations instead of just one:

- deposition of adhesive at high speed, in the factory, onto the application surface of a given support,
- resistance of the adhesive to slow ageing and to physico-chemical and mechanical stresses,
- instantaneous efficacy of said adhesive on the destination surface, even a long time after initial deposition on the application surface.

In this case, it is thus necessary to distinguish between two operations which are very different even though they concern the same adhesive: adhesion to the application surface then adhesion to the destination surface, the whole having to effectively secure two separate elements. The solutions which currently exist are not entirely satisfactory in all fields of application.

For example, it is quite easy to deposit long-acting adhesives (or "delayed-action" adhesives) on supports formed of materials that have an even surface and/or excellent planarity.

This is the case in respect of the paper used to produce envelopes in particular, since during deposition of the adhesive the paper is placed on a rigid and flat bearing structure, such as a steel plate, so that its thinness allows it to adapt to this bearing structure and take on the characteristics thereof. Ultimately, if the paper is correctly guided and held, it behaves as though it were itself rigid and hard.

This is also the case in respect of materials which naturally offer these characteristics: compact cardboard, glass, synthetic materials and smooth metals.

Assuming that the adhesive is securely associated with the support, the subsequent fixing to the destination surface is still not ensured since it is still necessary that the qualities of the adhesive are retained over time and that there is a compatible destination surface. Here again, the case of a sheet of paper is relatively simple since, because it is both thin and flexible, the destination surface will join perfectly with the adhesive.

In these favorable cases, the only problem to be solved is that of masking the adhesive so that it does not accidentally adhere to other objects and so as to protect it against collecting dust and against ageing (drying, oxidation, etc.).

The solution adopted consists in placing on the adhesive, which has already been applied, a protective tape which is associated with silicones so that it adheres very little to the adhesive, this protective tape being removed only at the time of final use, that is to say when it is desired to apply the unmasked adhesive to the destination surface, so that the latter is joined to the application surface, in particular so as to keep fixed together two parts of one and the same preform forming a container such as a box for dispatching articles by post or parcel service.

On the other hand, long-acting adhesives are poorly suited to materials which are not thin.

In order to attempt to solve the problem of rapid deposition of adhesive on an uneven application surface, use is made of "transfer tapes" which comprise a thick and flexible plastic film, or "core" or "base", one face of which is coated with a first adhesive for the purpose of fixing it to the application surface and the other face of which is coated with a second adhesive suitable for fixing the assembly to the destination surface, and covered with a removable protective tape, the base being assumed to be flexible enough to compensate for the irregularities of the support.

Experience shows that the fixing of this transfer tape to the application surface is satisfactory but that, by contrast, the fixing of the assembly to the destination surface is problematic, or even ineffective, while a transfer tape of this type is expensive.

One characteristic example of a material that is poorly suited to the use of long-acting adhesive is corrugated cardboard, and it is the latter which is used here to explain the invention, although said invention has many other applications on various materials: wood, compact cardboard, synthetic materials, metals, etc.

In practice, the sheet of corrugated cardboard most frequently encountered has two so-called "flat" faces, each formed by a sheet of paper and placed on either side of a core having corrugations, or grooves, these three parts being secured by glue so as to make an assembly that cannot be dissociated. However, when looking carefully at these faces, it is possible to see, even with the naked eye, fairly pronounced depressions at the hollow grooves, which constitute irregularities that are extremely unfavorable to the use of long-acting adhesive.

The difficulty is relatively small during application in the factory because an attempt is made to combine the best conditions for application to products that are new, clean and free of dust for example; however, the difficulty increases considerably when fixing to the destination surface, for two separate reasons:

- the destination surface might have been damaged or soiled, thus offering mediocre adhesion power, due to the fact that the support is transported, stored and left to wait for long periods possibly of up to several months, under variable conditions in terms of temperature, hygrometry and purity of the atmosphere, and is often handled without care;
- removal of the protective tape and application of the unmasked adhesive to the destination surface may be carried out incorrectly by a person who is more or less dexterous and attentive and/or exerts a manual pressure that is too low to ensure a strong connection to the destination surface.

Knowing the difficulties which stem from the irregularities of corrugated cardboard, an attempt has been made to remedy these by subjecting the original paper and/or the corrugated cardboard as a whole to treatments of all kinds aimed at giving the final object a nice appearance and high rigidity, both synonymous with high quality.

Unfortunately, the corollary of these treatments has been to make ineffective the application of adhesive in the factory and above all the subsequent fixing of said adhesive to the destination surface.

This is because the nice appearance requires a very white and shiny surface, and therefore recourse is had to a surface application or coating containing for example kaolin or titanium, or forming a varnish, or to the application of printing ink etc., and moreover to the presence of manufacturing marks which can be detected only under ultraviolet light, these having to be protected by a type of paint.

All these coatings have a barrier effect which consequently fully covers and dissimulates the fibers of the original cardboard, whereas these naturally have an excellent adhesive retention power because of the fact that they give the product a porosity which is favorable to the attachment of the adhesive by partial penetration into the porous mass. Smooth and continuous coatings, on the other hand, make the product impermeable.

The problem is further aggravated by the concern for quality which forces the professionals to choose a high quality corrugated cardboard, manufactured for example with pure Kraft paper with long fibers or reinforced with a strong glue binder, and which is already in itself an obstacle to the use of adhesive for two different reasons:

- the adhesive does not penetrate into the fibers and attaches poorly,
- the user carrying out fixing to the destination surface presses on a thick, rigid and resistant support, reminiscent of a material such as wood, so that even by exerting a sufficient pressure on the upper face, this pressure is only partially transmitted to the lower face of said support.

This leads it to be explained that experience has shown that effective fixing to the destination surface depends on the flexibility of the support since, by pressing on one face of this relatively soft material, the pressure is easily transmitted to the opposite face and forces this support to fit into all the surface irregularities, thus causing an intimate bonding of the adhesive to the miniscule reliefs and hollows of the support.

Overall, there is thus a contradiction in that the support should be rigid for the adhesive and soft for the closing pressure.

Moreover, one may be led, depending on the specific desired resistance, to give a sheet of corrugated cardboard a complex structure: two corrugated cores and three flat faces, namely two outer faces and one inner face separating the two corrugated cores, for example, which further complicates the use of long-acting adhesive.

In order to simplify the description of the present invention, the present text will content itself with the case where the sheet of corrugated cardboard has just one corrugated core and two so-called "flat" faces.

Following application of the adhesive in the factory, the support+adhesive+protective tape assembly is stored, transported, stored again, handled and then distributed, until actual use of the adhesive which is unmasked at the last minute, which use is delayed over time with respect to the moment at which the adhesive was applied to the application surface of the support.

In general, the sheet of corrugated cardboard forms a constituent part of a preform that is to form a container.

It is thus at the moment of closing the container that the adhesive is required to join two of the constituent parts thereof, one bearing the application surface provided with the adhesive covered with the protective tape and the other bearing the bare destination surface. To do this, one end of the protective tape is lifted, this detaching more easily from the adhesive than it does from the application surface. Thus, the protective tape can be easily removed to unmask the adhesive in its entirety, the latter remaining secured to the application surface.

On its face that has been unmasked by removing the protective tape, the adhesive is to have retained its adhesive power so as to allow the first element of the support to be fixed to another element of the same support by means of simple contact. Thus, the two elements are fixed by applying the element bearing the adhesive to an element which does not comprise adhesive. However, a transfer tape is quite expensive, both in terms of its manufacture and in terms of its placement, and thus this is a solution that must be rejected if the final product, incorporating the corrugated cardboard support, the adhesive and the protective tape, is to be inexpensive.

The surface irregularities of the corrugated cardboard are sometimes not very visible to the naked eye and are barely sensitive to touch; nevertheless, they do still exist and greatly impede the use of adhesive.

This characteristic of corrugated cardboard of having irregularities is moreover well known to the person skilled in the art since it is not possible to determine the thickness of a sheet of corrugated cardboard using a simple apparatus: it is necessary for the parts in contact with the two faces of the sheet whose thickness is to be measured to have a relatively large surface area so as to compensate for the irregularities mentioned here.

For example, French standard NF Q 03-030 specifies that the parts of the apparatus ("keys") in contact with the sheet must each be ten square centimeters (10 $cm^2$).

In "LE COLLAGE INDUSTRIEL [INDUSTRIAL BONDING]" by Phillipe Cognard and Francoise Pardos, Editions de l'Usine Nouvelle, Paris, page 12, it is stated:

"Actual Contact Surface

Contact between the two surfaces of two solids occurs only at a few points in microscopic terms. If we assume the case of a liquid wetting a solid, there will be microscopic air bubbles which will prevent contact. Therefore, in both cases, the actual contact is less than the proposed contact and the actual resistance will thus be much less that the theoretical maximum resistance.

Surface Defects

Given an equal contact surface, an actual surface will provide an adhesion force value that is lower than that which would be provided by an ideal regular surface. This results from the existence of numerous defects in actual surfaces".

In order to make a sheet of corrugated cardboard self-adhesive, it is thus necessary first of all for it to have a surface that is as even as possible and for the tape used to itself be of very good quality, these factors being incompatible with a low cost price.

Even with sheets of corrugated cardboard that are manufactured with papers of high quality, a satisfactory result is not always achieved, even when using transfer tapes with a central base.

A good quality adhesive should attach to the cardboard in a sufficiently strong manner, in particular by impregnating the surface thereof, so that removing it even carefully causes an irreparable and obvious tear, in particular by tearing fibers that form the support. Moreover, for reasons of economy but also for ease of application, it is good if the adhesive is present in a small quantity.

Mass production of products made of cardboard, strips, panels or preforms, requires that the adhesive be applied at rates of travel of more than one hundred meters per minute.

When applying the liquid adhesive and a protective tape that covers all the adhesive to one another and virtually at the same time, the application surface on a machine is particularly critical because of the extremely dangerous consequences of the slightest deposition accident, whether this be of the adhesive itself or of the protective tape.

When the adhesive and the protective tape are applied continuously, that is to say when there is just one support which is of great length, or else when the support is formed of successive panels but the protective tape is not cut between the panels, it is enough to start once and for all the fixing of the protective tape at the start of the first panel, so that said protective tape is fixed securely enough to the support that the latter can be displaced at great speed while drawing the tape that is stored in reels and unwinds freely on account of this traction.

On the other hand, when the adhesive and tape are deposited sequentially, that is to say when between each panel the distribution of adhesive is stopped and the tape is cut, the restarting of deposition a fraction of a second later on the next panel once again requires a small amount of time which is prejudicial to the desired rate. If the speed is increased, there is a risk of a mistake consisting in having applied adhesive but no protective tape, which may lead to a very serious incident since without protection the adhesive may adhere to the parts of the machine and/or to other adjacent panels, and to avoid this the machine would have to be stopped and thus production would have to be interrupted.

The following documents may be mentioned by way of prior art:

U.S. Pat. No. 4,102,301, which relates exclusively to a coating method and discloses a solution for manufacturing by this method either barrier-effect films for packaging salt meats, hams, etc. or adhesive tapes for stationary.

The method consists in covering the entire surface of the support that is to be coated and, to this end, there are firstly a number of strips of the coating product and then, using a roller common to all the strips, they are spread so that they meet and form a complete and continuous coating over the entire surface of the support.

The support that is to be coated does not comprise any irregularities, quite the contrary since it is a thin extruded sheath made of flattened synthetic material.

FR-A-2 331 386, which describes an automatic machine for depositing adhesive drops onto earthenware tiles and crushing them by means of a press-plate, a slightly adhesive sheet being inserted between the drops and the press-plate.

The solution described does not allude either to the existence of irregularities of the support or to the fibrous nature of this support or to the use of a flowing adhesive or to the creation of a continuous bead or to the rolling of this bead in order to level out irregularities in the support.

U.S. Pat. No. 3,401,608, which describes a method for applying inexpensive glue, such as dextrin, to a support that is fibrous but covered with a product unfavorable to gluing, which consists in scratching the coating in order to make the fibers appear and in applying the glue directly to these fibers. This therefore relates exclusively to the deposition of glue, since two parts are fixed at the same time and this gluing carried out in the factory moreover provides for the immediate pressing of the two parts one against the other, with the glue setting within a very short time. There is no application surface and destination surface, nor is there long-acting adhesive made to act in two steps separated by a long period of time.

With long-acting adhesive, it is virtually impossible to leave bare fibers exposed for a long period of time since, besides the fact that this would give the product a mediocre appearance, baring of the fibers by scratching makes them hirsute and, at this point of dislocation, a long-acting adhesive would not be able to adhere strongly to them any more so than an adhesive tape could adhere to carpet for example.

U.S. Pat. No. 2,996,238, which is similar to the previous document and relates to thin paper bags manufactured by longitudinally folding a thin sheet that is folded longitudinally and the margins of which are superposed and fixed to one another so as to form a sheath which is closed on itself. This closure is effected by gluing and, since the lower face of the sheet is applied to the upper face, the two faces have to be compatible with the glue used immediately thereafter. The face which is to form the interior of the bag is treated depending on the products that are to be placed in the bag, this surface treatment not being very compatible with the creation of the sheath by longitudinal gluing.

In this case, therefore, again there is no application face and destination face between which the long-acting adhesive is to be located once it has been applied only to the application face (generally hot in liquid form) and then has to be applied cold, months later, by a user.

U.S. Pat. No. 1,546,725, which also relates to the manufacture of articles on a machine from materials whose surface has previously been coated with a product that is incompatible with the glue used. In this case, this is essentially paraffin which is removed from the zones by means of which the material is glued to form a box. The two flaps from which the paraffin has been removed are fixed to one another immediately after scratching, using the same glue and at the same time, so that once again there is no distinction between the application surface and the destination surface.

U.S. Pat. No. 1,602,597, which is similar to the previous documents and claim 2 of which is particularly clear with regard to the simultaneous nature of the gluing of the two cleaned parts, on the same machine.

This proves the major importance and specificity of the long-acting adhesive which is used in two steps, the present invention relating overall to the problem of the strength of the long-acting adhesive so as to obtain a secure fixing between two separate parts, and thus deals with this problem both upon application of the adhesive in the factory and the subsequent application of the same adhesive once it has been stored and unmasked by removing the protective tape.

The present invention overcomes all the abovementioned drawbacks and makes it possible to obtain supports: sheets or panels made of any material, provided with a long-acting adhesive for the purpose of delayed use of this adhesive, and to do so regardless of the quality of the supports, the regularity or irregularity of the surfaces present, the existence or absence of a surface coating, the thinness or thickness of the materials used.

This is because the aim of the products provided with a long-acting adhesive is to be easily used by non-professional people who have neither knowledge nor experience nor suitable practical means for efficient use of the adhesive.

It is this single aim which is proposed by the present invention, knowing that achievement of this result complies with industrial means used in the manufacture in the factory of the products in question, since it has been noted that the quality of the final result depends on the precision of the manufacturing machine and on the control of a number of parameters, all this working towards this single aim.

To this end, the subject of the invention is a method for manufacturing a product consisting of a support on which there is a long-acting adhesive and a protective tape for delayed use of said adhesive, for joining by means of said adhesive two elements of the support, one of which bears a surface known as the “application” surface and the other of which bears a surface known as the “destination” surface, which method consists in bringing about a relative movement between said support and a station for the coordinated deposition of an adhesive and of a removable protective tape, preferably by moving the support and not the deposition station, then in applying to the application surface, from the deposition station, a long-acting adhesive either in the form of a prefabricated assembly comprising a base, long-acting adhesive and a removable protective tape, or in the form of two successive applications of an adhesive alone and then of a removable protective tape alone, characterized in that:

a reference plane is determined near the spot where the adhesive is deposited, said reference plane being situated either below the plane in which the lower face of a support is to be located or above the plane in which the upper face of said support is to be located, a distance is established which separates the reference plane and the level at which an adhesive is delivered, said level being situated near the plane in which the application face of the support is to be located, long-acting adhesive is delivered, a protective tape which is superposed on the adhesive is delivered, either simultaneously using a prefabricated transfer tape or separately, the relative movement is brought about between the support and the deposition station, a transverse force is exerted on the support so that one of its faces is constantly pressed against the reference plane, a pressure counter to the transverse force is exerted on the protective tape and the adhesive, which are superposed.

According to other features of this method:

the reference plane is arranged on one side of the support and a pressure is exerted against the face of said support that is opposite the first;

the support being a continuous strip of indefinite length that is made to move and stretched in a plane, a pressure is exerted on the strip, transversely to the latter, by means of the reference plane itself, so that the tension of the strip has the reactive effect of pressing said strip firmly against said reference plane;

the destination surface, at least, being insufficiently able to retain the long-acting adhesive during use of the adhesive, that is to say when the two elements that are to be joined are brought together, in particular by rapid application and under a moderate manual pressure, on account of the internal structure of the support or else on account of an earlier surface treatment of the support, such as a surface application and/or coating having an effect that inhibits adhesion of the adhesive, said destination surface is made to undergo, before it receives the adhesive previously applied to the application surface by the two elements that are to be joined being brought together, a physical, mechanical and/or chemical treatment capable of improving the adhesion, either by annihilation, neutralization or attenuation of a rejection effect, or by applying a corrective product that is able both to fix to the destination surface and to retain the adhesive, or else by mechanical action having the effect of reducing the handling requirements during use of the adhesive;

the destination surface being made of paper, it is made to undergo a treatment either during manufacture of the paper or after manufacture;

the destination surface being made of corrugated cardboard produced from sheets of paper that have been wound into reels, treated and assembled, at least one of the sheets of paper is made to undergo the treatment during production of the corrugated cardboard;

the destination surface being made of corrugated cardboard produced from sheets of paper that have been wound into reels, treated and assembled, at least one of the sheets of paper situated on the outside of the corrugated cardboard is made to undergo the treatment following production of the corrugated cardboard;

at least part of the surface layer borne by the destination surface is removed without dissociating the original fibers of the support, by gentle rubbing and possibly suction of the waste removed;

the corrective product is a product for binding between the adhesive and the destination surface;

the destination surface having a coating product such as kaolin, a corrective product is applied thereto which is able to pass through the coating product and fix directly to the support;

the corrective product is water-based glue;

the destination surface having a soluble coating product, a solvent is applied thereto which is able to remove at least part of said coating product;

the solvent is an acid such as acetic acid;

the support and/or the protective tape is/are subjected to a heat treatment;

the support and/or the protective tape is/are subjected to an electric treatment;

the support and/or the protective tape is/are made to pass between electrodes which generate a high-frequency electric field;

the protective tape having to receive a print preceded by a high-frequency treatment, this print is made on the face of the protective tape that is intended to be applied against the adhesive, and the application surface, that is to say the reverse, of the protective tape then has to be transparent so as to allow the print to appear on the other face, by transparency;

the support being made of a relatively rigid material, a pressure counter to the transverse force is exerted on the element bearing the application surface so as to obtain a softening of this element which thus becomes more flexible than at the start;

the pressure counter to the transverse force affects a strip which is located at the adhesive and the width of which is slightly greater than that which said adhesive is to have after it has been applied and spread by pressure;

the two elements that are to be joined by the long-acting adhesive are flaps made of corrugated cardboard, that is to say comprising grooves sandwiched between two outer sheets, and which are to be brought together by folding one onto the other along fold lines, and a pressure transverse to the plane is exerted on the flap that is to be located on top of the other one, said pressure being sufficient to crush the grooves and thus make said top flap more flexible;

the pressure counter to the transverse force is calibrated so as to be greater than the elastic resistance of the material forming the support;

the material forming the support having a honeycomb inner structure, as is the case in respect of corrugated cardboard, the grooves of which create longitudinal cells, the pressure is calibrated so as to be sufficient to break the walls of the cells forming spacers between two opposite faces of the support but insufficient to suppress any perpendicular elasticity of said faces;

for the purpose of separately applying malleable adhesive and a protective tape to a support, firstly the integrity of the support, secondly the actual presence of adhesive on the support and thirdly the effective presence of protective tape on top of the adhesive are checked, and also the arrival of said adhesive, and if an incident is discovered, that is to say the presence of adhesive, a break in integrity of the support and/or the absence of the protective tape, the adhesive is acted upon so as to make it inoperative, either by neutralizing it or by removing it;

as soon as an incident occurs, there is placed on the support, at the spot where the adhesive is normally located, a material element which neutralizes the effects of said adhesive, regardless of whether the adhesive is already present on the support when the incident occurs or whether it is continuing to arrive on the support after said incident has occurred;

the material element which is placed on the support is a tape;

the material element which is placed on the support is a chemical product;

the chemical product is applied by spraying;

the chemical product is an anti-adhesive of the silicone type and is applied in an amount sufficient to cover at least the entirety of the application zone which bears adhesive;

as soon as an incident occurs, the adhesive which has already been applied is removed and the arrival of new adhesive on the support is prevented by turning the latter away from its normal course of application;

as soon as an incident occurs, the support is sacrificed by cutting it near the adhesive that is to be neutralized and by removing the cut part which bears the adhesive;

the adhesive having been deposited near a free edge of the support, a single cut is made parallel to said edge and the margin bearing the adhesive, determined by the free edge and the cut, is removed;

the adhesive having been deposited relatively far from a free edge of the support, two parallel cuts are made on either side of the part of the support which bears the adhesive and the strip thus created between the two cuts is removed;

the cut part is removed by sucking it from its end and thus guiding it to a temporary storage area;

for the purpose of separately applying malleable adhesive and a protective tape to a moving support from a deposition station, comprising:

on the one hand a distributor of adhesive (2), said distributor having one or more distribution orifices, on the other hand a distributor of protective tape, said distributor having:

at least one structure for a reel of protective tape wound in a spiral and having a free strand, means for unwinding and guiding the free strand, a mechanism for applying said protective tape, characterized in that during the operations of applying the bead of adhesive, the free strand of the protective tape is positively driven so that its linear speed just prior to coming alongside the bead of adhesive already deposited on the support is equal to the linear speed of the support with respect to the deposition station, and in that the bead of malleable adhesive and the protective tape are calendered together against the support so as to at least partially laterally spread the bead of malleable adhesive located between the support and the protective tape so that the face of said bead of adhesive that is located against the protective tape forms into a single plane extending above the highest point of the application surface on which the bead of adhesive is applied;

in order that the linear speed of the protective tape is equal to that of the support, the protective tape is driven by a kinematic mechanism that is synchronized with the moving support;

the protective tape and the support are secured by fixing them to one another;

the protective tape and the support are temporarily secured, without fixing them to one another;

the protective tape is pinched either by its central zone or by at least one of its side margins;

the protective tape and the support are secured by temporarily pressing them against one another;

the pressure is exerted only on the protective tape, that is to say outside the zone where the bead of adhesive is located between said protective tape and the support;

the pressure is also exerted at the zone where the bead of adhesive is located;

the protective tape and the support are secured directly, and not only by way of the adhesive located between them;

since the support consists of separate panels and the adhesive is deposited in successive segments of bead over a length of at most equal to that of each panel, that is to say the deposition of adhesive is started at each panel by creating a first end of bead and this deposition is stopped at the space separating two successive panels by creating on the same panel a second end of the same bead, the method is characterized in that the support and the protective tape are secured at least near an edge of the panels which is located transversely with respect to the direction of relative displacement and which is closest to the first end;

when the protective tape is applied to the support, the protective tape is secured to the support very close to the spot on the support where the protective tape is to be initially positioned, so that the latter is fixed positively to the support independently of the state of the long-acting adhesive located between said support and said protective tape;

when the protective tape is applied to the support, the protective tape is secured to the support by means of immediate-action glue;

the protective tape having one face that is sensitive to the adhesive and one face that is not sensitive to the adhesive, it is folded transversely near its free end so as to fold a small length of the non-sensitive face over on itself along a margin and so as to bring the margin of the opposite face that is sensitive to the adhesive onto the face that is to be in contact with the bead of adhesive previously deposited on the support, in order that the protective tape is securely fixed to said bead of adhesive;

when the protective tape is applied alone to the adhesive that has already been applied to the application face, there is deposited on the latter, continuously or in places, a product such as a varnish with rapid and strong adhesion power, by affinity with the long-acting adhesive;

for the purpose of separately applying the malleable adhesive and a protective tape to a support, this protective tape being stored in a long length by being wound in a spiral on a storage reel, the inertia of the reel and of the turns of the protective tape is practically eliminated so as to suppress the resistance to traction of the protective tape, by differentiating the operation of extracting the tape from the reel and the operation of applying said protective tape to the support;

prior to any operation of applying the protective tape, a substantial length of said protective tape is unwound, that is to say a length which is significantly greater than that of the segments to be applied to the support, this length of protective tape is stored between the storage reel and a deposition station, freely and at random, that is to say not wound up on itself, said length of protective tape is stored in large folds free of any attachment and placed against one another without constraint but more or less aligned in terms of width, in an intermediate stock, the free strand of the protective tape is extracted from this intermediate stock in a given length so as to apply it to a support, whereas a length of protective tape that is essentially equal to the length which has been extracted is introduced into the intermediate stock so that said intermediate stock corresponds to an essentially constant length of protective tape;

the protective tape is positively driven on the one hand upstream of the intermediate stock and on the other hand downstream of said intermediate stock;

the storage reel is mounted on an idler axle and its rotation is braked;

the braking is stopped when the protective tape is driven upstream of the intermediate stock;

the storage reel is mounted on an axle which is driven in rotation so as to simultaneously obtain the unwinding of turns from the reel and the driving of the protective tape towards the intermediate stock and which is immobilized so as to stop this unwinding and this driving;

for the purpose of separately applying malleable adhesive and a protective tape to a support, a certain length of protective tape stored on the reel is extracted, by positive traction of its free strand, said protective tape is cut at a given distance from its free end, known as the "downstream" end, so as to create a segment of desired length, and the latter is applied to the moving support, on top of the adhesive which has already been applied;

the segment is cut so as to have two free ends, the "downstream" and "upstream" ends respectively, before being completely applied to the support;

the downstream end is applied to the support before the upstream end is cut;

the upstream end is cut before the downstream end has been applied to the support;

the protective tape is positively driven before the zone in which it is to be cut;

the protective tape is also positively driven after the zone in which it is to be cut;

the protective tape is extracted at a speed which is coordinated with the linear speed of the moving support so that, at the spot where the protective tape is applied to the support, the difference in the speed of the protective tape and the speed of the support is zero;

the protective tape is cut in a given zone and by means of a rotary cutting member which is actuated at a variable rate depending on the predetermined length for the segments of protective tape.

The subject of the invention is also a device for manufacturing a product consisting of a support on which there is a long-acting adhesive and a protective tape for delayed use of said adhesive, for joining by means of said adhesive two elements of the support, one of which bears a surface known as the "application" surface and the other of which bears a surface known as the "destination" surface, this device comprising:

a machine equipped with means for placing in relative movement a deposition station and a support, preferably by moving the support and not the deposition station, along a linear course in an essentially horizontal plane, a reserve of long-acting adhesive and a reserve of protective tape either already associated with one another in the form of a prefabricated assembly comprising a base, long-acting adhesive and a removable protective tape, known as a "transfer tape", or separately, which reserves are located close to the mean plane in which the support is to be located, said device being characterized in that it moreover comprises:

at least one flat rigid part forming a reference plane located outside the plane in which one of the outer faces of the support is to be located and parallel thereto, a member having an active part which is located outside the plane in which one of the outer faces of the support is to be located and which is arranged such that this active part can exert on the support a transverse force that affects a width of said support that is at least equal to that of the rigid part.

According to other features of this device:

the support having to be made to move in the form of a strip that is continuous and is stretched longitudinally, the rigid part and the member having an active part are made as a single assembly consisting of a plate arranged transversely to the machine over the entire width of the course of the support, and of which one face that forms the active part is located beyond the plane in which one of the two faces of the support is to be located, so that the continuous strip is subjected over its entire width to a transverse force due to the tension which tends to bring it back into a plane located this side of the active part;

the support consisting of separate panels, the rigid part and the member having an active part are separate and are arranged on either side of the course of the panels;

the rigid part is an immobile stop and the member having an active part is a lever that is stressed elastically in the direction of the stop, the active part being formed by a roller mounted idling at the end of the lever;

the lever is connected to a base that is mounted so as to be able to move between two positions, in one of which, known as the “active position”, the lever is close enough to the course of the panels for the roller to be in contact with one of the faces of said panels, and in the other of which, known as the “withdrawn position”, the lever is relatively far from its active position;

the base is associated with an automatic control mechanism that is designed to place the base either in the active position or in the withdrawn position, depending on whether there is a panel or an interval between two successive panels opposite the roller;

the stop is located at the end of a head for applying adhesive at which there terminates a tube for supplying liquid adhesive from the reserve of adhesive, said head being arranged close to the plane in which one of the faces of the support is to be located;

the destination surface, at least, being insufficiently able to retain the long-acting adhesive when the two elements of the support that are to be joined are brought together, in particular by rapid application and under a moderate manual pressure, for example on account of the presence on the support of a film of synthetic material or of a coating such as a synthetic material, particularly silicone, a varnish or kaolin, having an effect that inhibits adhesion of the adhesive, the machine comprises means for making at least the destination surface undergo, before it joins the adhesive, a physical and/or chemical treatment capable of improving the adhesion, either by annihilation, neutralization or attenuation of an earlier surface finish, or by applying a corrective product that is able both to fix to one of the elements of the support and to retain the adhesive, which means consist either of a mechanism for removing matter or of a distributor for distributing additional product, or of an applicator for applying the treatment without contact, such as a supply of heat by a heating device or an electric field by a high-frequency generator;

the machine is equipped with a member having a rough surface which is to be in contact with the support so as to remove from it, by gentle erosion, a fine surface layer without dissociation of the fibers, at least on the destination surface;

the machine is equipped with a suction mechanism having a mouth located close to the member with a rough surface, for the purpose of removing waste created by the gentle erosion of the surface layer;

the machine is equipped with a heat treatment assembly which is to receive at least part of the protective tape immediately before it is applied to the support;

the machine is equipped with an electric treatment assembly which is to subject at least one of the two elements of the support that are to be joined to a high-frequency electric field prior to being joined;

the electric treatment assembly comprises two electrodes that are to generate between them a high-frequency electric field and between which at least one of the two elements that are to be brought together and joined must pass;

the machine comprises means for printing the protective tape, said means being located downstream of the electric treatment assembly in the direction of relative displacement between the support and the printing means;

the device is produced in the form of a machine comprising:

an inlet feeder for receiving the support made of cardboard or similar material, which is in the form of separate panels that are independent and stacked on the feeder and previously cut to the desired format and shape in the form of preforms, a guideway for guiding the preforms one behind the other, which guideway extends up to a transporter terminating in an outlet stacker, and is characterized in that the machine moreover comprises:

a distributor for distributing protective tape and long-acting adhesive, either alone or already associated in the form of a prefabricated assembly comprising a base, adhesive and a removable protective tape, the latter being of great length in the form of reels, a mechanism for cutting said protective tape in a manner coordinated with the displacement of the preforms for the purpose of cutting the protective tape close to the two transverse ends of each preform, a device incorporating means for applying a treatment either to the support alone or to the protective tape alone or to both;

the device is produced in the form of a machine comprising:

an inlet feeder for receiving the support made of cardboard or similar material, which is in the form of separate panels that are stacked on the feeder and previously cut to the desired format and shape in the form of preforms, a guideway for guiding the preforms one behind the other, which guideway extends up to a transporter terminating in an outlet stacker, and it is characterized in that the machine moreover comprises:

a distributor for distributing protective tape and long-acting adhesive, either alone or already associated in the form of a prefabricated assembly comprising a base, adhesive and a removable protective tape, the latter being of great length in the form of reels, a mechanism for applying said protective tape in segments having a length that is at most equal to that of each preform, a mechanism for cutting said protective tape which is coordinated with the application mechanism for the purpose of cutting the tape into segments that are each located inside the contour of a preform, a device incorporating means for applying a treatment either to the support alone or to the protective tape alone or to both;

the device is produced in the form of a machine which is a corrugator comprising:

an assembly for forming the support made of corrugated cardboard from reels of paper, which support is in the form of a wide continuous strip that is substantially horizontal and of indefinite length, kinematic members for constantly or intermittently moving the continuous strip, a guideway for guiding the continuous strip, an assembly for transverse and/or longitudinal cutting of the continuous strip so as to create independent sheets, at least one stacker for stacking the independent cut panels, and it is characterized in that the machine moreover comprises:

at least one head for applying long-acting adhesive alone, at least one distributor for distributing the protective tape for the long-acting adhesive, said protective tape being of great length in the form of reels, at least one device incorporating means for applying a treatment either to the support alone or to the protective tape alone or to both;

the distributor or distributors for distributing protective tape, either alone or already associated with a prefabricated assembly comprising a base, adhesive and a removable protective tape, and the device or devices incorporating the means for applying a treatment are located above the horizontal continuous strip, the long-acting adhesive and the protective tape then being applied to the upper face of said continuous strip;

the distributor or distributors for distributing protective tape and the device or devices incorporating the means for applying a treatment are located below the horizontal continuous strip, the long-acting adhesive and the protective tape then being applied to the lower face of the continuous strip;

the long-acting adhesive being applied to the upper face of the continuous strip, assemblies for distributing malleable adhesive are located above said upper face;

the long-acting adhesive being applied to the lower face of the continuous strip, assemblies for distributing malleable adhesive are located below said lower face;

the device is designed to separately apply malleable adhesive and a protective tape and comprises an orifice for distributing malleable adhesive, members for storing and unwinding the protective tape, and also a mechanism for applying said protective tape to the support, at least partly on the adhesive, which mechanism is arranged downstream of the orifice for distributing adhesive in the direction of relative displacement, said device being characterized in that it is equipped with at least one detector for detecting the presence of protective tape, the sensitive element of which is located downstream of the orifice for distributing adhesive and which is connected to an alarm and also possibly to a mechanism that is designed to make the adhesive inoperative, either by removing it or by adding a material element;

the device is equipped with a mechanism for removing adhesive which comprises at least one blade that can move between a waiting position in which it is located away from the support and an active position in which it is situated beyond the plane of the support on which the adhesive has already been applied, means (possibly automatic) being provided to make the blade move from one position to the other;

the device is equipped with a mechanism for removing adhesive, comprising at least one cutting element that can move between a waiting position in which the cutting element or elements are located away from the support and a position in which they pass through the thickness of the support;

the device being equipped with a mechanism for removing adhesive, it comprises a removal assembly comprising at least one pump connected to a tube which opens out close to a storage area, and a suction apparatus;

the device is associated with a distributor for distributing a material element designed to be applied to the support, at least partly over all the adhesive present;

the distributor comprises on the one hand at least one reel for storing a sheet such as a tape and on the other hand a mechanism for delivering the sheet and applying the latter to the support;

the device is associated with a reservoir of chemical product and with an application mechanism particularly for application by means of spraying;

the reservoir is portable and under manual control, in particular a canister with valve containing a pressurized propellant gas;

the reservoir is fixed and associated on the one hand with at least one nozzle or with a spraying ramp connected to at least one tube provided with an electrovalve and on the other hand with a control mechanism (possibly automatic) for opening and closing the electrovalve or electrovalves;

the device, the deposition station of which comprises:

on the one hand a distributor for distributing malleable adhesive, having one or more distribution orifices, on the other hand a distributor for distributing protective tape, having:

at least one support for a reel of protective tape wound in a spiral and having a free strand, means for unwinding and guiding the free strand, an applicator mechanism, is characterized in that the deposition station comprises:

means for positively driving the free strand of the protective tape and a mechanism for controlling the driving speed so that, just before it comes alongside the bead of adhesive already applied to the support, the linear speed of the free strand of the protective tape is equal to the linear speed of the relative movement between the support and the deposition station, a calender formed of two rotating rollers, upper and lower respectively, which are located on either side of the plane in which the support equipped with the protective tape is to extend, and the mutual spacing of which is precise and advantageously adjustable, the assembly of the support, the bead of adhesive and the protective tape having to be engaged in the space located between the upper and lower rollers so as to calender the bead of malleable adhesive located between the protective tape and the support, both having a thickness that is not substantially modified by the calendering, so that the bead of adhesive is laterally spread, at least partially, and so that its face located against the protective tape forms in a single plane extending above the highest raised point of the application surface;

the machine is equipped with an assembly for applying to the support a product such as immediate-action glue, a solvent, a varnish and the like, and which comprises a reservoir for the product, at least one tube connected on the one hand to the reservoir and on the other hand to at least one outlet nozzle, the orifice of which is located close to the course that the support is to take with respect to the deposition station;

the machine comprising a station for depositing adhesive and a station for depositing protective tape that are offset in the direction of movement of the support, that is to say the station for depositing adhesive is upstream and the station for depositing protective tape is downstream, the orifice of the product distribution nozzle is located between these two stations;

the machine has a pressure roller mounted so as to rotate and located in the immediate vicinity of the spot where the protective tape is to come alongside the support and the bead of adhesive deposited on the latter, so as to exert a pressure on the support through the protective tape and the adhesive;

the pressure roller is kinematically connected to means for setting in rotation;

the means for setting the pressure roller in rotation are formed by a mechanism which comprises a drive roller mounted on an axle and which is to be in contact with the moving support so that, by tangential friction, the linear movement of the support can be transmitted to the drive roller, which receives at least one transmission member connected to the pressure roller;

the pressure roller has a central part of smaller diameter than that of two side parts;

the side parts are to be applied directly to the support;

the side parts are to be applied to the protective tape located between said side parts and the support;

the side parts have a surface that is not smooth;

the half-difference of the diameters of the central part and of the two side parts is less than the thickness of the protective tape so as to exert on the latter a driving traction, by pinching, between the moving support and the rotating central part;

the half-difference of the diameters of the central part and of the two side parts is less than the total thickness of the protective tape and of the bead of adhesive previously deposited on the support, so as to determine by rolling the thickness of said bead of adhesive;

the pressure roller is mounted to rotate on a mobile rig associated with control means via which the pressure roller can be placed in one of two extreme positions, one known as the “remote” position in which the pressure roller is away from the support and the other known as the “active” position in which it is in contact with the support, exerting on the latter a pressure that may possibly be adjustable;

the mobile rig is connected to a pneumatic control ram so that the thrust of the ram on the mobile rig is slightly elastic;

the device comprises means for fixing the protective tape to the support so as to secure them independently of the adhesive deposited on said support;

the fixing means consist of a distributor for distributing immediate-action glue;

the fixing means consist of a mechanism for cutting and transversely folding the protective tape, designed to fold a small length of said protective tape from a free end, so that in the folded part a face of the protective tape that is not very sensitive to the adhesive is folded back on itself and so that the opposite face that is more sensitive to the adhesive has a certain length on the same side of the protective tape as the face that is not very sensitive to the adhesive;

the device being designed to separately apply malleable adhesive and a protective tape, it comprises a parallelepiped receptacle defined by six faces, four small faces and two large parallel faces separated by a distance that is a little larger than the width of the protective tape, two opposite small faces each having a passage, one of which is an inlet in which the free strand of the protective tape coming from a storage reel is to be engaged and the other of which forms an outlet through which the free strand of the protective tape is to pass, drive means being provided to move and guide the protective tape on the one hand from the storage reel to the inlet of the receptacle and on the other hand from the outlet of the receptacle to the deposition station, which means are coordinated so as to conduct from the reel to the inlet of the receptacle a length of protective tape that is essentially equal to that which is conducted from the outlet of the receptacle to the deposition station, so that there is constantly in the receptacle a substantial length of protective tape lying at random, that is to say not wound up on itself, and arranged in wide folds, free of any attachment and placed one against the other without constraint but essentially aligned in terms of width by virtue of the two large faces of the receptacle;

the drive means comprise a pair of rollers, at least one of which is kinematically connected to a motor and which is located between the storage reel and the inlet of the receptacle;

the drive means are associated with a measuring instrument which makes it possible to determine the length of protective tape present in the receptacle and which controls the operation of the pair of rollers so that the length driven towards the inlet is essentially equal to the length driven from the outlet;

the storage reel is mounted to rotate on an axle and is associated with a braking mechanism;

the device comprises a pilot roller against which there bears the part of the protective tape located between the storage reel and the inlet of the receptacle when said protective tape is taut, the pilot roller being in functional connection with the braking mechanism so that the latter is neutralized when the protective tape bears against the pilot roller and is made to have a braking action on the reel as soon as the protective tape is not taut and no longer bears against said pilot roller;

the storage reel is mounted to rotate on an axle and is kinematically connected to a motor;

the pilot roller is in functional connection with the motor so that the speed of the latter is controlled at an advantageously adjustable speed when the protective tape bears against the pilot roller and is stopped as soon as the protective tape is not taut and no longer bears against said pilot roller;

the braking mechanism of the storage reel is constantly in action and the drive means have a power that is sufficient to overcome the resistance force due to said braking mechanism;

the device being designed to separately apply malleable adhesive and a protective tape, the reserve of which is a reel on which it is wound in many turns, this device comprises on the one hand a mechanism for cutting the protective tape into successive segments, located between the reel and the deposition station, and on the other hand a device for measuring the length of the application surface of the support which is to receive adhesive and a segment of protective tape, so as to consequently cut said segment to the desired length before it is entirely placed on the support so that it is separated from the turns of the reel, the device moreover comprising drive means for moving and guiding the protective tape on the one hand prior to cutting from the reel to the cutting mechanism and on the other hand after cutting from the cutting mechanism to the deposition station, the cutting mechanism comprising a cutting member that can move between a withdrawn position in which it is away from the course of the protective tape and an active position in which it is very fleetingly on this course, which member is secured to a mobile element, the speed of displacement of which, from the active position of cutting one segment to that of the following segment, is synchronized with the means for placing in relative movement the deposition station and the support, the distance which exists between the cutting mechanism and the deposition station being smaller than the length of the shortest permissible segment;

the drive means comprise two pairs of rollers, at least one of each pair being kinematically connected to a motor, one of these two pairs being located between the reserve of protective tape and the inlet of the cutting mechanism and the other being located between the outlet of the cutting mechanism and the deposition station;

the deposition station comprising a pressure roller mounted to rotate and located in the immediate vicinity of the spot where the protective tape is to come alongside the support and the bead of adhesive deposited thereon, the distance which exists between the pair of rollers located between the outlet of the cutting mechanism and the pressure roller is smaller than the length of the shortest permissible segment.

The subject of the invention is also a product, in particular a fibrous product, which consists of a part made of cardboard, corrugated cardboard or a similar material, such as a simple panel, a cut preform which is grooved and optionally printed which may have folded and glued parts, or else a volume article such as a container, characterized in that this part has at least one slightly adhesive tape arranged on top of a bead of long-acting adhesive applied to at least a first element of the part which forms a zone known as the "application zone", in the presence of which there is to be located, after folding and/or partial straightening, a second element of the part along a face known as the "destination surface" without adhesive and thus protective tape, this destination surface having greater adhesive retention power than that of the rest of the part.

According to other features of this product:

at least part of the destination surface has traces of an earlier treatment, such as a surface finish, localized increased thickness, cavities, irregularities, color or microperforations;

at least part of the destination surface is less smooth than the rest of the part;

at least part of the destination surface has a layer of a product;

the elements that are to be brought together are flaps that have to be folded along lines, at least some of these having perforations which pass right through the material that forms the flaps and which are separated by solid parts;

the elements that are to be brought together are flaps that have to be folded and bent over on one another along lines, the latter being located, for two adjacent flaps, at levels that are not aligned so that, after folding and bending, the fold line of the top flap is higher than that of the bottom flap along a distance that is greater than the thickness of the material forming the flaps, so that the top flap is slightly inclined with respect to the bottom flap and not strictly parallel thereto;

the element bearing the destination surface is softer and more flexible than the rest of the part;

the element bearing the application surface has on its face opposite said application surface a mark to the right of which the corrugated cardboard is softer on account of the crushing of its inner grooves to the right of the mark;

the long-acting adhesive is covered with a protective tape that is slightly wider than the adhesive;

the long-acting adhesive is covered with a protective tape, the ends of which coincide exactly with the edges of the part;

the long-acting adhesive is covered with a protective tape, at least one end of which exceeds one of the edges of the part;

the long-acting adhesive and the protective tape are placed in a cavity of the part so that the outer face of the tape is essentially aligned with the face of the part, without creating an increased thickness;

the protective tape is transparent and bears writing affixed to its face located against the long-acting adhesive;

the protective tape is secured to the cardboard part not only by the long-acting adhesive itself but also by additional means;

the cardboard part bears at least one bead of long-acting adhesive covered with a protective tape that is secured to the cardboard part by a mechanical fixing member such as a needle, staple or the like;

the cardboard part bears at least one bead of long-acting adhesive covered with a protective tape that is secured to the cardboard part by immediate-action glue deposited in at least one location.

The invention will be better understood from the detailed description given below with reference to the attached drawing. Of course, the description and the drawing are given solely by way of non-limiting example.

FIG. 16 shows a flat blank, simply cut and grooved, that is to receive long-acting adhesive and a protective tape.

FIG. 17 shows a preform made from the blank of FIG. 16 and having a folded and partially glued part for the purpose of forming a container of variable height, designed for dispatching articles by post or parcel service.

FIG. 18 is a schematic perspective view of a container obtained by giving volume to the preform of FIG. 17 and in the progress of being closed for packaging a book.

FIG. 19 is a schematic perspective view of the container of FIG. 18, ready to be closed by means of long-acting adhesive.

FIG. 20 is a schematic perspective view of the container of FIGS. 18 and 19 but exposed to the risk of accidental opening if it is not treated according to the present invention.

Figure 22:
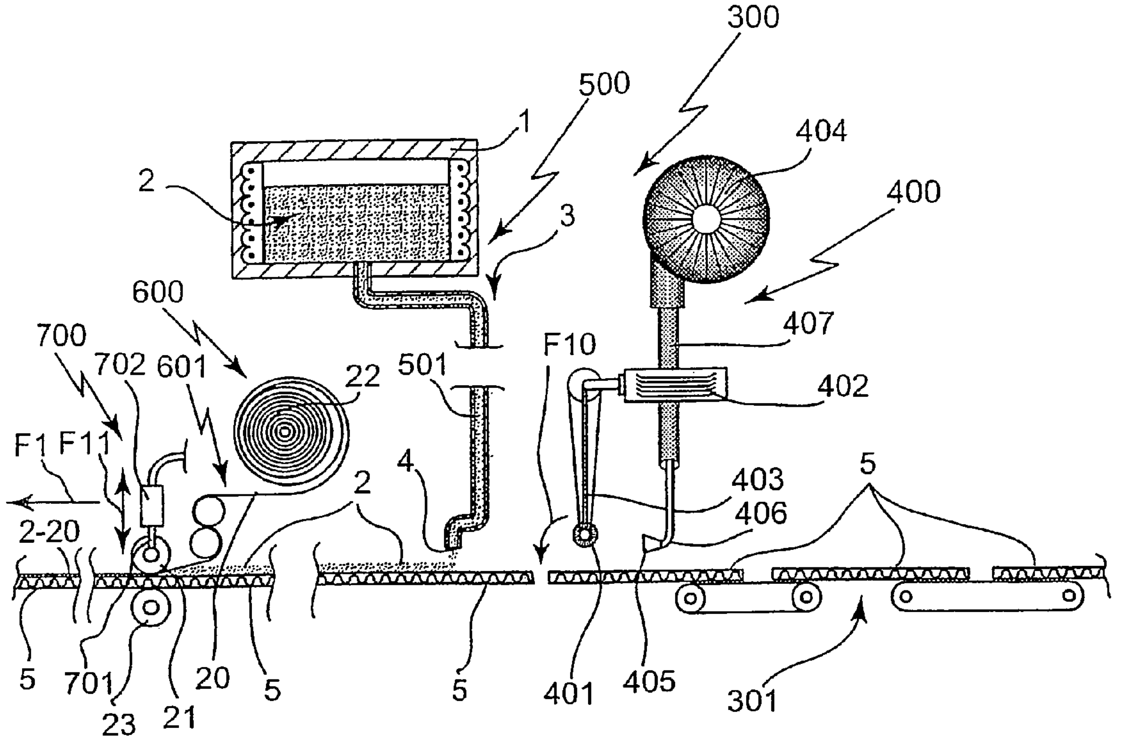

FIG. 22 is a schematic view showing a device implementing the method according to the invention for applying long-acting adhesive and a protective tape to corrugated cardboard consisting of precut panels, of grooved blanks or of preforms which are in the progress of being folded and assembled by partial gluing, in accordance with one particular embodiment of the invention in which a pressure is exerted, through the protective tape, on the long-acting adhesive.

Figure 23:
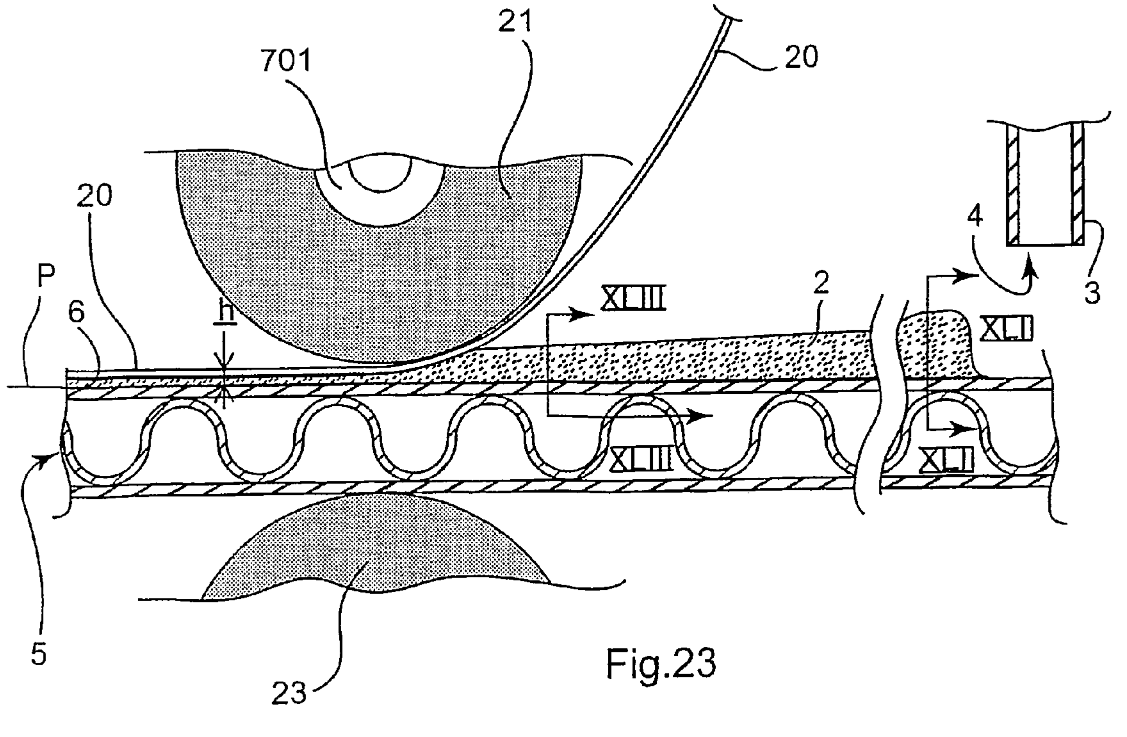

FIG. 23 is a schematic view on a larger scale of part of the device of FIG. 22, specific to this particular embodiment.

FIGS. 24 to 26 are schematic views showing this particular embodiment applied to adhesive deposited in the form of a single bead that is relatively thick. Moreover, FIG. 24 is a section on line XLII-XLII of FIG. 23 and FIG. 25 is a section on line XLIII-XLIII of this same FIG. 23.

FIGS. 27 to 29 are schematic views showing the same embodiment of the invention but using long-acting adhesive applied in a number of small beads and to the upper face of the support.

FIGS. 30 to 32 are schematic views showing the same embodiment of the invention as that of FIGS. 27 and 29 but in which no pressure is exerted that is sufficient to spread the beads of adhesive.

FIGS. 33 to 35 are schematic views showing a variant of the same embodiment of the invention using long-acting adhesive applied in a number of small beads but to the lower face of the support.

Figure 36:
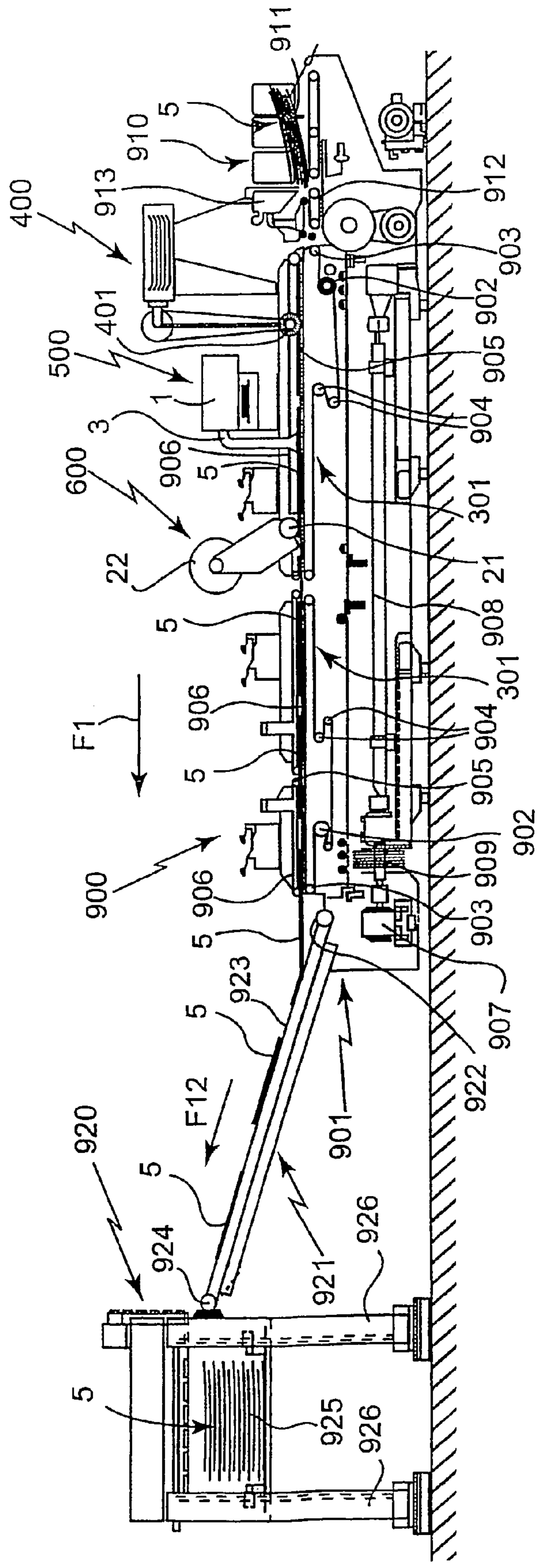

FIG. 36 is a schematic view in elevation of a machine according to the invention, designed to apply long-acting adhesive and a protective tape to unitary supports consisting of panels made of corrugated cardboard produced by cutting either a strip of corrugated cardboard of indefinite length or larger sheets.

Figure 37:
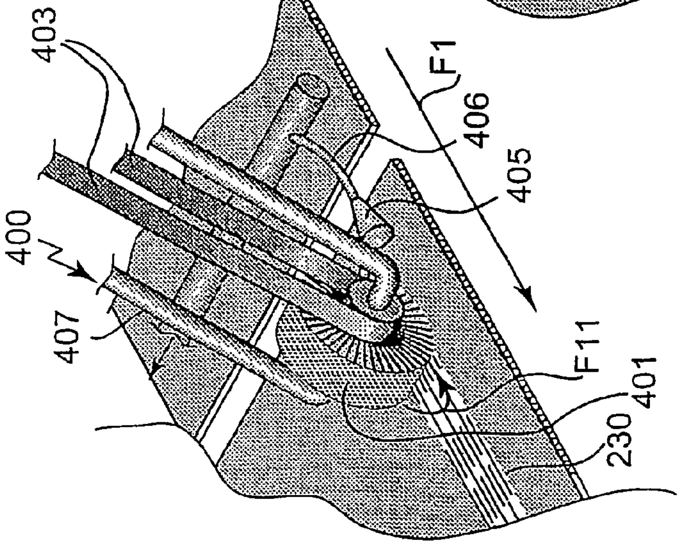

FIG. 37 is a partial schematic perspective view showing a variant of the invention in which a surface layer of the support which is not very able to retain long-acting adhesive is removed by erosion, on the part of the support forming the application surface, prior to application of said adhesive.

Figure 38:
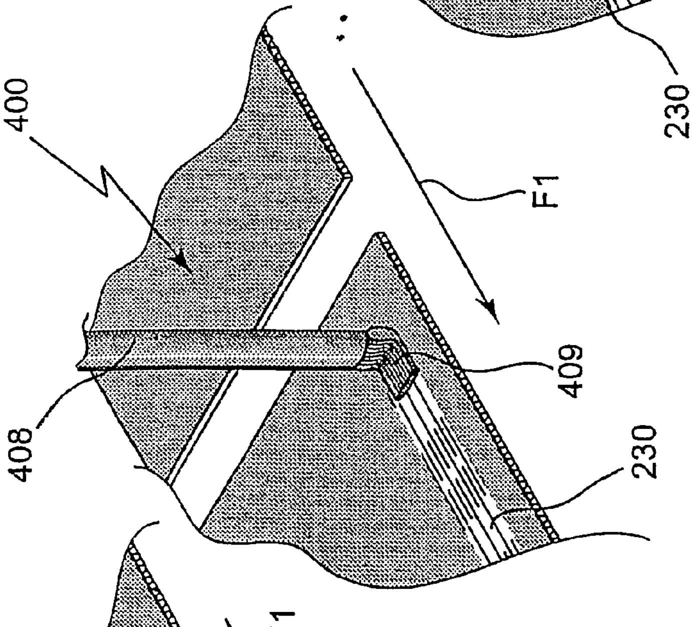

FIG. 38 is a partial schematic perspective view showing a variant of the invention in which an additional product is spread over the part of the support forming the application surface, the surface of which is not very able to retain long-acting adhesive, prior to application of said adhesive.

Figure 39:
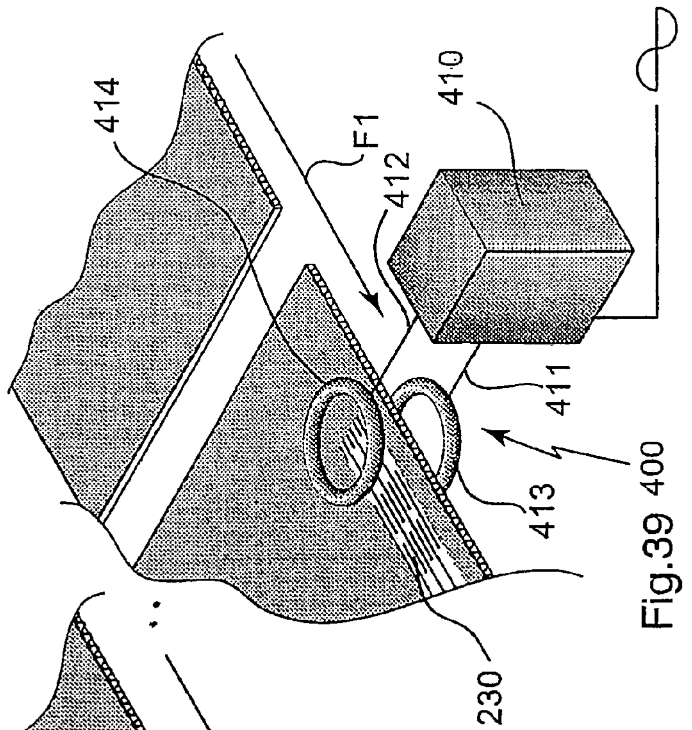

FIG. 39 is a partial schematic perspective view showing a variant of the invention in which the part of the support forming the application surface, the surface of which is not very able to retain long-acting adhesive, is subjected to an electric field, prior to application of said adhesive.

Figure 40:
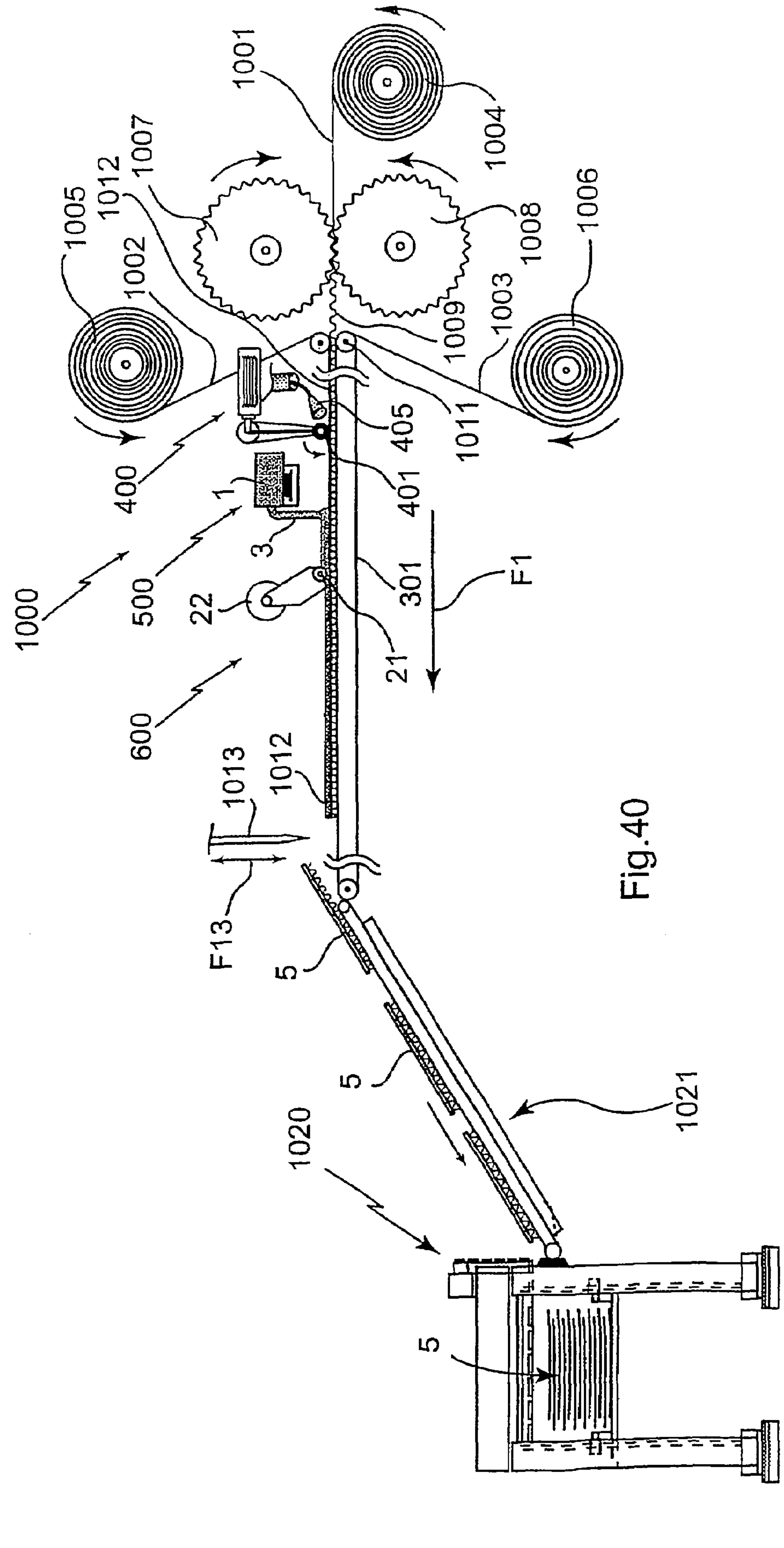

FIG. 40 is a schematic view in elevation of a machine according to the invention, designed to apply long-acting adhesive and a protective tape to a support consisting of a strip of corrugated cardboard of indefinite length, resulting from the continuous formation of this corrugated cardboard from reels of paper, this machine being known as a "corrugator".

Figure 41:
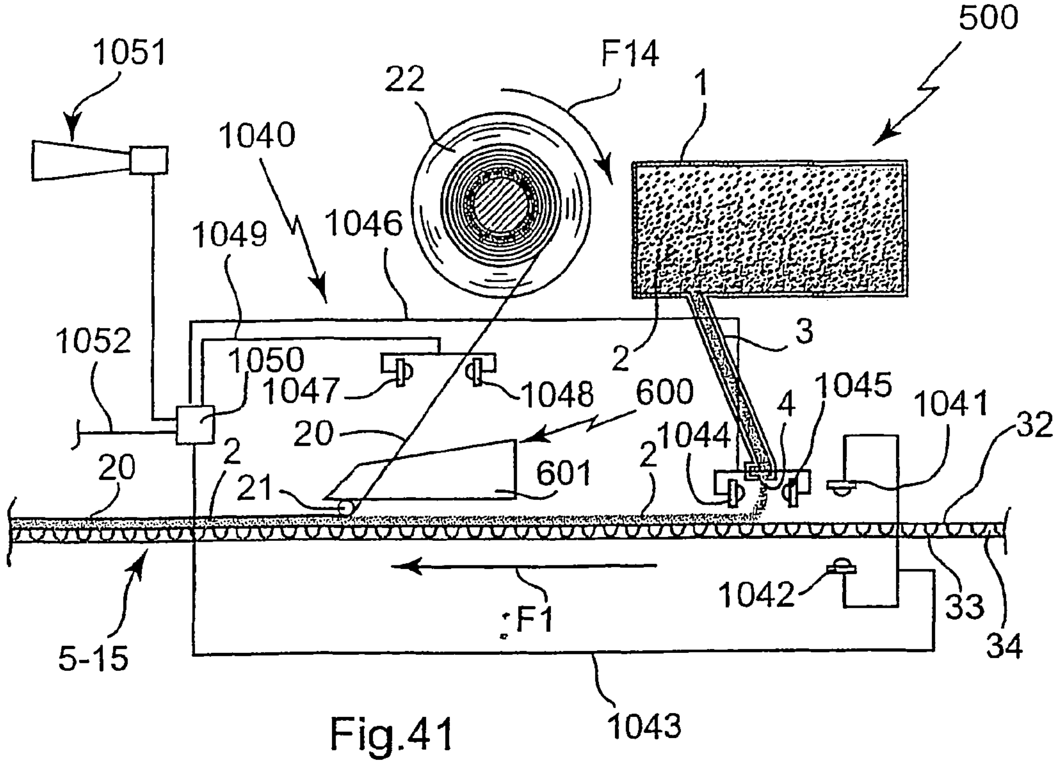

FIG. 41 is a partial schematic view of a machine comprising a device for applying adhesive and a protective tape, in a normal mode of operation.

Figure 42:
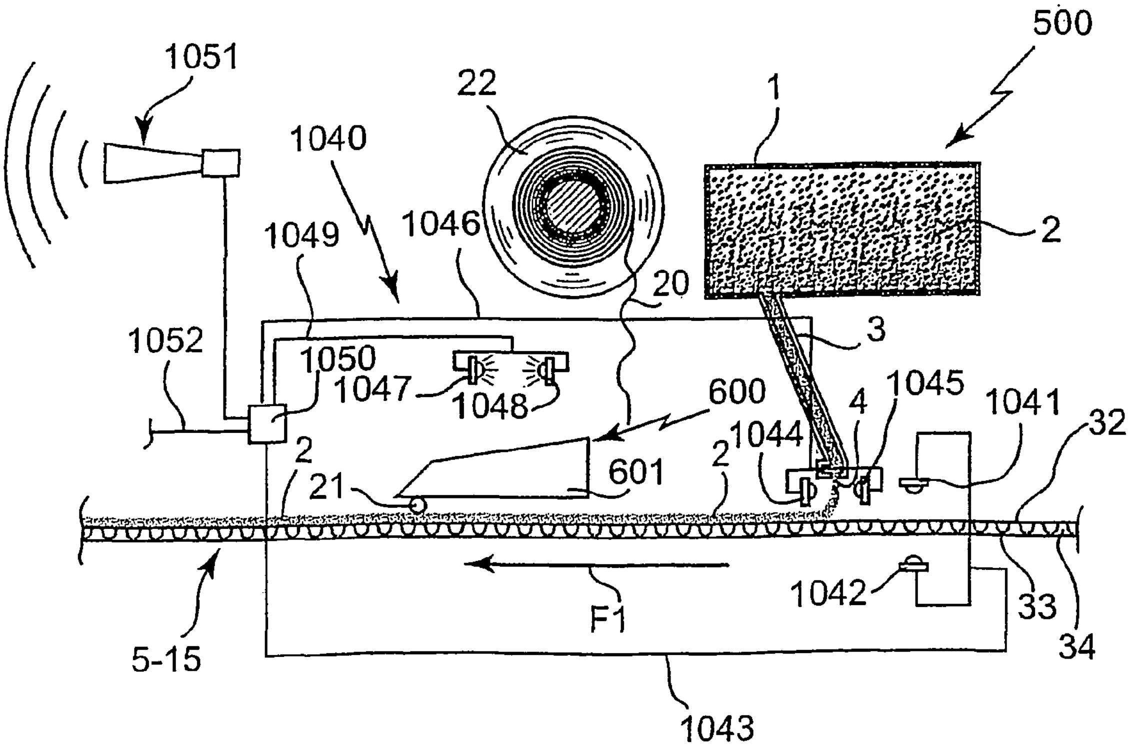

FIG. 42 is a schematic view analogous to that of FIG. 41, showing the occurrence of an incident consisting in breakage of the protective tape.

Figure 43:
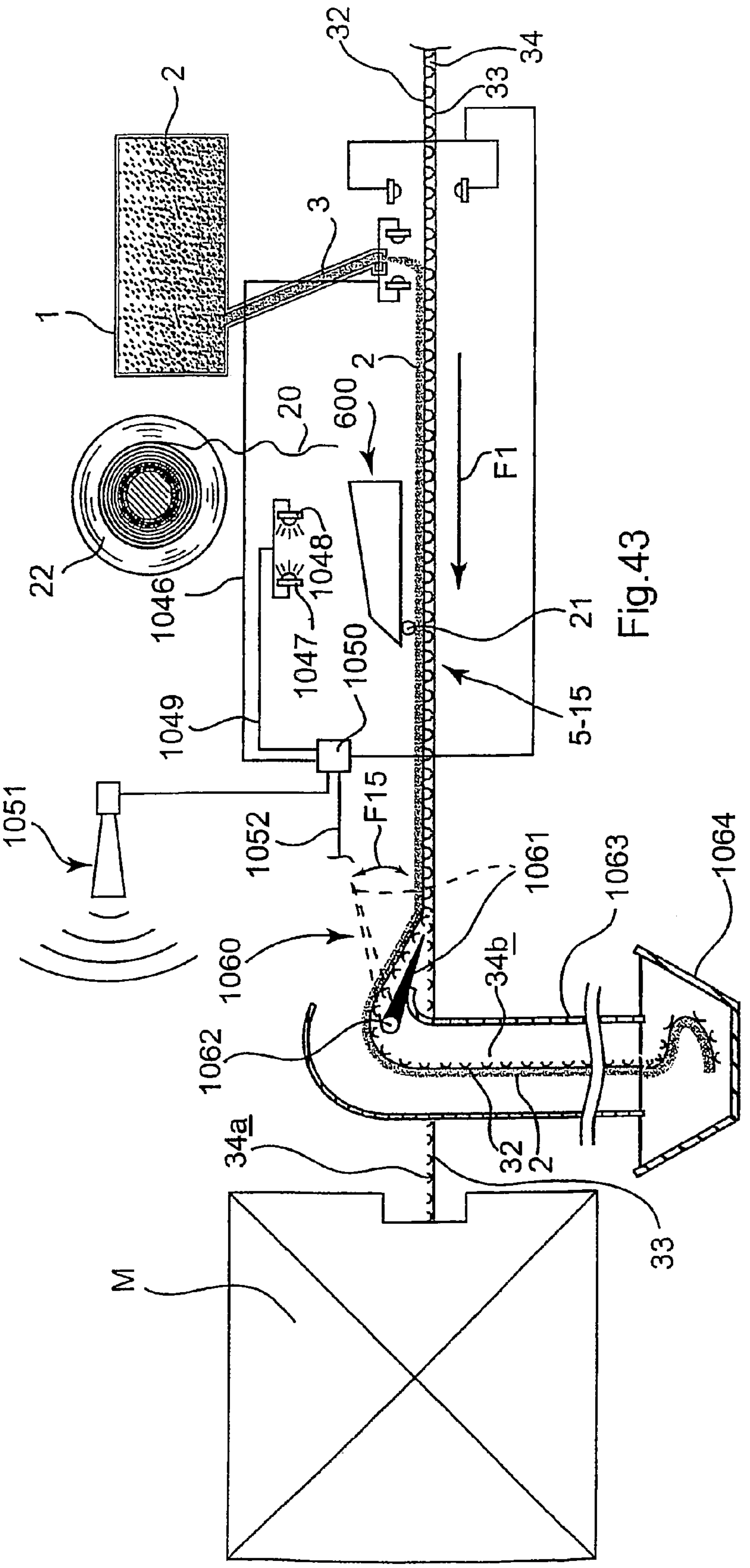

FIG. 43 is a schematic view of one embodiment of the invention applied when the incident shown in FIG. 42 occurs.

Figure 44:
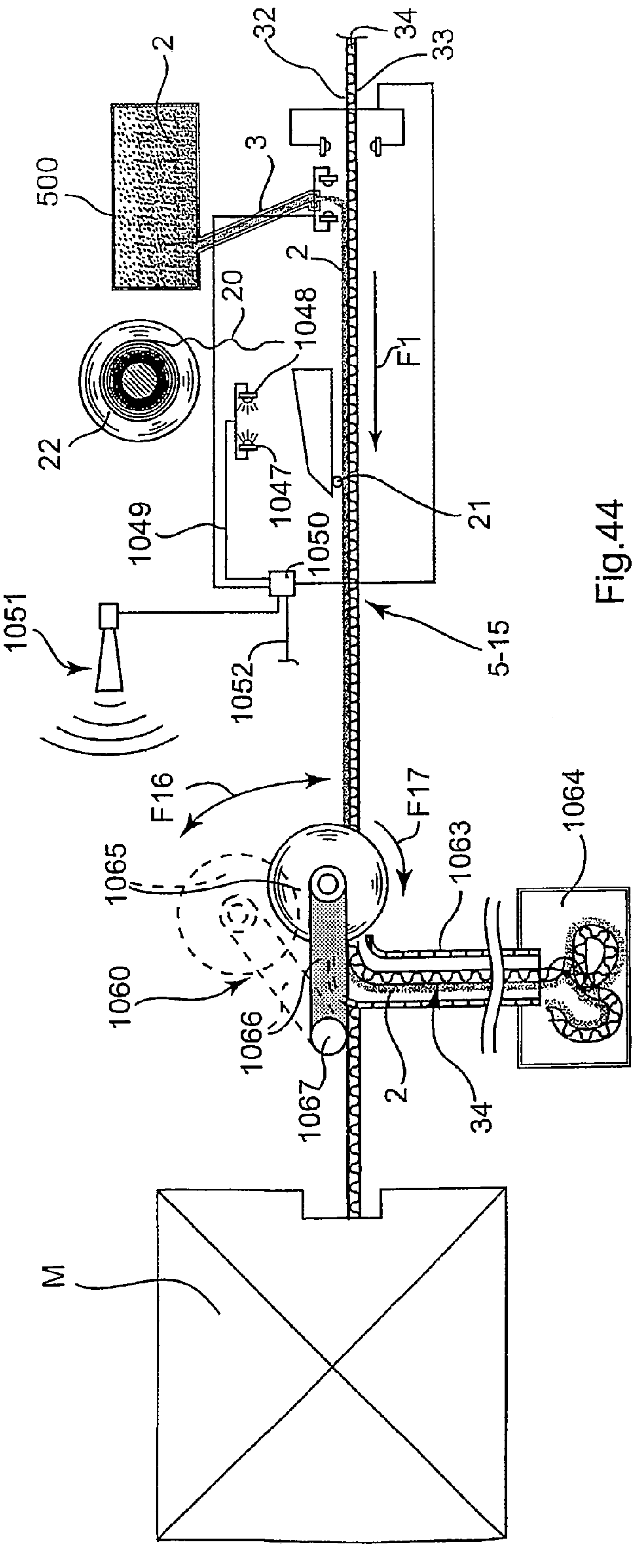

FIG. 44 is a view analogous to that of FIG. 43 and corresponding to another embodiment of the invention.

Figure 45:
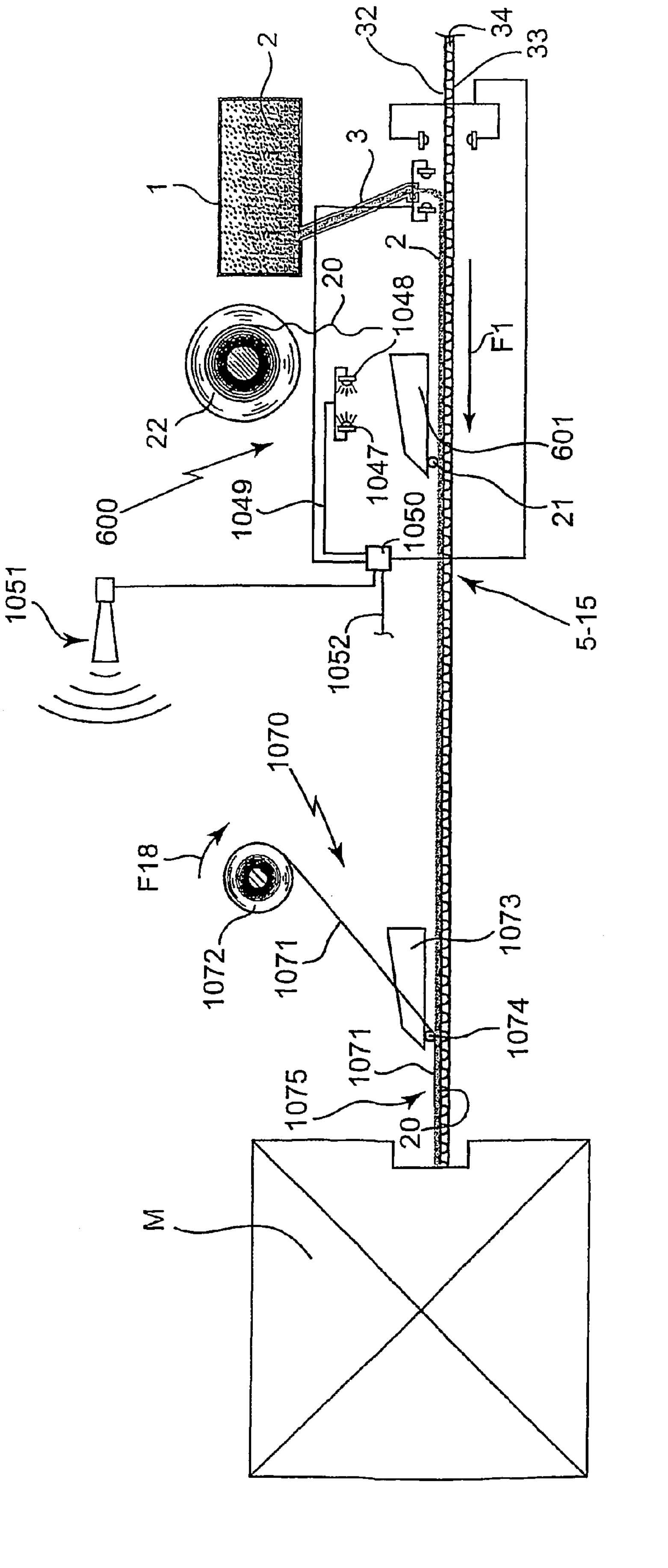

FIG. 45 is a view analogous to that of FIGS. 43 and 44 and corresponding to another embodiment of the invention.

Figure 46:
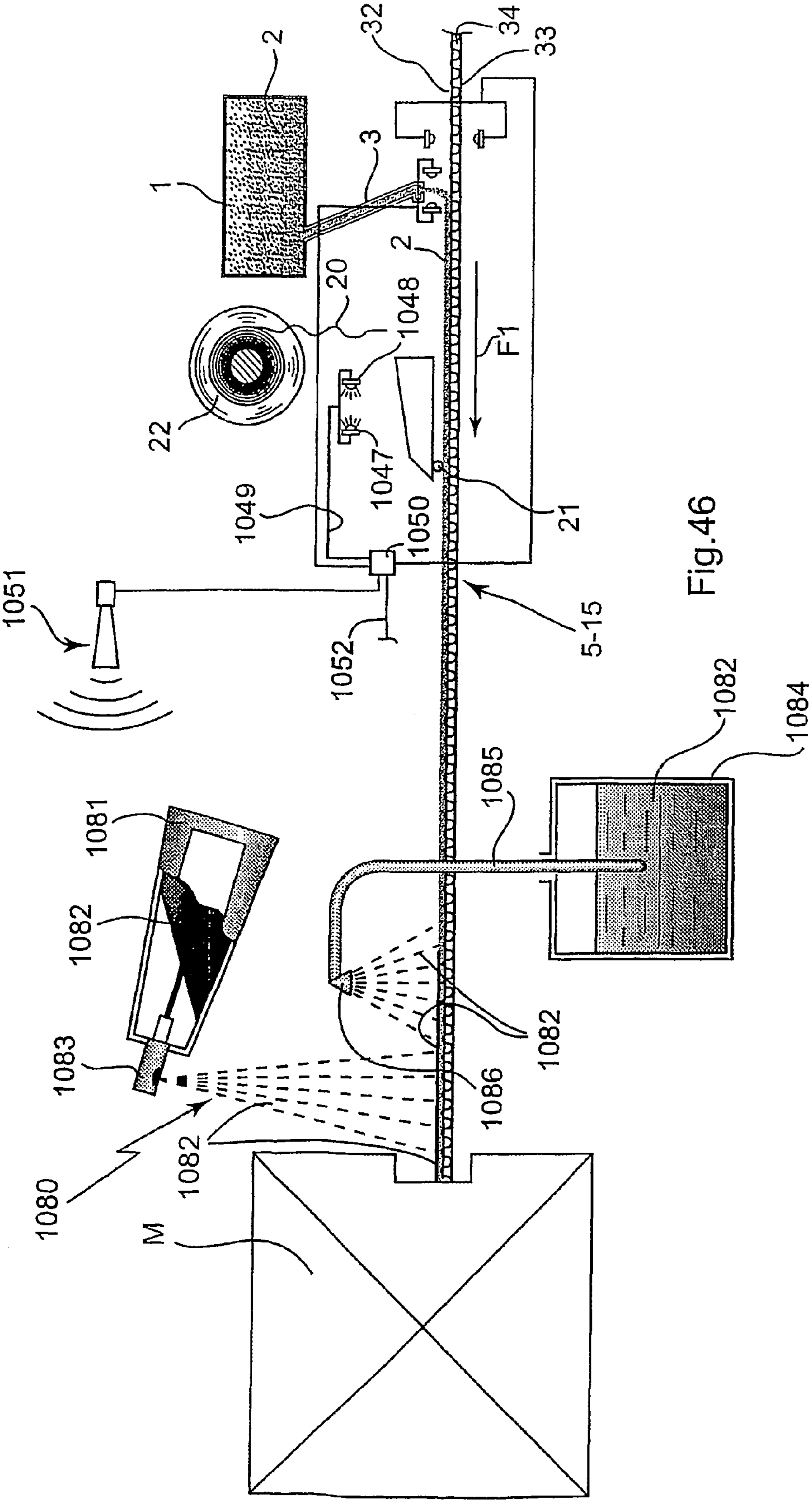

FIG. 46 is a view analogous to that of FIGS. 43, 44 and 45 and corresponding to another embodiment of the invention, in two variants.

FIGS. 47 to 54 are schematic views which show an embodiment of the invention in which the precision of application of the long-acting adhesive and the protective tape is obtained by synchronizing the linear speeds of the moving support and of the protective tape extracted from its reserve, by virtue of a pressure roller driven in rotation.

Figures 47, 48, 49, 50, 51, 52, 53, 54:
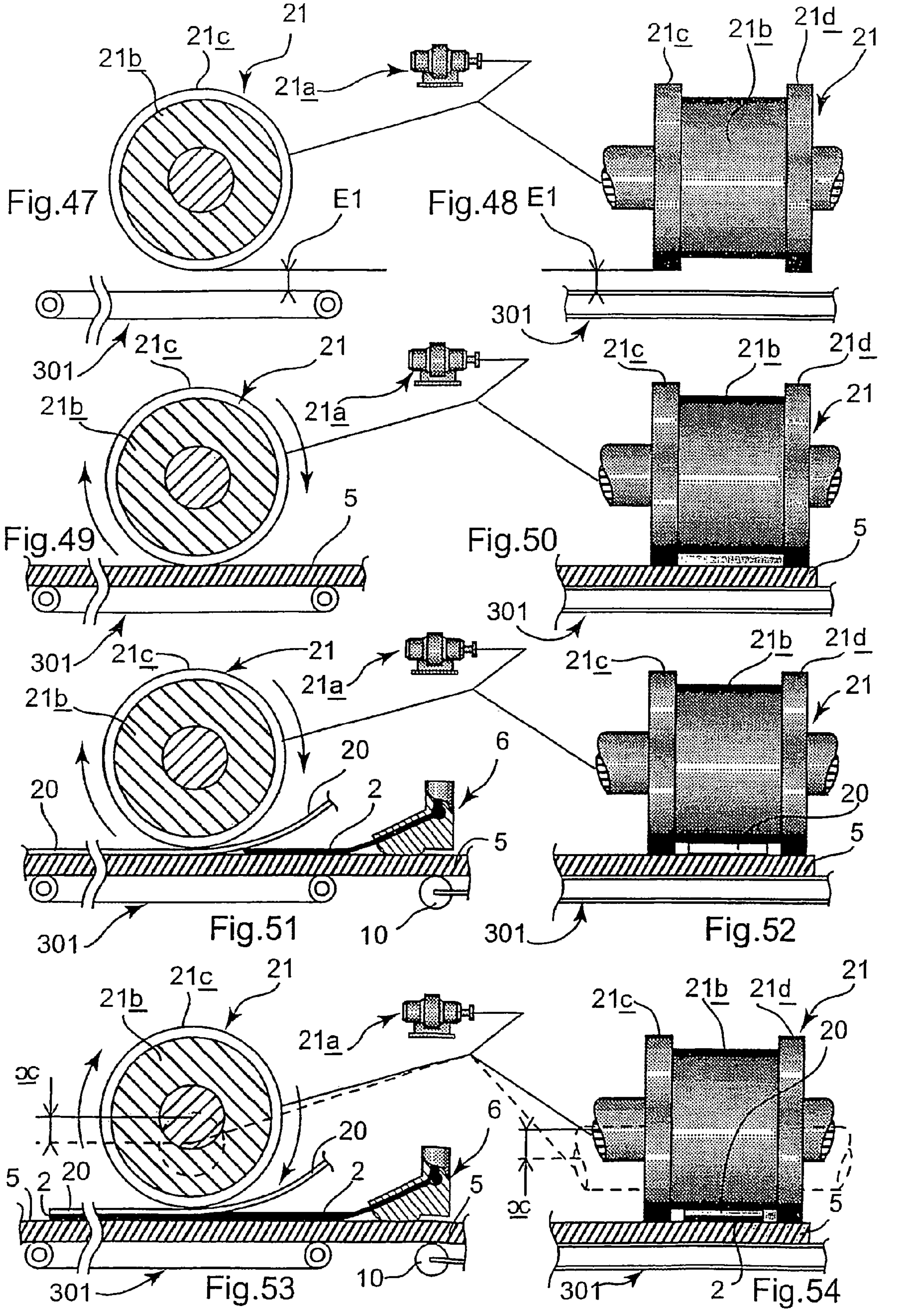

FIGS. 47 and 48 show the situation in which the support is not present.

FIGS. 49 and 50 show the situation in which the support is present at the pressure roller, prior to deposition of the adhesive.

FIGS. 51 and 52 show a special situation in which the protective tape is already driven by the pressure roller but the adhesive is delayed with respect thereto since it is just arriving at the deposition station.

FIGS. 53 and 54 show the situation of current operation in which the support is present and receives the malleable adhesive and also the protective tape.

Figure 55:
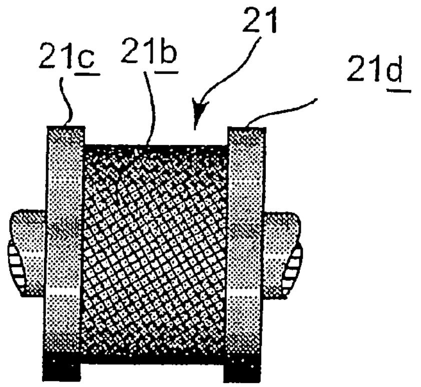

FIG. 55 is a schematic view showing that the pressure roller may be knurled in its central part.

Figure 56:
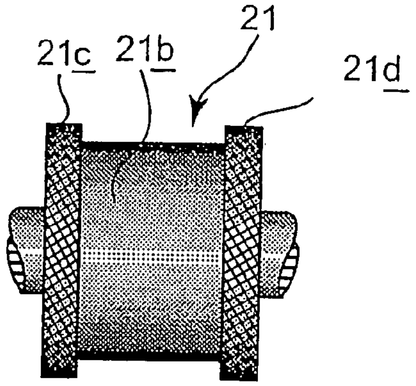

FIG. 56 is a schematic view showing that the pressure roller may be knurled on either side of its central part.

Figure 57:
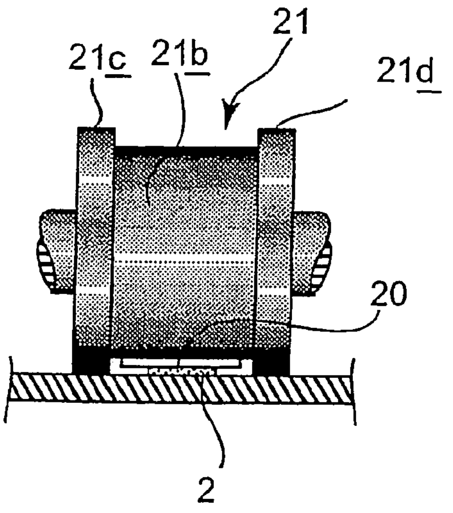
Figure 58:
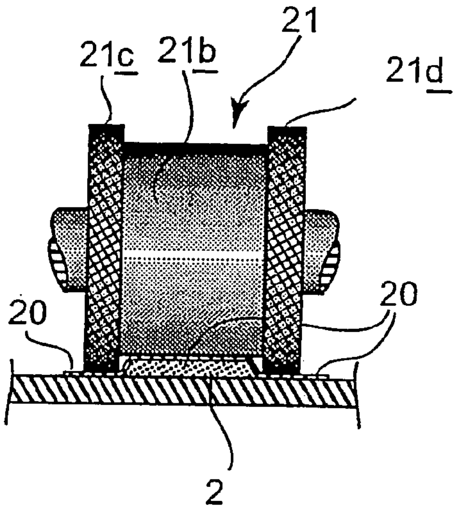

FIGS. 57 and 58 are schematic views showing two variants of the invention with regard to the application by the pressure roller of the long-acting adhesive and the protective tape.

Figure 59:
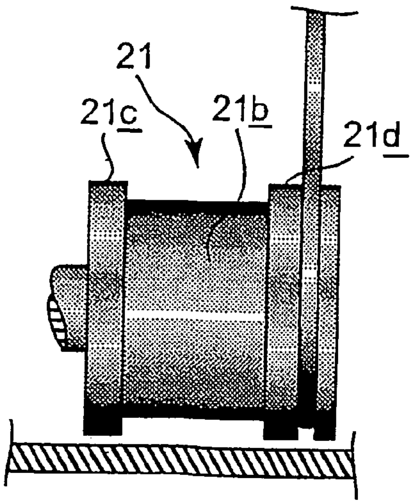

FIG. 59 is a schematic view showing an embodiment of the invention in which the pressure roller is driven in rotation by means of a transmission member of the belt type.

FIG. 60 is a schematic view in elevation showing an embodiment of the invention in which the pressure roller is driven in rotation by a mechanism comprising a drive roller which is itself driven by the moving support.

FIG. 61 is a schematic view in elevation analogous to FIG. 60, the mechanism in this case being in the withdrawn position, the moving support not being present at the pressure roller.

FIG. 62 is a schematic perspective view of the mechanism of FIGS. 60 and 61.

Figure 63:
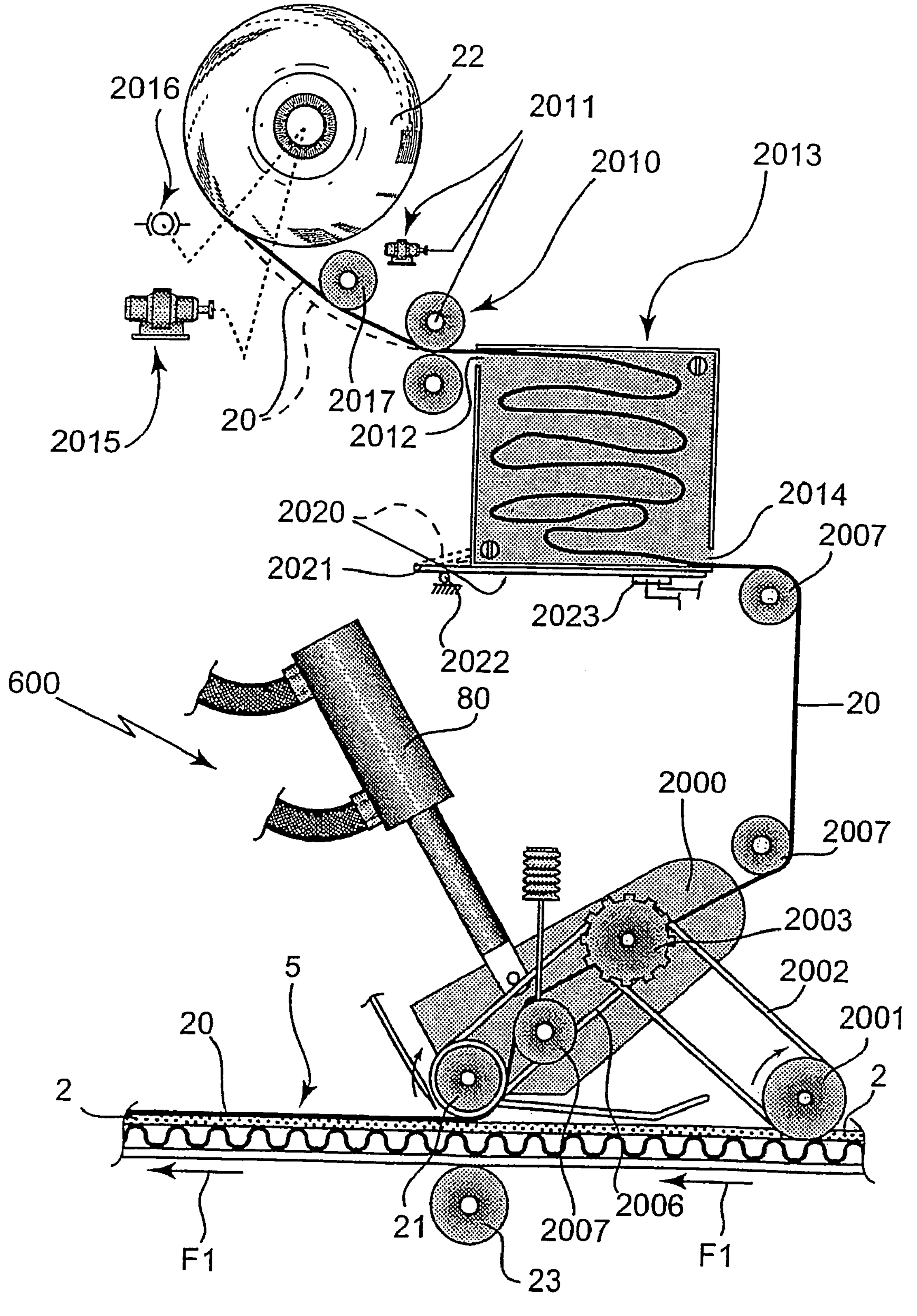

FIG. 63 is a schematic view showing an embodiment of the invention in which an intermediate stock is provided between the protective tape storage reel and the deposition station.

Figure 64:
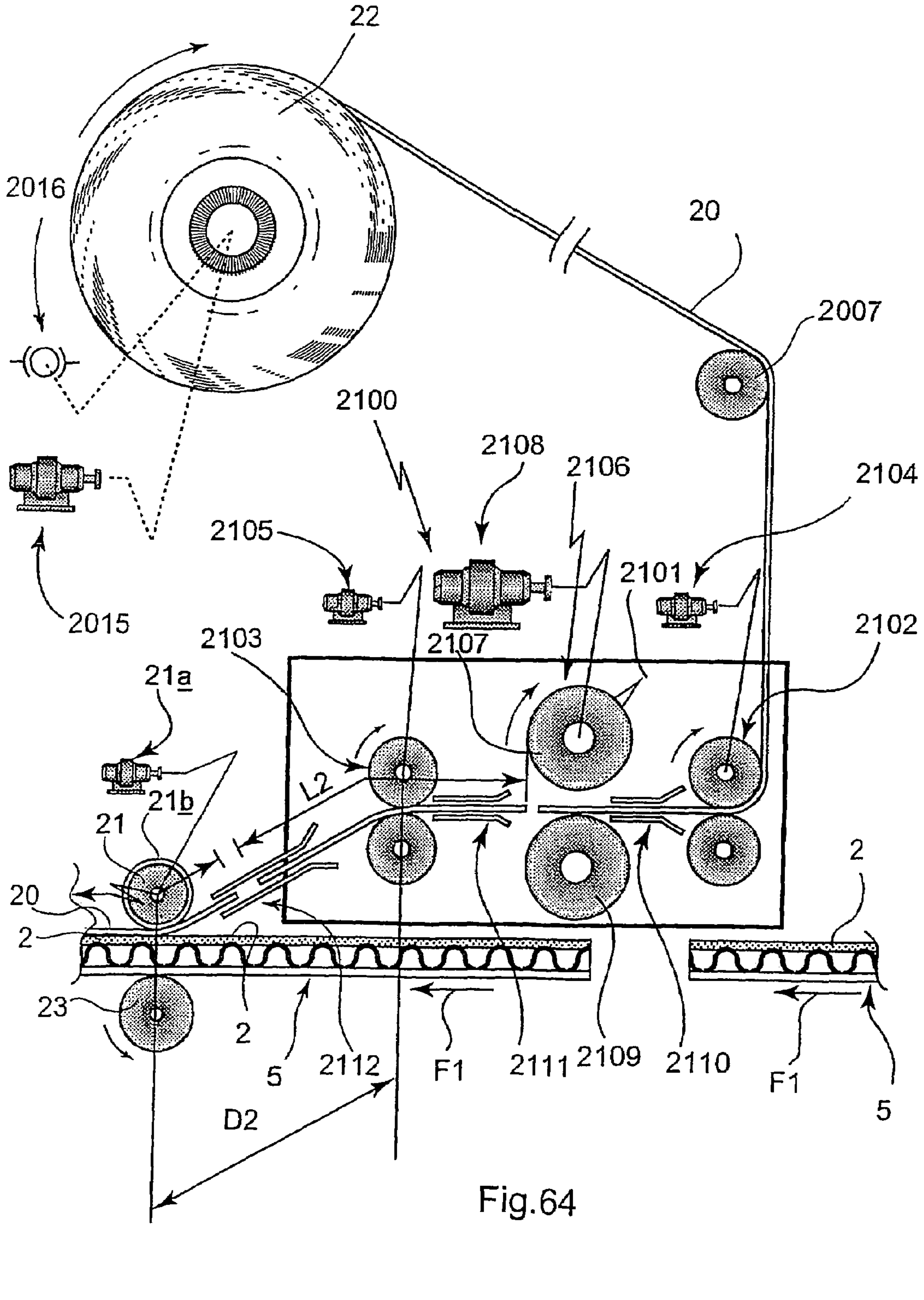

FIG. 64 is a schematic view showing an embodiment of the invention in which a mechanism for measuring and cutting the protective tape is provided in the vicinity of the deposition station.

Figure 1:
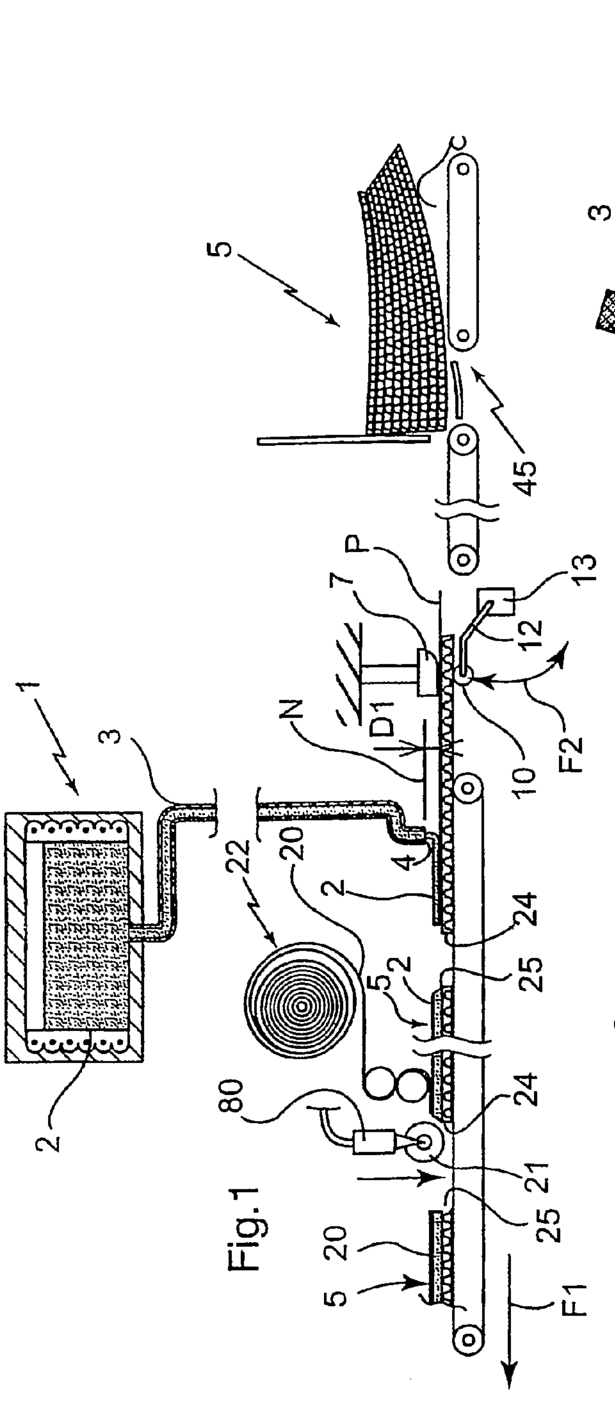
FIG. 1 is a schematic view of a device according to the invention, applied to the production of separate panels each having at least one line of adhesive.
Figure 2:
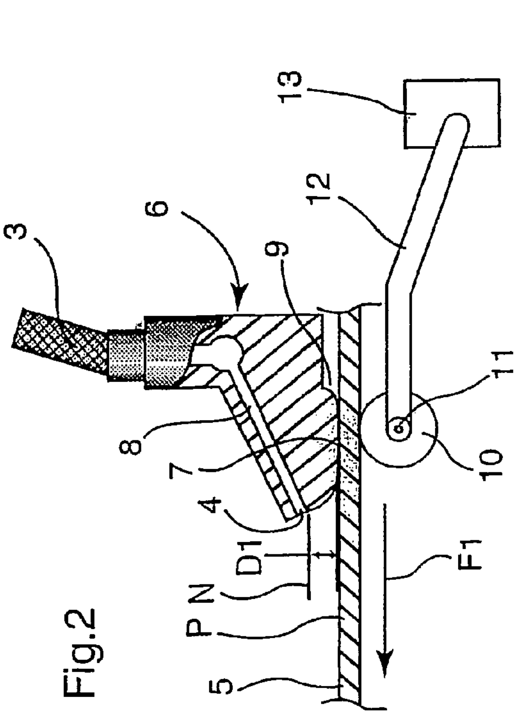
FIG. 2 is a partial schematic view showing a device according to the invention ensuring the precision of positioning the successive panels with respect to a deposition station when a panel is located at a head for delivering liquid adhesive.
Figure 3:
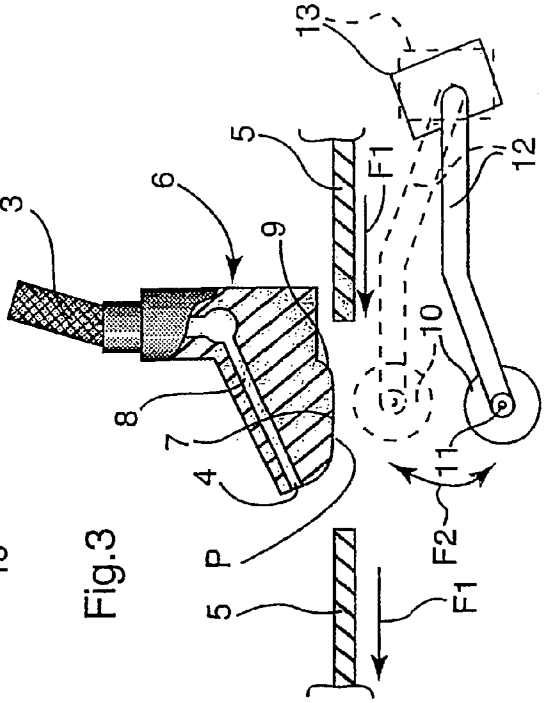
FIG. 3 is a schematic view similar to that of FIG. 2 which shows the phase of producing the panels in which an empty space is located at the head for delivering adhesive.
Figure 4:
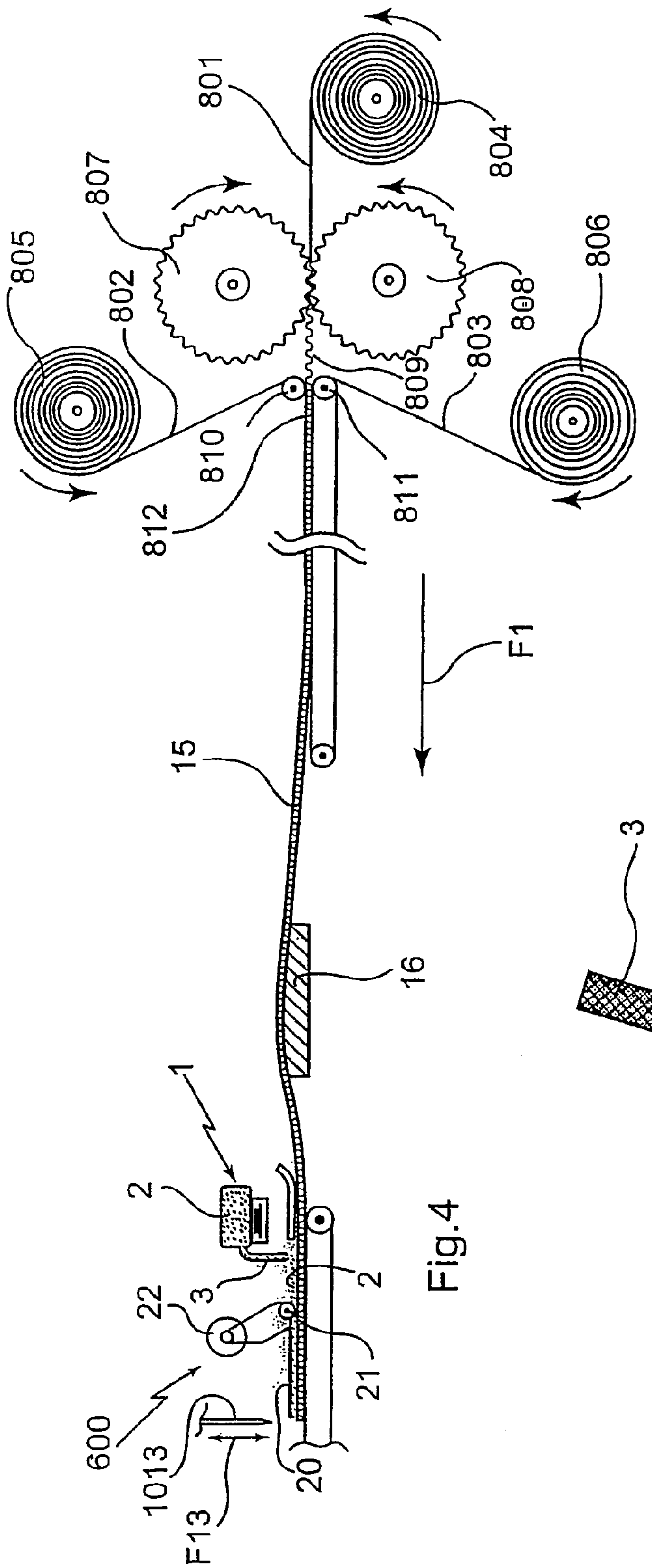
FIG. 4 is a schematic view of a device according to the invention, applied to the production of a strip of indefinite length having at least one line of adhesive.
Figure 5:
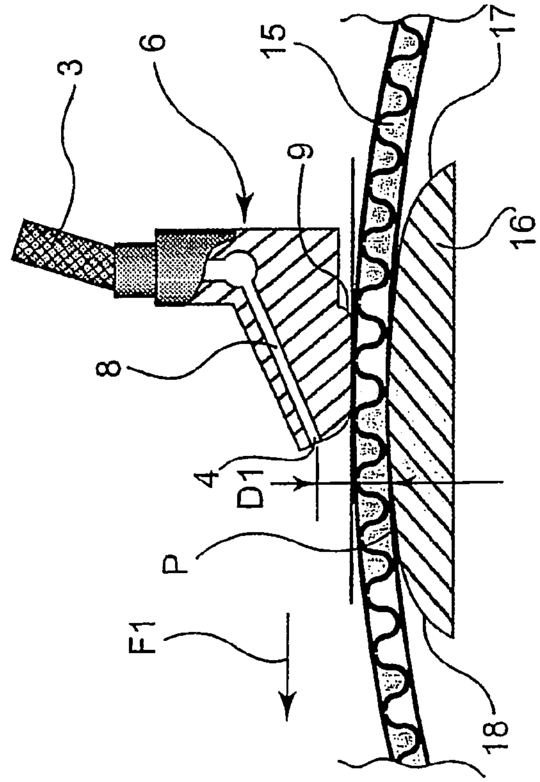
FIG. 5 is a partial schematic view corresponding to that of FIG. 2, the presence of a strip of indefinite length having the consequence that there is no interruption in the presence of support at the head for delivering adhesive.

Referring to FIGS. 1 to 3, it can be seen how the method according to the invention is implemented in the case where the supports are independent panels, whereas in FIGS. 4 and 5 the method is applied to a support consisting of a continuous strip of indefinite length, which is the case of strips of corrugated cardboard present on a corrugating machine known as a "corrugator".

Shown in FIGS. 1 to 3 is a heated and insulated reservoir 1 in which a certain amount of adhesive 2 is heated so as to bring it to a consistency in which it is still pasty but at the limit of the liquid state, said situation being referred to as "malleable". By way of example, an adhesive of known type is heated to about 175 degrees Celsius, the main thing being to bring the adhesive to the required temperature so that it has a viscosity that is compatible with it being extruded easily and continuously.

Through a tube 3, the adhesive 2 is brought to an orifice 4 that opens above the plane in which there is to be situated the upper face of the various panels 5 which each form a support that is to receive the malleable adhesive 2 and a protective tape.

The orifice 4 is located at an invariable level N, and either the tube 3 is fixed or the orifice 4 is provided on a head 6 which is itself arranged in a fixed manner, or, if it can be moved for maintenance and/or adjustment purposes, is secured definitively, possibly by a stop, at the given level N.

The face of the panels 5 which is to receive the adhesive 2, known as the "application surface", which in this case is the upper face thereof, is to extend in a plane that is located as precise a distance as possible from the orifice 4.

This is because the distance D1 which separates the level N from the application face is critical in order that the adhesive 2 can be applied correctly, both for fixing it to the application surface in the factory and for its subsequent real and effective action on the destination surface.

According to the invention, there is determined a reference plane P located at the distance D1 from that in which the application surface is to be located, and a transverse force is exerted on the panels 5 so that their upper face is constantly pressed against the plane P.

In FIG. 1, the plane P is formed by the lower face of a rigid part 7 which forms a stop and is distinct from the end of the tube 3 where the orifice 4 is located.

In FIGS. 2 and 3, the orifice 4 is provided on a head 6 for applying adhesive 2 and is located at the end of a channel 8 that is inclined downwards from the rear to the front, so as to open out at the downstream part of the head 6 with respect to the direction of displacement of the panels 5 which is shown by the arrows F1.

The reference plane P is in this case provided on the head 6 itself, the flat and smooth lower face of which forms the stop against which the application face is to be constantly held, for all the successive panels 5 having the same thickness.

In order to avoid any disruption and a fortiori any obstacle to the displacement of the panels 5, the head 6 has a rear transverse step 9 of rounded shape.

The transverse force is obtained by means of a bearing roller 10 which forms an active part and which is mounted idling on an axle 11 located at the end of a lever 12 connected to a base 13 which is mounted to move in a pivoting manner between two positions.

In FIG. 2, the lever 12 is in the active position, that is to say the base 13 has been driven (by a mechanism of known type which is not shown) in a pivoting manner in the direction of arrow F2 so that the roller 10 is elastically but securely applied against the lower face of the panels 5 (FIG. 2), whereas in FIG. 3 the base 13 has been driven in a pivoting manner in the opposite direction so that the roller is in a withdrawn position, that is to say is away from the spot where the lower face of the panels 5 is to be located.

With these arrangements, the stop 7 and the active part 10 are located on either side of the course of the panels 5.

The alternating pivoting movements of the lever 12 and of the base 13, for bringing the roller 10 into the active position and into the withdrawn position, are coordinated with the position of the various panels 5 so that the roller 10 exerts a transverse force on the lower face of each panel 5 as soon as the latter arrives at the head 6 and for as long as it is present at this location, and so that this roller 10 is moved away when there is no panel 5 at the head 6, as is the case during each interval which separates said successive panels 5.

This transverse force must not be confused with the simple bearing of the panels 5 on banal members of the machine, such as cylinders or belts, since in this latter case there is no strong elastic force located in a precise manner and calibrated against a reference plane but rather a simple, non-rigid and very imprecise bearing simply on account of the material forming these belts or the manually controlled position of the tensioning rollers.

In FIG. 4, it can be seen how the method of the invention is no longer applied to panels 5 that are separate from one another but rather to a single support formed by a strip 15 of indefinite length, shown here as being a long sheet of corrugated cardboard, on the manufacturing machine or "corrugator" itself, downstream of the elements which are specific to the manufacture of the double-sided corrugated cardboard and which will be described below with reference to FIG. 40.

Here, unlike in the previous embodiment of FIGS. 1 to 3, the stop and the active part are combined to form a single fixed part 16 that is placed transversely.

The transverse force is obtained by virtue of the positioning of the part 16 at a level above that which the continuous strip 15 would occupy without it since, because the latter is very long and flexible, it can be slightly deflected from its normal course so that its natural nerve, exerted by the corrugator on account of the functions of its various mechanical stations, presses it constantly against the upper face of the part 16.

It should be noted that this embodiment is particularly beneficial for use on a corrugator since the length of the strip, its speed which frequently varies and the nature of the means for driving the strip have the effect of striking the strip perpendicular to its plane, and maintaining the tension of the part 16 has the fortunate consequence of attenuating if not suppressing this striking.

In FIG. 4, the upper face of the part 16 is slightly humpbacked so as not to create excessive stresses on the strip 15, adhesive 2 being applied in the vicinity of the part 16 and downstream of the latter with respect to the direction of displacement of the continuous strip 15, indicated by arrow F1.

In FIG. 5, an application head 6 is located at the part 16 but, since the latter is inelastic and fixed, the distance D1 which separates the level of the orifice 4 from the plane P must be able to be adjusted precisely so as to be able to use strips of corrugated cardboard of different thickness. For a given type of corrugated cardboard, the distance D1 is adjusted once and for all, and checked and where necessary rectified periodically.

The upstream 17 and downstream 18 transverse faces of the part 16 are rounded so as to facilitate the displacement of the continuous strip 15.

The use of long-acting adhesive applies particularly well to containers intended for dispatching articles by post or parcel service but also relates to all types of application which require two elements to be joined by an adhesive, even a long time after the latter has been applied to one of these elements.

It is known that only an adhesive makes it possible to join two elements in an inviolable manner, in particular so as to maintain the volume and close a container obtained by folding a previously cut and grooved preform.

"Inviolable" does not mean that it is impossible to separate the assembled elements but rather means that said elements cannot be separated without leaving visible traces indicating the fraud. This is because if opening thereof is fraudulently forced, it is necessary that this violation, far from remaining unnoticeable, should on the contrary be revealed by a visible deterioration of the container, that is to say by a marked tearing of the fibers when the support is made of fibrous material, which is the case in respect of paper and cardboard (corrugated or otherwise).

Moreover, it is desired that these traces remain apparent even if an attempt is made to reassemble the separated elements, since the adhesive is to remain inoperative or at least very mediocre and in this way prevent the original invisible closure from being reestablished as this would cover up the fraud.

This is particularly the case in respect of containers supplied flat in the form of sometimes partially preassembly preforms, and which users use one by one to place therein articles that are to be dispatched. Following closure, any accidental opening of the container during handling and transport is to be avoided.

Systems with tab closures which are inviolable by nature and involve the presence of increased thicknesses and relief parts which can be easily caught and torn, in particular on transporters in sorting centers and in transport containers, have been excluded.

All the closure means which are supposed to be inviolable and are used with these tab systems prove illusory since they can be easily foiled when the principle of dissimulation on which they are based is known.

The surface irregularities of the supports which are to receive long-acting adhesive can be compensated by markedly increasing the thickness of the adhesive so as to oblige it by pressure to penetrate partially into the irregularities of the support against which an outer element is to be fixed.

This is the case of prefabricated plinths made of wood or synthetic material, one face of which is decorative and the other face of which, designed to be fixed to a wall, receives one or more very thick beads of long-acting adhesive, covered in a fairly imprecise manner with silicone-coated paper.

It will be understood that this elementary solution leads to high cost prices and does not necessarily give good results since fixing remains rough and imprecise. This is because the thickness of the beads of adhesive does not make it possible to obtain long reels of transfer tape because the diameter of these reels would exceed the limits imposed by industrial requirements.

It is also possible to keep the same thickness of adhesive but to increase its width, although this leads to the abovementioned drawback: increased cost price.

In order to overcome this drawback, use is made of double-sided adhesive transfer tapes, the elastic base of which is supposed to compensate for the irregularities of the support; however, double-sided tapes are more complicated to manufacture than standard transfer tapes and are thus much more expensive.

In the field of packaging, and above all in respect of containers designed for dispatching articles by post and parcel service, it is essential to ensure a secure closure of each container, which is why precautions are taken by using very wide tapes and/or elastic-base tapes. This then results in a high cost price.

The method for separately applying long-acting adhesive and a protective tape described above does not overcome all the drawbacks encountered in practice, on account of the very great diversity of the supports that can be used.

Some supports have a surface that is very even by nature: sheets of paper, parts made of wood and sheets made of rigid synthetic materials with a smooth surface, compact cardboard, etc.

Moreover, some of these natural supports which are specially treated, particularly with kaolin or varnish, have a surface which makes them fairly unable to retain adhesive.

This is apparently a paradox but the Applicant has observed a surprising phenomenon which is explained below.

Experience shows that, once the two elements have been fixed to one another by the adhesive inserted there between, it is difficult to take them apart even by exerting a strong but short force, which leads one to think that the fixing is effective and definitive.

Now, if the elements thus joined are left waiting, they can be unstuck from one another as soon as they are subjected to a weak but permanent force.

This is precisely the case of boxes made of corrugated cardboard for dispatching articles by post or parcel service, closure of which is obtained by long-acting adhesive inserted between two flaps folded over on one another by folding the cardboard.

This is because folding has to be easy and the line along which the flaps have to be folded is marked in advance, during manufacture of the preform, using a "creasing rule" which is a blade which is not sharp and is integrated into the cutting mold and which, being of smaller height than the cutting blades, makes only a simple groove, that is to say a mark that does not pass all the way through.

Even if the cardboard is hard, that is to say of good quality, the grooving should not weaken the board too much since the closed container would then risk opening up during handling by cutting along the groove line which after folding forms a sharp edge of the container.

The result of this is that, with the current knowledge of the person skilled in the art and with the known techniques, it is preferable that the cardboard remains virtually intact in terms of its mechanical strength and that it retains some tension even if the consequence of this is to constantly return the cardboard to its primitive flat position by stressing the flaps towards their open position.

It is because this spring force of the cardboard is retained that the amount of adhesive is increased, to the detriment of the cost price.

The long-acting adhesive, in turn, always retains a certain elasticity precisely because it is designed not to solidify. This then produces a "chewing gum effect" which is manifested by a slow unsticking of the adhesive by threads which stretch and weaken the join by unsticking one by one in an imperceptible but inescapable manner, particularly as a function of time and the ambient temperature.

This phenomenon can easily be seen with a piece of chewing gum which has fallen onto the ground and in which one steps involuntarily: it is virtually impossible for it to become entirely unstuck both from the pavement and from the sole of one's shoe other than by dissolving it chemically; it does however stretch and, while not being able to become unstuck, would be incapable of behaving as a resistant adhesive that is to keep two elements one against the other. It should be noted that, on cardboard preforms, these threads detach until the opening force overcomes the binding force and the flaps unfold suddenly once they have slightly pivoted with respect to one another while opening, by exerting a traction on the extendable threads of adhesive, knowing that this adhesive is subject to the sum of the opening forces of the two flaps since one pushes the other in the same direction along a resultant directed in the direction in which they move apart.

There are three methods for understanding the strength of an adhesive, depending on the manner of exerting an unsticking force:

- in pure traction:
  - two opposing linear traction forces directed perpendicular to the stuck surfaces are exerted,
- in shear:
  - two opposing linear traction forces directed parallel to the stuck surfaces are exerted,
- by peeling:
  - a single traction force is exerted which is oblique with respect to the stuck surfaces, that is to say one pulls on one of the surfaces by lifting it and pulling it at the same time from one end to the other. This is a type of tearing.

The greatest resistance to unsticking is exerted in shear and in pure traction, whereas under the same conditions the lowest resistance is exerted upon peeling.

In other words, if the greatest resistance becomes weak, the stuck parts become dissociated easily.

Now, the chewing gum effect takes place precisely under the conditions of pure traction and at each point of the stuck surface. In other words, the force is irresistible because it attacks the core itself of the adhesive and the place where its presence is indispensable: unsticking becomes inevitable.

Thus, this unsticking force is exerted through surfaces brought together, transversely to the bead of adhesive and over the entire length thereof, with an effectiveness that is unfortunately much greater than that of a force of manual peeling which is localized and transient.

The peeling force developed by hand is relatively weak because it is exerted counter to the length of the bead over tens of centimeters of resistance, whereas the natural opening force is exerted counter to the width of the bead, over only two or three centimeters, and over the entire length.

The problem which arises is therefore not only that of the quality of the adhesive but also that of the capacity of the support to securely retain the adhesive applied against it, whether this support be the application surface or the destination surface.

Here, the word "support" signifies an element which is to be associated with the adhesive: application surface, destination surface or protective tape.

Nevertheless, the parameters of adhesion between the adhesive and the protective tape are different from those of the adhesion between the adhesive and the elements that are to be joined since in the first case the protective tape can be removed and fixing can be only temporary since it is necessary to be able to remove it easily whereas, by contrast, the fixing of the elements by the adhesive inserted therebetween has to be definitive and irreversible.

Nevertheless, there is always the same problem of the retention of the adhesive.

There are two habitual phases for obtaining a support for a long-acting adhesive, carried out one after the other in any order:

- secure and definitive fixing of the long-acting adhesive to the application surface,
- light and temporary securing of one face of the protective tape and the adhesive.

According to one variant, the phases are the other way round:

- light and temporary securing of one face of the protective tape and the adhesive,
- secure and definitive fixing of the long-acting adhesive to the application surface.

There are two phases for joining two elements:

- easy removal of the protective tape,
- secure and definitive fixing of the same long-acting adhesive to the destination surface, without separation from the application surface.

The invention recommends a method which makes it possible to obtain a new solution for carrying out these various phases, either by using a prefabricated transfer tape or by manufacturing the tape in situ, as required, by applying the long-acting adhesive directly to the support and covering this adhesive with the protective tape.

This method consists in providing a support with adhesive retention qualities that it currently does not have, account being taken of the characteristics of the raw materials used.

For example, postal services and parcel services use boxes to which volume is given one by one, according to dispatch requirements. To do this, dispatch offices have preforms which are supplied flat so as to take up the minimum amount of storage space and which are sometimes partially assembled by partial folding and gluing of tabs or by joining two adjacent walls edge to edge with a definitively stuck tape.

The tab is folded and glued in the factory, during manufacture of the preform from blanks made of corrugated cardboard, using high-performance industrial means which make it possible, in particular, to use a hot or cold liquid glue which impregnates the receiving cardboard and also the cardboard which is folded and bent onto it before it solidifies.

It is known that corrugated cardboard of the "double-sided" type comprises three sheets of paper: two flat outer sheets and one corrugated central sheet so as to form grooves which space apart and make rigid the two outer sheets which are glued to the grooves.

It was recalled above that some corrugated cardboards have papers of different quality, in particular a sheet of ordinary quality which is to form the lower face of the products subsequently manufactured, and a sheet of better quality for forming the other face which is opposite the first, designed to form the visible part of these products. The central corrugated sheet is itself also selected as a function of the desired aim which in this case is the desired mechanical strength.

In order to give it a shiny appearance, the paper manufactured with whitened pulp may be improved by adding a product, often kaolin, which gives the white paper a glazed appearance. This method makes it possible to obtain a paper known as a "coated paper", that is to say coated with a layer of a product.

Experience shows that long-acting adhesive applied to an element having such a surface adheres very well thereto, and that another element applied to the adhesive fixed to the first seems to be impossible to unstick when a peeling action is exerted thereon, namely a high traction, as has been explained above.

It is found therefore that smooth and flat surfaces or even glazed surfaces very poorly retain the long-acting adhesive not only when it is applied to a single surface but when it is inserted between two surfaces to join them and keep them held together for a long time and despite the separation forces that occur.

The joined elements being brought together by folding the cardboard, the latter permanently stresses these elements in the direction of their separation and constantly returns them to their original position on account of the "nerve" of the cardboard, that is to say on account of its memory which is connected to its folding counter to its elastic nature, as has been explained above.

FIGS. 6 to 9 illustrate the phenomenon of unsticking which the invention is aiming to overcome.

Figure 6:
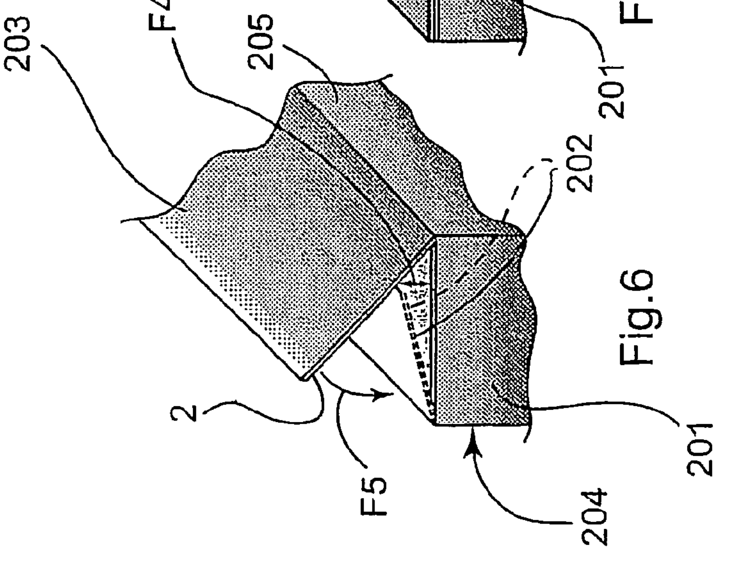
FIG. 6 is a partial schematic view showing the closure of a container by folding two hinged flaps, one of which bears long-acting adhesive.

FIG. 6 shows a box, the body 201 of which is closed by means of two flaps 202 and 203 which are folded over on one another by pivoting along fold lines 204 and 205. The upper flap 203 bears a long-acting adhesive 2 which was covered with a protective tape, not shown on account of the fact that it has been removed to unmask the adhesive 2.

Once the flap 202 has been folded in the direction of arrow F4, the flap 203 is folded over onto the latter in the direction of arrow F5.

Figure 7:
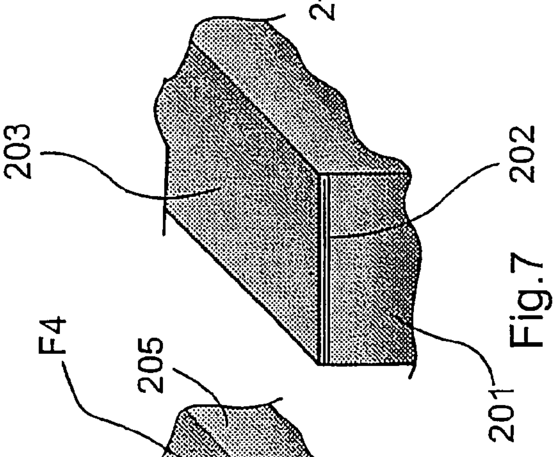
FIG. 7 is a schematic view of the container of FIG. 1 after it has been closed.

The adhesive 2 fixes to the flap 202 and the box is closed, as shown in FIG. 7.

The nerve of the cardboard constantly forces straightening of the flap 202 in the direction of arrow F6 and pushes the flap 203 in the direction of arrow F7, thus adding its action to that which is intrinsic to the nerve of the flap 203.

Figure 8:
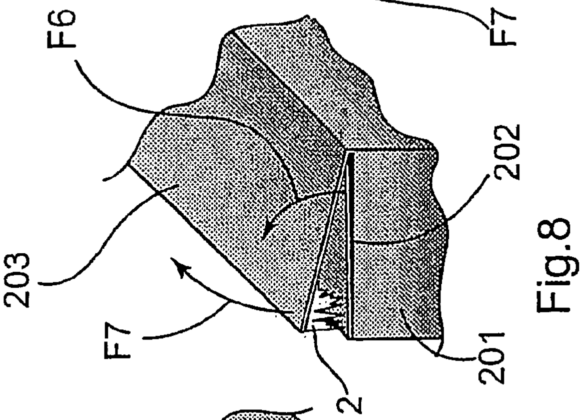
FIG. 8 shows the "chewing gum effect" and the start of stretching of the adhesive as a result of the combined action of the two flaps subjected to a return force returning them to the original flat position.

It follows that if the upper face of the flap 202, which is the destination surface, is not very sensitive to the sticking of the adhesive 2 and if, moreover, the user does not exert a strong manual pressure on the flap 203 upon closure, the adhesive 2 stretches like chewing gum, as shown in FIG. 8.

Figure 9:
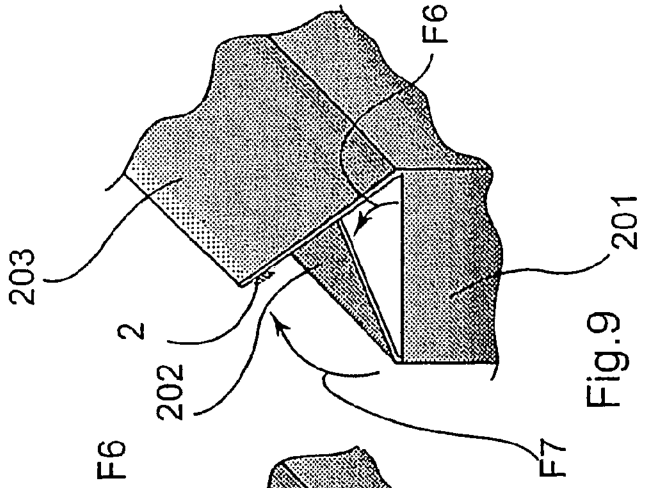
FIG. 9 shows the sudden opening of the container when the opening force exceeds the retaining force of the adhesive.

The adhesive 2 having been placed in the factory on the flap 203, which is the application surface, this being carried out hot and using industrial means, it adheres much better to the flap 203 than to the flap 202 and, once it has stretched and come unstuck little by little from the flap 202, its resistance becomes less than the straightening force of the flaps 202 and 203, so that the box opens all of a sudden, as shown in FIG. 9.

It can therefore be seen that there are only a few traces of adhesive 2 on the destination surface of the flap 202 and that the adhesive 2 has for the most part, sometimes entirely, remained fixed to the flap 203.

Currently, no treatment is carried out either to the paper or to the cardboard or to the protective tape or even to the adhesive 2 which remains a product known only to manufacturers specializing in glues and adhesives.

According to the prior art, in order to obtain the desired result with a high probability of success, that is to say while undergoing only very rare accidental incidences of unsticking, it is known only to increase the amount of adhesive in terms of thickness and/or width, which leads to high cost prices.

The method of the present invention aims to lower this cost price by increasing the ease of retention over time of the elements that are brought together, by virtue of which it is possible to obtain a very effective action of the long-acting adhesive 2 which can be used in much smaller amounts.

To do this, action is taken on the support, part of which will form either the application surface or the destination surface or both, which means that action may be taken only on the surface finish of the support or on its entire structure.

When acting on the surface finish, the operation may be carried out before, during or after forming the complete support. When corrugated cardboard is used, it is possible to carry out a treatment of the original paper that is to form at least one of the two faces of this corrugated cardboard, or even to carry out a treatment of the pulp from which the paper is to be made.

The most probable specific situation is that of treating the already formed support, namely the sheets, panels or preforms cut from corrugated cardboard.

This is the case in particular of corrugated cardboard, at least one face of which is coated. It will be recalled that this coating is generally obtained by means of kaolin or titanium, or an equivalent mixture, forming a barrier layer which, inserted between the fibers of the bare paper and the adhesive 2 that is to be deposited thereon, opposes the penetration of the adhesive 2 into the fibers of the paper and therefore its strong adhesion, regardless of whether this involves the application surface or the destination surface.

Referring now to FIGS. 10 to 14, there can be seen an example of embodiment of an actual box.

Figure 10:
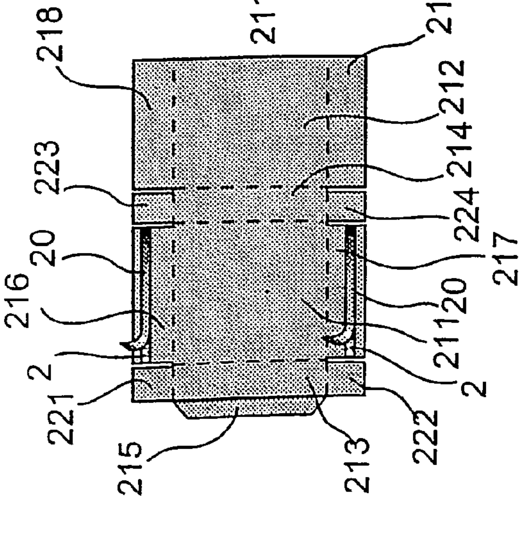
FIG. 10 is a schematic plan view of a flat container blank, cut and grooved for the purpose of giving volume to a container, in this case a box, designed for dispatching articles contained therein by post or parcel service, to which blank there is to be applied long-acting adhesive and a protective tape.

From a sheet of corrugated cardboard there is cut the blank of FIG. 10 which shows the inner face of the sheet and which is usually made of paper of poorer quality than that of the paper of the opposite face (outer face) which, in this FIG. 10, is the hidden face. The hidden face is moreover often treated so as to have an excellent appearance, in particular of white color, and bears printed writing and graphics.

The blank of FIG. 10 has two large panels 211 and 212, two transverse walls 213 and 214 and one gluing tab 215.

The large panels 211 and 212 are secured to side walls 216-217 and 218-219, and the transverse walls 213 and 214 are secured to connecting tabs 221-222 and 223 224. The inner face of the side walls 216 and 217 bears a segment of long-acting adhesive 2 covered with a protective tape 20. The part of these walls 216 and 217 which receives the adhesive 2 forms the application surface.

Figure 11:
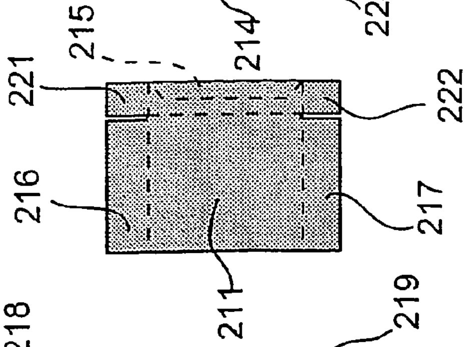
FIG. 11 is a schematic plan view of a preform made from the blank of FIG. 10, once the latter has been folded in two and fixed by glue disposed on an assembly tab.

Moreover, glue (not visible in the drawing) is applied to the gluing tab 215 and/or under the large panel 212 and then the blank is folded transversely on itself to produce the preform of FIG. 11 which forms the object that is supplied and stored flat and is ready to form a three-dimensional box.

Figure 12:
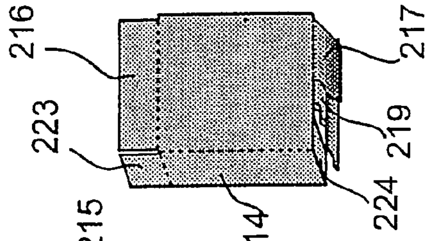
FIG. 12 is a schematic perspective view of a box to which volume is currently being given, from the preform of FIG. 11.

To do this, the preform of FIG. 11 is developed into a parallelogram, then the protective tape 20 is removed from the side wall 217, then the connecting tabs 222 and 224 are folded, then the side wall 219 is folded over onto the tabs 222 and 224, then the side wall 217 is folded over onto the side wall 219 and this wall 217 is pressed quite hard with the hand so as to secure the two walls 217 and 219 by means of the long-acting adhesive 2 (FIG. 12).

Figure 13:
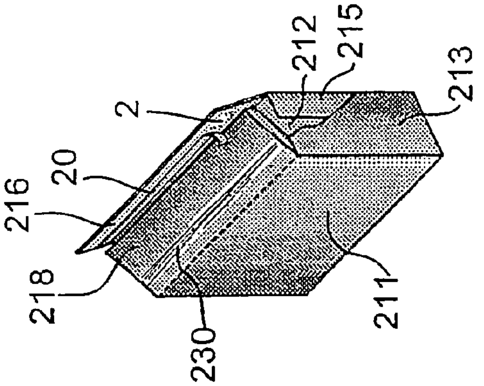
FIG. 13 is a schematic perspective view of the box of FIG. 12, to which volume has been given and which is ready to be closed by long-acting adhesive.

The box of FIG. 13 is thus obtained, which is still open by its small face formed by the walls 216 and 218, opposite the small face formed by the walls 217 and 219 which have been closed by the adhesive 2. It is then possible to place into the box the articles that are to be packaged and then, in the same way as explained above, the protective tape 20 is removed from the side wall 216, then the connecting tabs 221 and 223 are folded, then the side wall 218 is folded over onto the tabs 221 and 223, then the side wall 216 is folded over onto the side wall 218 and this wall 216 is pressed quite hard so as to secure the two walls 216 and 218 by means of the long-acting adhesive 2 (FIG. 13).

Figure 14:
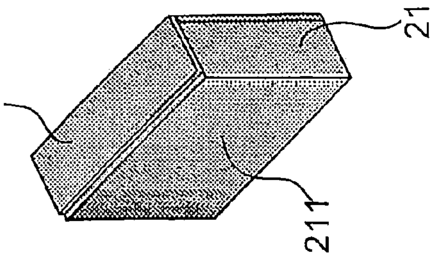
FIG. 14 is a schematic perspective view of the box of FIGS. 12 and 13 after closure and ready for transport but exposed to the risk of accidental opening if it is not treated according to the present invention.

The box of FIG. 14 is thus obtained, said box being ready to dispatch.

The outer face of the walls 218 and 219 forms the destination surface since it is the one that receives the inner face of the walls 216 and 217 with the interposition of the long-acting adhesive 2 (FIGS. 12 and 13).

According to the invention, a specific treatment is carried out which, in the example of FIGS. 10 to 14, is localized on the destination surface, that is to say the outer face of the walls 218 and 219.

For the sake of clarity of the drawing, the destination surface of the wall 219 is not shown but in FIG. 13 the traces left by a physical operation such as scratching, as will be described in more detail below, have been shown by the reference 230.

The effect of this operation is to make the destination surface more able to retain the adhesive 2 so as to prevent accidental opening of the box as has been explained with reference to FIGS. 6 to 9, so that the closed box of FIG. 14 can be dispatched securely without any other precaution and can even receive articles that are heavier than those usually accepted with this type of container.

After manufacture in the factory of the preform shown in FIG. 11, the latter is delivered to a place of use where it can remain for a relatively long period of time prior to being used, under random conditions which may vary from one place to another, in terms of the atmospheric conditions of the place of storage: humidity, temperature, amount of dust, etc.

The adhesive 2 being protected by the tape 20, it does not suffer too much from poor storage conditions, while the critical surface is the destination surface which remains bare and exposed. In order to keep the preforms in good condition, it is therefore useful to treat this destination surface, for example so as to make it anti-static with a view to preventing the deposition and retention of dust, and more generally to carry out an anti-dust treatment, for example by means of a product sprayed onto this destination surface, and/or to carry out a wiping of this surface just prior to removing the protective tape and applying the adhesive 2 to said destination surface.

It is also possible to mask at least part of the destination surface by means of a removable tape which may be identical or similar to the protective tape 20, that is to say weakly adhesive, and secured by means of a very small amount of adhesive deposited on the destination surface.

This particular tape may be marked and bear writing relating to the need for it to be removed in order to close the container produced from the preform and/or relating to a particular guarantee of good adhesion and thus of an inviolable closure of high quality.

It is necessary to underline the fact that tests have shown that the adhesive retention qualities of a rough destination surface are less degraded by dust than a very smooth destination surface, which is why the properties of a very smooth destination surface are improved by scratching or any other treatment suitable for making it rougher.

It may happen in practice that the application surface, in this case the inner face of the walls 216 and 217, and the long-acting adhesive 2 are coordinated in a fairly unsatisfactory manner, which may lead to poor closing of the containers, that is to say to a risk of accidental opening.

In this case, it is necessary to treat the application surface (inner face) in addition to or instead of the destination surface (outer face).

Figure 15:
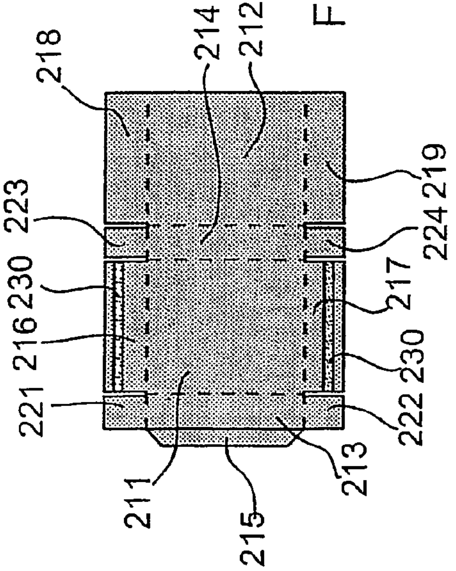
FIG. 15 is a blank identical to that of FIG. 10 and treated according to the invention, before application of long-acting adhesive, and which is then to form a preform analogous to that of FIG. 11 and then a box analogous to that of FIGS. 11 and 12, without any risk of accidental opening.

This is what has been shown in FIG. 15, which shows the blank of FIG. 10 prior to application of the long-acting adhesive 2 and after a treatment such as scratching which leaves traces 230 on the inner face of the two walls 216 and 217.

Of course, the treatment of these walls may not be strictly localized as shown, but rather may concern the entire surface of the walls 216 and 217 or even the entire surface of the blank.

FIGS. 16 to 20 show another example of application of the invention, no longer to a box of fixed volume but to an envelope of variable height which is capable of being adapted to articles of different thickness, in particular to books of greater or lesser volume and/or to a greater or lesser number of books.

Figure 16:
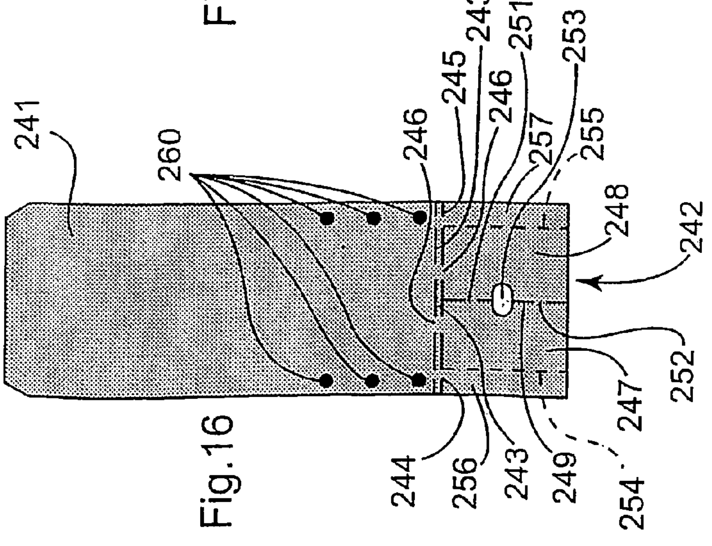

From a sheet of corrugated cardboard there is cut the blank of FIG. 16 which shows the inner face of the sheet and which is usually made of paper of poorer quality than that of the paper of the opposite face (outer face) which, in this FIG. 16, is the hidden face. The hidden face is moreover often treated so as to have an excellent appearance, in particular of white color, and bears printed writing and graphics.

The blank of FIG. 16 comprises two unequal rectangular panels 241 and 242, separated by a transverse line formed of a central slit 243 and two fold lines 244 and 245 located at the ends of the slit 243. In order to ensure tidy and precise folding, the central slit 243 is interrupted by two uncut bridges 246.

The end panel 242 is separated into two flaps 247 and 248 by a longitudinal cutting line 249 that is interrupted by two uncut bridges 251 and 252 which secure the two flaps 247 and 248 and by a central opening 253, the purpose of which is explained below.

The flaps 247 and 248 have two longitudinal fold lines 254 and 255 defining two side lips 256 and 257.

Spots of glue 260 are placed along the longitudinal margins of the panel 241 over a length corresponding to that of the panel 242, then the panel 242 is folded over onto the panel 241, they are pressed together and fixed to one another by virtue of the spots of glue 260 which join the panel 241 and the lips 256 and 257.

Along the transverse edge of the panel 241 opposite the end panel 242, and over the entire width of the latter, there is applied long-acting adhesive 2 which is covered with a protective tape 20, the margin of the panel 241 that receives this adhesive 2 forming the application surface.

Figure 17:
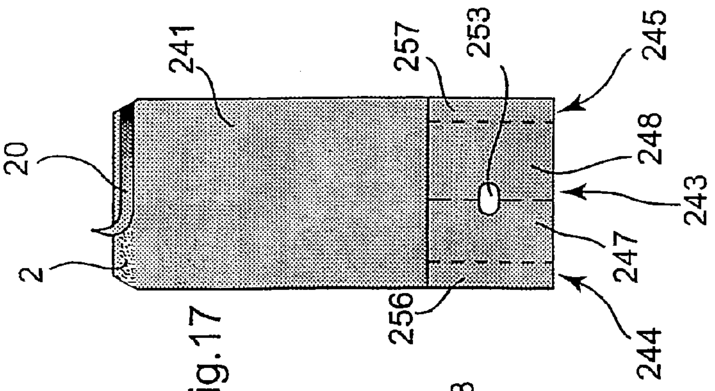

After folding the blank of FIG. 16, gluing the lips 256 and 257 and applying adhesive 2 and tape 20, the preform of FIG. 17 is obtained which forms the object that is supplied and stored flat and forms an envelope that is ready for use.

Figure 18:
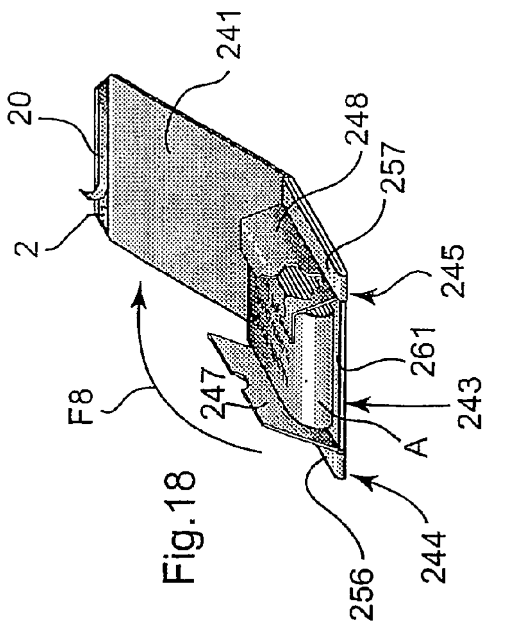
FIGS. 16 to 20 are schematic views of a container of known type, allowing packaging of objects of various heights, and which has to be kept in volume and closed by long-acting adhesive.

To do this, the user places a finger into the central opening 253 and pulls sharply on the flaps 247 and 248 so as to break the bridges 251 and 252 and straighten said flaps 247 and 248 (FIG. 18).

This uncovers the part of the panel 241 which was covered by the flaps 247 and 248 which forms a base 261 for receiving articles that are to be packaged, such as a single book A shown in FIG. 18.

The flaps 247 and 248 are then folded over onto the book A and they fold precisely along the edges of the book A so that their free ends press perfectly against the upper face of this book A.

Figure 19:
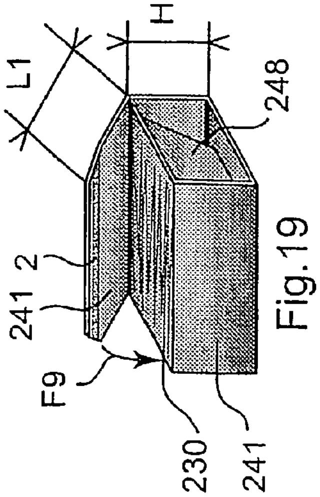

While keeping these ends against the book A, the assembly consisting of the base 261, the book A and the folded flaps 247 and 248 is turned over onto the panel 241 in the direction of arrow F8, the panel 241 folding transversely precisely in line with the ends of the side lips 256 and 257, then, once the protective tape 20 has been removed, the free end of the panel 241 is folded in the direction of arrow F9 of FIG. 19, which shows both the application surface bearing the adhesive 2 and the destination surface formed by the outer face of the base 261.

The dimensions of the outer face of the base 261 are precisely known since they correspond to those of the end panel 242. On the other hand, the length L1 of the free end of the panel 241 is not known since it depends on the height H, the latter itself being a function of the thickness of the packaged articles. Consequently, it is not known at which point exactly the adhesive 2 will be applied to the outer face of the base 261 and the destination surface that has to be treated cannot be located precisely.

In the examples of FIGS. 10 to 14, on the other hand, the place where the destination surface is located is known precisely even before volume is given to the box and the articles to be packaged are placed therein, since the box has invariable dimensions, although this is not the case, by definition, in respect of an envelope with variable height.

This is why the treatment of the destination surface has to extend over the entire outer face of the base 261 or, more precisely, between extreme limits which correspond on the one hand to the case where, in respect of a surface sufficient to ensure effective closure of the container, the length L1 of the free end of the panel 241 would be too small, and on the other hand to the case where the packaged article would be very thin, in which case the height H is virtually zero and the free end of the panel 241 covers virtually the entire surface of said outer face of the base 261.

In FIG. 19, reference 230 shows the trace of the treatment of this outer face and it is understood that the tool which has left this trace had a useful length that was a little smaller than that of the base 261.

In practice, it is simpler to treat the entire surface and the benefit offered by the invention of making it possible to choose the treatment means, in particular depending on the extent of the surface to be covered, can be seen here.

Figure 20:
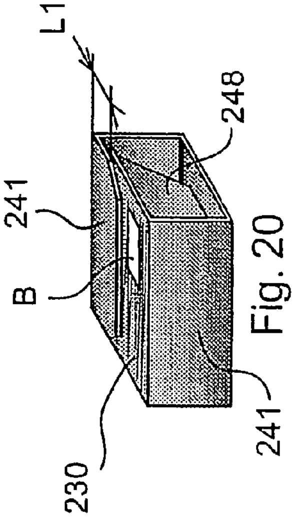

Once the free end of the panel 241 has been folded over onto the outer face of the base 261, pressure is applied strongly by the hand to this free end in order to securely press the adhesive 2 onto the destination surface, and the filled and closed container of FIG. 20 is obtained which is ready to be dispatched.

A self-adhesive label B bearing the name and address of the addressee is optionally fixed to the container, either on the top or on the free end of the panel 241 or even on the outer face of the base 261 depending on the length L1. Self-adhesive labels do not tend to come unstuck and they adhere perfectly well to corrugated cardboard which may or may not be treated, so that they do not require the presence of treatment traces 230, but it will be understood of course that this treatment, even if it is not necessary, cannot be a disadvantage because in all cases it improves the adhesion capability. As stated above, the treatment may consist in a physical operation such as scratching, as will be described in more detail below.

The effect of this operation is to make the destination surface more able to retain the adhesive 2 so as to prevent accidental opening of the container as has been explained with reference to FIGS. 6 to 9, so that the closed container of FIG. 20 can be dispatched securely without any other precaution and can even receive articles that are heavier than those usually accepted with this type of container.

It may happen in practice that the application surface, in this case the margin of the free end of the panel 241, and the long-acting adhesive 2 are coordinated in a fairly unsatisfactory manner, which may lead to poor closing of the containers, that is to say to a risk of accidental opening.

In this case, it is necessary to treat the application surface (inner face) in addition to or instead of the destination surface (outer face).

Figure 21:
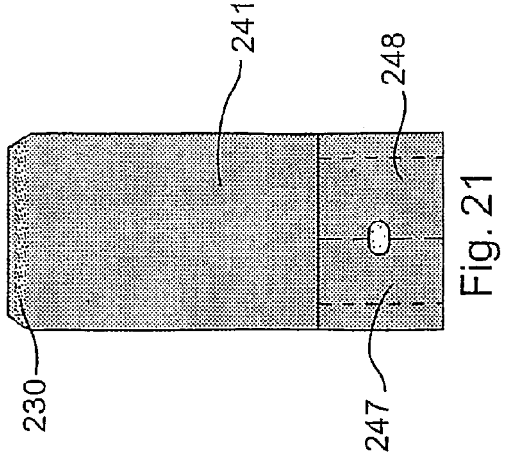
FIG. 21 is a preform analogous to that of FIG. 17 which is to form a container analogous to that of FIGS. 18 to 20 but without any risk of accidental opening since it has been treated according to the invention, prior to application of long-acting adhesive.

This is what has been shown in FIG. 21, which shows the preform of FIG. 17 prior to application of the long-acting adhesive 2 and after a treatment such as scratching which leaves traces 230 on the inner face of the panel 241.

Of course, the treatment of this margin may not be localized as shown in FIG. 21, but rather may concern a large part or even all of the inner face of the blank.

FIGS. 22 to 35 illustrate the way in which this method is carried out:

On a machine 300 having a conveyor 301, panels of corrugated cardboard 5 are made to circulate in the direction of arrow F1 so that they successively pass a number of assemblies which are, in the order in which they are passed:

- an assembly 400 designed to mechanically treat one or more parts of the panels that are intended to form application surfaces, and to suck up and remove the waste produced by this treatment;
- an assembly 500 for applying the long-acting adhesive 2;
- an assembly 600 comprising one or more reels of protective tape 20 and the means for placing it on top of the long-acting adhesive 2;
- an assembly 700 provided to crush, at least slightly, through the protective tape 20, the previously applied adhesive 2.

The assembly 400 comprises a mechanical member for scratching at least part of the upper face of the panels 5. This mechanical member is in this case a brush 401 that is driven in rotation by means of a motor 402 by a transmission 403 of any type suitable for this function.

It would be possible to conceive that the direction of rotation of the brush 401 must be the anticlockwise direction, arrow F10, when the direction of displacement of the panels 5 is that of arrow F1. In fact, this direction of rotation depends on a number of parameters: surface finish and drive speed of the panels 5, power of the drive means, etc.

Depending on the circumstances, one may then be led to choose the anticlockwise direction, in which case it is necessary to adopt a rotation speed such that the tangential speed in the zone of contact with the panels 5 is different from the travel speed of the latter, as a result of which the desired erosion effect would not be obtained.

In any case, the brush 401 causes fine particles to be removed at the surface, which particles should preferably be trapped and removed, although this is not indispensable, and in this case this is obtained by means of a suction device 404 connected to a mouth 405 by one or more tubes 406 and a collector 407.

During operation, the fine particles are sucked up through the mouth 405 and, via the tube(s) 406 and the collector 407, arrive at the suction device 404, from where they are removed by any means known to the person skilled in the art.

Downstream of the assembly 400, in the direction of travel of the arrow F1, the panels 5 therefore have part of their surface suitably treated for receiving the adhesive 2.

The latter is stored in a reservoir or "melting machine" 1 which is equipped with heating means (not shown) suitable for melting the adhesive 2 to a temperature at which it is malleable, that is to say in a fluid state close to the liquid state, and which is equipped with one or more tubes 3 which end at one or more orifices 4 that open out immediately above the panels 5. As explained above, the tube 3 may be insulated by a sleeve 501 which makes it possible to maintain the temperature of the adhesive 2 up to the immediate vicinity of the application surface on the panels 5.

The orifices 4 may be of different types depending on whether a single bead of adhesive 2 or a number of beads is/are to be deposited onto the panels 5, depending on whether the adhesive 2 is to be deposited in particular by gravity alone or spread. Each orifice 4 may therefore be formed by a simple nozzle (FIGS. 22 and 23) or by a "lipped nozzle" (not shown).

The adhesive 2 arrives hot on the application surface of the panels 5 and cools rapidly so as to end up in a pasty state in which it is still malleable and by virtue of which it adheres sufficiently to the panels 5 so that the latter entrain it in their displacement in the direction of arrow F1, in the form of one or more beads.

The panels 5 and the adhesive 2 that they bear arrive at the assembly 600, which comprises one or more reels 22 bearing a great length of protective tape 20 which passes an application mechanism 601 that tensions, guides and distributes the protective tape 20 just above the bead of adhesive 2, to which it adheres slightly.

The panels 5, the adhesive 2 and the protective tape 20 that they bear arrive at the assembly 700, which comprises the roller 21, the axle of which is borne by a mounting 701 connected to the piston of a hydraulic ram 702.

The piston of the ram 702 is mounted to move vertically in the direction of arrow F1 so as to make it possible to adjust as precisely as possible to position in space of the lower generatrix of the roller 21, since it is advantageous if the bead of adhesive 2 is not crushed inconsiderately but calendered to a precise calibrated thickness so that its upper face and the protective tape 20 layered thereon are in a plane parallel to the plane P and at a height h of the latter that is sufficient to fill the cavities that appear on the surface on account of the grooves of the corrugated cardboard and, at the same time, to cover the reliefs that alternate with the cavities (see FIGS. 15 and 16).

Of course, if the surface finish of the panels 5 is excellent, the adhesive 2 may be applied less carefully but nevertheless at the risk of a mediocre application of the adhesive 2 which tends to deposit more on the reliefs than in the cavities, which greatly reduces the surface covered with adhesive and thus degrades the adhesion capability.

FIGS. 24 to 35 schematically show, in four variants of the method, the operations of the machine 300, considered respectively after the assembly 500, at the assembly 600 and after the assembly 700.

FIGS. 24 to 26 correspond to the variant in which an orifice 4 delivers the adhesive 2 from top to bottom in a vertical flow 801 which is deposited on the panel 5 and extends horizontally in a single bead 802. It can be seen in FIG. 24 that the bead 802, considered immediately after its arrival on the panel 5, still has very substantially the same cross section as that of the flow 801, that is to say in this case a circular cross section.

After a few seconds of displacement in the direction of arrow F1 beyond the orifice 4, the bead of adhesive 802 has slightly subsided and its cross section is flattened with a lower flattened portion applied to the panel 5 and an upper flattened portion 803 on which the protective tape 20 is placed along a contact surface that is much greater than there would have been with the sole upper generatrix of a bead 802 with a circular section.

The protective tape 20 thus adheres to the bead 802 sufficiently strongly for it to be entrained in the displacement of the panel 5 and towed in unwinding from the reel 22, especially if it is also drawn by the roller 21.

As mentioned above, the roller 21 is located at a specific height that is less than the total thickness of the bead of adhesive 802 which has already been flattened and the protective tape 20, so that the assembly is pressed and the bead 802 becomes a flat layer 804 having a thickness that is precisely calibrated and having the same width as the tape 20 (FIG. 26).

Referring now to FIGS. 27 to 29, another variant can be seen in which the adhesive 2 is distributed in several (in this case four) flows 805 which thus form distinct beads 806.

This variant allows better adhesion of the adhesive 2 to the panels 5 and of the protective tape 20 to the adhesive 2, since the protective tape 20 is placed over all the distinct beads of adhesive 806, that is to say in this case four strips, whereas with the variant of FIGS. 24 to 26 the same protective tape 20 was placed over just a single strip. The final result is the same if a pressure is applied to the adhesive 2-protective tape 20 assembly by means of the roller 21, and FIG. 29 is identical to FIG. 26.

However, it is also possible to exert only a low pressure, designed either to increase the area of the flattened portion 803 of the single bead 802 or to slightly flatten the four beads 806.

In this case, there is no formation of a flat layer 804 but rather simply of a slight flattening of the beads 806 which remain separate under the protective tape 20 at the exit from the machine 300 (FIGS. 30 to 32).

A pressure, however slight, is useful so that the protective tape 20 adheres to the adhesive 2, but it may prove to be superfluous if the nature of the adhesive 2 and the material of the protective tape 20 are well coordinated to fix to one another with a force that is great enough for the adhesive 2 to entrain the protective tape 20 along the machine 300 and small enough for it to be possible to subsequently separate them from one another when it is desired to remove the protective tape 20 so as to unmask the adhesive 2.

Referring now to FIGS. 33 to 35, a variant of the method of the invention can be seen in which the adhesive 2 is not deposited by gravity, from top to bottom, onto the upper face of the panels 5, but rather by projection from bottom to top onto the lower face of the panels 5, in this case forming five distinct beads 807.

In order not to overload the drawing, the orifices of the application device have not been shown since the embodiment of this device is per se known to the person skilled in the art, knowing that these orifices are located at the end of application heads, the outlet orifice of which is to be oriented from bottom to top. As regards the adhesive 2, this must have a viscosity suitable for this mode of application by projection and be made to move at a pressure and at a speed that are correctly coordinated for immediate fixing to the lower face of the panels 5.

This variant is possible on account of the low specific mass of each bead 807 and is to be adopted when the manufacturing conditions thus require.

This is the case, in particular, when the adhesive 2 is applied on a corrugator, as shown in the diagram of FIG. 40.

This is because it may happen that the distribution of the various layers of paper (upper paper, corrugated paper of the grooves, lower paper) and also the cutting of the blanks for certain objects have the consequence that the application surface, which at the end of manufacture will be located on the lower face of the blank of FIGS. 10 and 16 for example, is the lower sheet of paper of the corrugated cardboard being manufactured on the corrugator of FIG. 40.

At present, these circumstances make it very difficult to apply long-acting adhesive, unlike the method of the invention which has just been described.

The machine 300 of FIG. 22 may be of various types, either a specific machine whose sole purpose is to apply adhesive 2 and a protective tape 20 to panels of corrugated cardboard that have been cut into rectangles for the purpose of subsequently cutting out blanks, or to blanks or preforms that have already been cut, or a machine having other functions: machine for folding and collecting cut blanks, cutting press, printing machine, machine for applying assembling tape which is known in the United States under the generic name of "taper", etc.

It will thus be understood that the assemblies 400, 500, 600 and optionally 700 may be considered as subassemblies which are grouped together to form a whole, which itself forms a large assembly that is complementary to an existing machine or a machine that is specially designed for this purpose.

The method according to the invention therefore has various specific applications, each corresponding to precise functions of a chain for sequentially manufacturing products in steps, or on the contrary corresponding to a complex unit that incorporates the device of the invention described with respect to FIG. 22 along with other functions. The only operation common to all the machines is the displacement of the support (the panels 5 of FIG. 22) that is to receive the adhesive 2 and the protective tape 20, hence the need for a conveyor of the type 301 of the machine 300, and also materialization of the reference plane P.

FIG. 36 schematically shows a specific machine 900 whose sole purpose is to apply adhesive 2 and a protective tape 20 to panels 5 that have been cut into rectangles and are intended to then be cut into blanks having a shape and dimensions corresponding to the objects that are to be obtained. Two examples of such blanks are shown in FIGS. 10 and 16.

Moreover, some blanks have to be formed and "mounted" so as to be shaped into preforms having folded and glued parts, which is the case in respect of the preforms of FIGS. 11 and 17.

The machine 900 comprises a frame 901 that is associated with two conveyors 301, each having an endless belt passing over drive pulleys 902, guide pulleys 903 and tensioning pulleys 904, so as to obtain an upper strand 905 which extends in a same plane located opposite the lower strand of the endless belts 906, the upper strand 905 and the lower strand of the belts 906 being arranged to as to together entrain, by strong friction, the panels 5 inserted between them.

The conveyors 301 are made to move in the direction of arrow F1 in respect of the upper strand 905, by a motor 907 and a transmission 908 with the interposition of a clutch 909. For the sake of clarity of the drawing, the mechanical elements which provide the connection between the transmission 908 and the drive pulleys 902 have not been shown.

Upstream of the frame 901, considering the direction of arrow F1, there is a device 910 for receiving a stock of stacked panels 5 and distributing these panels 5 one by one, this device being known as a "feeder".

The feeder 910 comprises an inclined support 911, an endless belt conveyor 912 and a distribution regulator 913.

The feeder 910 and the operation thereof will not be described in any greater detail as they are well known to the person skilled in the art.

Downstream of the frame 901, considering the direction of the arrow F1, there is a device 920 for receiving and superposing the panels 5 on top of one another once they have each received the long-acting adhesive 2 and the protective tape 20. This device is known as a "stacker" since it receives the panels 5 one by one and stacks them on top of one another.

An endless belt conveyor 921 has a lower end 922 located in the immediate vicinity of the downstream end of the upper strand 905 and below the level of the latter so that the panels 5 automatically pass from the strand 905 to the upper strand 923 of the conveyor 921 which entrains them in the direction of arrow F12.

The conveyor 921 is inclined and its upper end 924 is located in the immediate vicinity of a support 925 mounted to move with respect to fixed columns 926. As the stack of panels 5 increases in height at a given rate and until it corresponds to a total number of panels 5, the support 925 lowers so that the level at which the panels 5 are deposited by the conveyor 921 remains more or less constant.

When the support has reached the bottom position, the number of panels 5 has reached the maximum possible number and the entire stack is evacuated, the support 925 is brought back to the top position and the cycle is repeated.

The stacker 920 and the mode of operation thereof will not be described in any more detail since they are well known to the person skilled in the art.

In FIG. 37, the mechanical member of the assembly 400 is a brush which is driven in rotation in the anticlockwise direction and which, by scratching, removes at the surface particles extracted from a more or less thick layer of the upper face of each panel 5, and which leaves a trace 230 which can be seen more or less easily with the naked eye or using a magnifying optical instrument.

A mechanical treatment of the application surface is thus obtained upstream of the assembly 500 for applying adhesive 2.

FIG. 38 schematically shows another example of an assembly 400 having an active member which does not remove material from the panels 5 but rather deposits on their upper face a corrective product which leaves a trace 230 that can be seen more or less easily depending on its composition.

For example, the product may have a chemical composition which allows it to act on the material of the panels 5, in particular by reacting with the kaolin which covers the upper face, so as to create an application surface that is able to strongly attach to the adhesive 2 deposited by the assembly 500.

Such a product may be a water-based glue for example.

The product is stored in a reservoir (not shown) from where there comes a tube 408 equipped with a lipped nozzle 409 which distributes the product horizontally and in a fine layer.

FIG. 39 schematically shows an assembly 400 which makes it possible to apply an electric treatment to the panels 5.

This assembly 400 comprises a high-frequency current generator 410 comprising two connections 411 and 412 for two electrodes 413 and 414 positioned on either side of the course of the panels 5.

When the generator 410 is operating, it causes the formation of a strong electric field which is passed through by the panels 5 circulating the in direction of arrow F1.

This electric field causes microsparks, which is why this method is known as "spark erosion", said sparks creating miniscule burns on the paper forming the upper and lower faces of the panels 5, thus allowing the formation of microperforations which are invisible to the naked eye and the size of which has been exaggerated in FIG. 39 in order to make it easier to understand this mode of operation applied to supports that are to receive a long-acting adhesive 2.

By virtue of these microperforations on the application surface, the adhesive 2, which is hot and virtually liquid, penetrates slightly into the thickness of the panels 5 and in any case enough to attach strongly thereto.

It should be noted that, the electrodes 413 and 414 being symmetrical, the microperforations are located on both the faces of the panels 5, which may be of great advantage for preparing the application surface on any one of these faces when such an assembly 400 is located upstream of a machine which applies the adhesive 2, since it is not necessary to mark the face that is to have the application surface.

It will be recalled that, although the operations of the assemblies 500 and 600 are necessarily grouped together and synchronized, the same is not true in respect of the operations of the assembly 400 which may take place in isolation and a great way upstream of the application of the adhesive in the overall manufacturing process.

Thus, referring now to FIG. 40, there can be seen the functional diagram of a corrugator, that is to say of a machine which produces a continuous strip of corrugated cardboard from sheets of paper on reels.

It is known that it is possible to manufacture various types of corrugated cardboard using one and the same machine: a strip of corrugated paper alone, a corrugated sheet and a single sheet of paper ("single-sided"), a corrugated strip between two sheets of paper ("double-sided"), an alternating arrangement of papers and corrugated sheets ("double-double"), etc.

In order to illustrate the invention applied to a corrugator, the example of manufacturing "double-sided" has been selected, this being the most conventional corrugated cardboard product, although it will be recalled that the invention applies to any type of support, not only those made of all the possible types of corrugated cardboard but also those made of compact cardboard and similar materials.

The corrugator 1000 of FIG. 40 comprises a frame (not shown) associated with an endless belt conveyor 301 which transfers, in the direction of arrow F1, a sheet of indefinite length coming from the assembly by bonding three sheets of paper 1001, 1002 and 1003 stored in reels of great length 1004, 1005 and 1006.

The sheet of paper 1001 passes between two groove-forming rollers 1007 and 1008 which create transverse grooves to produce a corrugated strip 1009.

The sheets of paper 1002 and 1003 pass over guide rollers 1010 and 1011 so that they come alongside the grooved sheet 1009 on either side and are fixed to said grooved sheet by gluing so as to form a strip of corrugated cardboard 1012 of indefinite length and, so to speak, endless since, as soon as a reel 1004 and/or 1005 and/or 1006 is empty, it is replaced by another reel and the end of one sheet and the start of the next sheet are glued to one another so as to allow continuous production, without stopping the machine.

Since corrugators are well known per se, the person skilled in the art knows that the sheets of paper, prior to being glued, have to be conditioned or preconditioned, in particular humidified and vapor-heated, and that the corrugator must have tensioning, guiding, drying, cooling, and speed-regulating means that are coordinated to form a whole.

All the functions of the corrugator are controlled by computer using preset programs that are commonly used. There is thus no need to describe in detail all the elements which make up a complete and working corrugator.

As soon as the strip of corrugated cardboard 1012 is formed, it is engaged on the conveyor 301 and, after a course of greater or lesser length depending on the technical requirements to which reference was made above, the strip 1012 arrives at the assembly 400, which is shown in FIG. 40 as being of the type shown in FIGS. 1 and 22.

Following appropriate treatment, the strip of corrugated cardboard 1012 ends up at the assembly 500 which applies one or more beads of adhesive 2, as explained with reference to FIGS. 24 to 35, then at the assembly 600 which places a protective tape 20 on the adhesive 2 that has already been applied.

The corrugator produces a strip 1012 that is very wide, around 2.5 meters, and the products which are best suited to the presence of long-acting adhesive 2 are cut from sheets which are much less wide. This is why the assembly 400 is made up of a number of members 401, a number of mouths 405 and a number of tubes 406 formed as subassemblies, the position of which can be adjusted via the corrugator 1000 so as to position as many subassemblies as necessary a given distance from the edges of the strip 1012, in order to apply to this strip 1012 the desired number of lines of adhesive 2: beads 802 or 806 and tape 20 to application surfaces created beforehand.

It will be understood that adhesive 2 and its protective tape 20 can be deposited continuously by a corrugator if the products produced from the strip 1012 are to be provided with adhesive over their entire width or their entire length, from edge to edge, in which case the bead of adhesive 2 and the protective tape 20 are continuous.

The strip 1012 then arrives at the outlet of the machine where there is a cutting assembly of a type known per se.

This assembly cuts the strip 1012 both transversely, as shown by a blade 1013 mounted to move perpendicular to the plane of the strip 1012 in the direction of arrow F13, and longitudinally by means of cutting disks mounted to rotate with respect to supports, the position of which can be transversely adjusted as a function of the widths which are imposed by the production program, which takes account of the desired formats for the products to be manufactured from the sheets obtained at the outlet of the corrugator 1000. These means, their mode of operation and the control thereof do not form part of the present invention and are known to the person skilled in the art.

By depositing the adhesive 2 and its protective tape 20 on a corrugator, many advantages are obtained:

- sequential or continuous application of the prior treatment (assembly 400), of the application of adhesive 2 (assembly 500) and of the application of tape 20 (assembly 600),
- supply of the transformation machines with products that have already been prepared, work sometimes obscured, taking up at the corrugator outlet being inevitable, even with products that are not provided with adhesive 2, no need to take up products and transfer them from machine to machine, high speed of production, economy of production costs, etc.

Once the strip 1012 has been cut by the cutting assembly 1013, panels 5 are collected which are evacuated to a stacker 1020 by an outlet conveyor 1021, the whole functioning as described with reference to FIG. 36 since the product which leaves the corrugator 1000 is of the same nature as that which leaves the machine 900: panels 5.

It can be seen from the above description that the elements placed against one another are held together very effectively by means of the long-acting adhesive.

This result is obtained despite the counterforces due to the nerve of the cardboard when the object is formed from blanks and from preforms made from sheets.

An additional means recommended by the invention is to reduce the force which counters the effects of the long-acting adhesive 2, and to do so in two ways which can be combined:

It is known that when the two elements that are to be joined by the long-acting adhesive 2 are flaps that are to be positioned by folding and placing them on top of one another along lines, the latter are formed at levels that are not aligned so that, after folding and placement, the folding line of the top flap is higher than that of the bottom flap.

This distance must in theory be exactly equal to the thickness of the bottom flap. According to the invention, this distance is established as being greater than normal, so that the top flap may be slightly inclined towards the bottom flap and not strictly parallel and even less inclined in the other direction.

Likewise, when the two elements that are to be joined by the long-acting adhesive 2 are flaps that are to be positioned by folding along lines, it was recalled above that this folding must be easy and that the line along which the flaps are to be folded is marked in advance, during manufacture of the preform, by means of a creasing rule which is a blade that is not sharp and is integrated into the cutting mold and which, being of smaller height than the cutting blades, makes only a simple groove, that is to say a mark that does not pass all the way through.

According to the invention, these lines are formed by perforations which pass through the material forming the flaps and which are separated by solid parts.

The groove-forming tools are therefore formed by an alternating arrangement of creasing rules and cutting blades and there are more or less cutting blades depending on the nerve of the cardboard that it is desired to cut and, in any case, weaken.

The cutting blades may be simple stamps, in which case there must be more of them than there are blades whose cutting thread may extend not only over a single point but rather over a small length.

As the long-acting adhesive 2 is designed to be used a greater or lesser length of time after it has been applied to the application surface, it is active as soon as it is applied and remains so for a long time, so that it has to be covered with protective tape 20 which can easily be removed at the time of use of the adhesive 2 and which neutralizes the latter so as to avoid any accidental bonding, in particular when the support to which the adhesive 2 is applied is handled or subjected to mechanical treatments in machines, as is the case in respect of panels made of cardboard, particularly corrugated cardboard, for producing containers: printing, cutting, folding, assembly, etc.

It will be understood that a cardboard panel introduced into a machine while the adhesive 2 that it bears is active and not isolated by the protective tape 20 will cause expensive disturbances in respect of the time it takes to make the machine work again and in respect of production losses.

The parts of the machine are smeared with the adhesive 2, the cardboard panel is violently thrown off its normal course, fragments attached to the panel are introduced into difficultly accessible spots and, moreover, it is necessary to immediately stop the machine, clean it and set it working again after a repair time of greater or lesser length depending on the characteristics of the machine, without taking account of the losses of material due to this sudden stop.

The use of containers made of cardboard provided with long-acting adhesive is rapidly expanding on account of the many advantages offered by such an adhesive: in particular easy closure and inviolability.

It is thus inevitable that long-acting adhesive is applied on machines that are very different from one another and are increasingly complex since such an adhesive 2 is already applied on corrugators (FIG. 40) which have a very large production capacity, operate at high speed and are extremely complex since the process starts with reels of paper which are very delicate to handle and then the various sheets of paper have to be heated and humidified, glue has to be applied in order to assemble one or more corrugated sheets to at least one flat sheet, the whole requiring an installation of several tens of meters in length, equipped with powerful motors and associated with delicate mechanisms.

There is therefore no question of taking the slightest risk of an incident due to the application of adhesive on a corrugator. However, such a risk is no less serious in respect of less important machines such as folding-collecting machines for example.

The precautions that are currently taken consist essentially in particularly vigilant monitoring of the protective tape distributors in order to avoid any interruption in the laying thereof.

By prudence, a method is also adopted which consists in applying the adhesive 2 and its protective tape 20 on a specific machine that produces panels 5 bearing this adhesive 2 and its protective tape 20 which are then treated on a folding-collecting machine.

The latter, which itself carries out a complex industrial process, is kept away from any incident during application of the adhesive 2 since it only receives cardboard panels 5 or preforms, the adhesive 2 of which has already been correctly provided with its protective tape 20.

If such an incident occurs, the consequences are slight since repair of the machine is limited to manually removing one or more panels 5, and recommencing the application of adhesive 2 and the laying of protective tape 20. While the machine is stopped, the panels 5 that are to be treated remain in place at the start of the machine, stationary since they are not undergoing any treatment, unlike in the case of applying treatment at the inlet of a corrugator for example.

In any case, regardless of the machine in question, it is necessary to anticipate incidents and to remedy them quickly and effectively if such an incident should occur despite the precautions taken.

The present invention makes it possible to apply adhesive 2 to any support, on a pre-existing machine or on a specially designed machine, regardless of the complexity of the industrial process used and regardless of the severity of an incident relating to the application of a long-acting adhesive 2 and its protective tape 20.

Referring to FIG. 41, there can be seen a machine part treating a support which is in this case made of corrugated cardboard, and which may thus be a corrugator, a folding-collecting machine or a specific machine.

It can be seen that a sheet of corrugated cardboard, which has already been produced and may be continuous or cut into panels, moves in the direction of arrow F1 and firstly passes below a device 500 for applying adhesive 2, said device comprising a reservoir 1, a tube 3 and a distribution orifice 4, and then passes below a device 600 for applying a protective tape 20, said device comprising a storage reel 22 turning in the direction of arrow F14 when the protective tape 20 is unwound normally, a deposition mechanism 601 and a pressure roller 21 by means of which the tape 20 is applied firmly against the adhesive 2, extending or not over the part of the support that is not provided with adhesive, at the sides and/or at the ends of the bead of adhesive 2. In this way, there is applied to the corrugated cardboard support a bead of long-acting adhesive 2 and a protective tape 20 which completely isolates the adhesive 2 and prevents it from adhering to anything.

The support thus produced continues on its course through the machine, during which it comes into contact with various mechanical members: cylinders, guides, sensors, cutting devices, stackers, pressers, etc.

All these machine parts remain intact on account of the fact that the adhesive 2 is completely isolated by means of the tape 20, the thickness of the assembly being small and taken into account during machine settings where necessary.

In order to monitor that these operations are being carried out correctly, a detection circuit is set up which is symbolized by reference 1040 and in this case comprises:

- a pair of photoelectric cells 1041-1042 and a conductor 1043 for monitoring the integrity of the support and/or its transverse cuts;
- a pair of photoelectric cells 1044-1045 and a conductor 1046 for monitoring the correct arrival of adhesive 2 on the support;
- a pair of photoelectric cells 1047-1048 and a conductor 1049 for monitoring the effective presence of protective tape 20.

The conductors 1043, 1046 and 1049 terminate at a controller 1050 which may be more or less complex, comprising a computer and management software, connected to an alarm 1051 and comprising a connection 1052 when the controller 1050 is to not only trigger the alarm 1051 but also to automatically control the entry into operation of a safety device when an incident occurs.

In FIG. 42, it can be seen that the support is intact and that it therefore continues its course in the direction of arrow F1, that the adhesive 2 is still arriving and being deposited on the support and that the protective tape 20 has been broken so that the support is entraining uncovered adhesive 2 with it.

It is this situation which could cause a disaster downstream (considering the direction of arrow F1) of the assembly 600 and which the invention makes it possible to rule out.

To do this, the adhesive 2 which has already been applied to the support and which might continue to arrive from the reservoir 1 via the tube 3 and the distribution orifice 4 is made inoperative so that it has no effect on the various components of a machine located downstream of the assembly 600.

According to a first embodiment, the adhesive 2 which has already been applied is lifted off, the verb "lift off" being adopted deliberately to signify that the adhesive 2 has to be removed completely, firmly and immediately, it being possible for the slightest spot of adhesive 2 not covered with protective tape 20 to have extremely serious consequences.

In FIGS. 43 and 44, it can be seen that the lifting off consists in sacrificing the corrugated cardboard support by cutting it, which is obviously much more advantageous than introducing uncovered long-acting adhesive 2 into a machine.

According to the variant embodiment of FIG. 43, the upper part of the support is removed, that is to say the sheet of paper 32 primitively stuck to the sheet of corrugated paper 34, the latter itself being stuck to a lower sheet of paper 33.

It would be satisfactory to strictly only remove the adhesive 2 but, since the smallest fraction of adhesive 2 remains dangerous, it is illusory with the means currently available to hope to keep the support intact while removing all the adhesive 2. It is more prudent, at the expense of sacrificing a certain length of support, to cut it in the direction of its height so that its lower cut fraction **34*b* remains stuck to the lower sheet 33 and continues on its normal course whereas its upper fraction 34*a* remains stuck to the upper sheet 32 which bears the adhesive 2, these three secured elements: fraction 34*b*, upper sheet 32 and adhesive 2 are evacuated together so as to be eliminated. A rectangle M schematically shows the set of components, apparatuses and parts which make up the entire machine part located downstream of the assembly 600 for applying long-acting adhesive 2**.

For this lifting-off operation, there is shown in FIG. 43 a safety device 1060, the essential element of which is a blade 1061 mounted to pivot, as shown by arrow F15, on a horizontal axle 1062 between an active position in which it cuts the corrugated cardboard support and a waiting position shown in dashed line in which it is away from the course of said support, which is the normal operating situation, implying correct laying of the protective tape 20.

The blade 1061 may be fixed or mobile, and is formed for example by a rotating disk, the periphery of which is sharp so as to have high cutting effectiveness and, being arranged in an inclined plane, it serves as a ramp to the assembly 2-32-**34*b* which is directed towards a tube 1063 associated with a suction mechanism (not shown) which terminates at a receptacle 1064** used for the temporary storage of the waste prior to elimination thereof.

In practice, the blade 1061 has to be provided with protection making it possible to avoid an accident to the body due to its dangerous nature.

As soon as the photoelectric cells 1047 and 1048 are no longer masked by the protective tape 20, the controller 1050 activates the alarm 1051 so as to urgently warn the staff monitoring the machine.

It is possible that the safety device 1060 is placed quite far from the assembly 600 for applying the protective tape 20 and/or that the speed of travel of the support gives the staff the time required to activate the safety device 1060.

However, it is more advantageous to make this activation automatic, in which case the device 1060 has to be consequently equipped, which is within the capability of the person skilled in the art and which is therefore neither shown nor described here. The triggering member, which may be a circuit breaker, an electrovalve, etc. is actuated by the controller 1050 and the electrical connection 1052.

According to the variant embodiment of FIG. 44, where the same elements as those in FIG. 43 bear the same references, the support is cut perpendicular to its faces 32 and 33, and right through.

To do this, the safety device 1060 comprises one or more rotating disks 1065 having a cutting periphery and being mounted on at least one lever 1066 which is mounted to pivot, as shown by arrow F16, on a horizontal axle 1067 between an active position in which the lever 1066 is lowered and in which the disk or disks 1065 are driven in rotation in the direction of arrow F17, passing through the entire thickness of the support, and a waiting position shown in dashed line in which the lowest point of the disks 1065 is located markedly above the support, the adhesive 2 and the protective tape 20.

With reference to the explanations given in relation to FIG. 43, it will be understood that the safety device 1060 is set in operation manually or automatically by lowering the lever 1066 and setting the disks 1065 in rotation as soon as the controller 1050 receives the signal from the photoelectric cells 1047 and 1048.

If the bead of adhesive 2 is located close to a longitudinal edge of the support, it is sufficient if there is a single disk 1065 located at an imaginary line of the support, parallel to this longitudinal edge and located on this side of it, for cutting a margin of the support that is much wider than the bead of adhesive 2, so as to remove with certainty the entire width of this bead 2.

If the bead of adhesive 2 is far from the longitudinal edges of the support, two parallel disks 1065 are used so as to cut a strip, the edges of which are located on either side of the bead of adhesive 2, quite far from it, so as to remove with certainty the entire width of this bead 2.

When the invention is applied to a corrugator, it is possible to transversely juxtapose a number of devices for applying adhesive 2 and as many devices for applying protective tape 20 since the width of the strip may be several meters whereas the articles that are to be cut from this strip are much narrower, which implies the application of several parallel beads of adhesive 2 and, therefore, the application of as many protective tapes 20.

In this case, it is necessary to provide as many pairs of disks 1065 as there are beads of adhesive 2, since it is obviously not possible to know in advance on which line an incident will occur.

Regardless of whether it is a question of a margin or a strip or a number of strips, they are all denoted by the reference 1014 and it can be seen that they are, individually or together, sucked up into the tube 1063 in order to end up at the receptacle 1064.

According to another embodiment of the invention, the sacrifice of the support already provided with adhesive 2 is avoided by placing onto the support a material element which goes beyond the protective tape 2 so as to neutralize its effects prior to introduction into the assembly M of this support bearing the uncovered adhesive 2.

In FIG. 45, in which the same elements as in FIGS. 43 and 44 bear the same references, it can be seen that the machine is provided with a safety device 1070 which is formed in the same way as a device 600 for applying protective tape 20. In other words, in the event of an incident affecting the device 600, the controller 1050 activates the alarm 1051 and the staff, or an automatic mechanism controlled by the controller 1050 via the line 52, sets the device 1070 in operation, said device acting as substitute for the faulty device 600.

For this purpose, the safety device 1070 is designed to deliver a protective tape 1071 and comprises a reel 1072, a deposition mechanism 1073 and a pressure roller 1074.

It would also be possible for the two assemblies 600 and 1070 to be rigorously equal and to act as perfect substitutes for one another, which would have the advantage of guaranteeing continuous operation even when one of the reels is empty, although this is not an incident in the strict sense.

It is then necessary to have an alert mechanism or automatic synchronization mechanism to ensure that an assembly 600 or 1070 enters into operation as soon as the other, 1070 or 600, becomes unavailable for a normal reason or on account of an operating incident.

However, the two devices 600 and 1070 being necessarily offset longitudinally, the adhesive 2 is not rigorously in the same physical state at the two points where it can receive the protective tape 20, so that attention must be paid to the state of things, in particular by precisely adjusting the viscosity and the siccativity of the adhesive 2, the application temperature, the speed of travel of the support and other parameters that are likely to affect correct application of the protective tape 20-1071 to the adhesive 2.

It is also possible to lay an adhesive covering tape which is applied completely to the adhesive 2 that has already been deposited, regardless of the state of the latter, that is to say independently of its covering tape retention power, said covering tape being fixed to the support and ensuring isolation of the adhesive 2.

However, the entire length of the support thus protected cannot be used normally and, in order to perfectly identify the zone of the support in question, the covering tape may be of a color that is very different from that of the normal protective tape 20.

The devices 600 and 1070 are exactly aligned and positioned longitudinally so that the tape 1071 is applied in time so that no part of adhesive 2, no matter how small, is not provided with protective tape 20, if necessary by covering of the end of the tape 20 with the start of the tape 1071, as shown in the zone 1075.

Referring now to FIG. 46, another embodiment of the invention can be seen in which the material element which is placed on the support in the event of an incident in the application of the protective tape 20 is a chemical product.

Long-acting adhesives which currently exist are inactive or weakly active on silicones, for which reason the protective tape 20 is made of paper, at least one face of which is coated with silicone, or of synthetic material.

Thus, the tape 20 sticks slightly to the adhesive 2, especially when it is pressed by the roller 21 while the adhesive 2 is still quite hot, and can be removed easily when a user subsequently wishes to use the adhesive 2, in particular to keep a container erect and/or to close a container, since this removal practically does not at all oppose the strength while the adhesive 2 is fully active.

This is why, with the means currently known, the chemical product which seems best suited to the implementation of the invention is a product from the silicone family, although this obviously does not exclude other chemical products which could have the effect of completely neutralizing the adhesive 2, it being recalled once more that even the slightest spot of active adhesive 2 is to be excluded.

For this reason, the use of a solvent for the adhesive 2 has been ruled out since its effect is both incomplete and slow, although this will perhaps not always be the case, in which case the invention could be applied with such a product.

Two variants are shown in the same FIG. 46 of one and the same safety device 1080.

According to the first variant, which is the simplest variant, the activation of the alarm 1051 warns the monitoring staff who manually use a portable canister 1081 containing a pressurized silicone-based product 1082 and provided with a valve 1083, so that by acting on the valve 1083, the product 1082 is sprayed onto the uncovered adhesive 2 by the staff themselves who check de visu the end of the correctly applied protective tape 20 and the new arrival of protective tape once the incident has ended, this visual observation ensuring that all the adhesive 2 that had incorrectly been left uncovered has indeed been neutralized by a layer of silicone 1082.

The part of the support which bears the adhesive 2 covered with sprayed silicone 1082 cannot be used since it is no longer possible to remove the silicone-based product 1082 and to use the adhesive 2; however, this part of the support that was affected by the incident can continue its course in the assembly M without causing any damage, which makes it possible for the machine to continue operating without any loss in terms of production.

It goes without saying that the manual use of pressurized "sprays" 1081 does not require any automatic control by the controller 1050 and that the alarm 1051 must be sufficient to alert the staff who are specially trained for this intervention.

The other variant consists in using a reservoir 1084 of greater capacity than a simple pressurized spray 1081, one or more tubes 1085 and one or more fixed ramps 1086 placed transversely to the support over a width corresponding to the zone or zones that is/are to receive adhesive 2.

The spraying of product 1082 is brought about in synchronism with the point where there is no longer any protective tape 20, either manually after the alarm 1051 has been activated or automatically by the controller 1050 and the connection 1052 which, in particular, can bring about the operation of electrovalves (not shown).

It is clear from the above description that the method according to the invention may be incarnated in devices which are different but comparable, the important thing being to neutralize the adhesive 2 which has already been applied to the support or which is continuing to arrive, in order to make it possible for the machines to operate as continuously as possible despite an incident of major importance.

The necessary precision with which the long-acting adhesive 2 is applied in order to subsequently obtain effective fixing of the application surface and the destination surface must be considered not only in terms of distance with respect to the support, by determining a reference plane, but also in terms of the speed at which the protective tape 20 is applied with respect to the support, since there is always a relative movement between these two elements.

This is why it is possible to provide for the pressure roller 21 to be driven by a motor, the speed of which is synchronized with that of the support, so that the protective tape 20 is driven positively at the desired speed.

However, according to the invention, there is a release from the constraints resulting from the inertia of the reel 22 on which the protective tape 20 is stored.

This is because, although the problem of this inertia is always important, it becomes crucial when the long-acting adhesive and the protective tape have to be applied sequentially, that is to say to successive panels 5, and even more so when there are a number of segments of adhesive on each panel 5 since it is necessary to constantly cause the adhesive 2 and protective tape 20 to be applied to each segment and to interrupt the entire operation between these segments and panels, otherwise the adhesive would be spread onto the machine itself and onto inappropriate places.

The mechanical problem is therefore the operation of the application mechanisms, which is alternating and non-continuous.

It will be understood that these difficulties become worse as the application speed increases, said speed being a major economic factor and a constant aim for obtaining competitive cost prices.

According to the invention, action is taken first of all on the driving of the protective tape 20, as shown in a number of variants in FIGS. 47 to 62, to which reference will now be made.

The pressure roller 21 is kinematically connected to drive means, shown schematically in FIGS. 47 to 54 by an electric motor 21*a*, the operation of which is synchronized with the displacement of the panels 5 to which the adhesive 2 and the protective tape 20 is to be applied, so that the operation of the roller 21 is connected on the one hand to the effective presence or absence of a panel 5 at the roller 21 and on the other hand to the speed at which the panels 5 are driven.

However, it is also necessary that the roller 21 drives the protective tape securely and precisely at the start of each segment and that this driving is interrupted between two successive segments.

To do this, the roller 21 has a central part 21*b* of smaller diameter than that of two side parts 21*c* and 21*d*, the half-difference of the diameters being slightly less than the thickness of the protective tape 20.

The two side parts 21*c* and 21*d* are designed to be in contact with the panels 5, bearing against their upper face, which allows a central space to exist between this upper face and the central part 21*b*, the height of which is slightly less than the thickness of the protective tape so that the free end of the latter engaged in this space is driven by friction on the one hand against the central part 21*b* and against the upper face of the panel 5.

These dimensions are very small because, in practice, the central part 21*b* has a diameter of 25 millimeters and the side parts 21*c* and 21*d* have a diameter of 25.02 millimeters, that is to say a difference in diameter of 2 tenths of a millimeter. For the sake of clarity of the drawing, the differences in diameter have been markedly exaggerated so as to better illustrate the particular structure of the roller 21 and the mode of operation thereof.

The side parts 21*c* and 21*d* each form a tread having a width of 7 millimeters, and the central part 21*b* forms a zone for pressing the protective tape 20 having a width of 28 millimeters for a protective tape 20 having a width of 25 millimeters.

In order to make the mode of operation of this device clearer, the various figures show distinct situations whereas in practice there is a rapid chain of actions in which it is not possible to distinguish these various phases. In particular, there must not be any case in which a panel 5 passes beyond the roller 21 without adhesive 2 and without protective tape 20 (FIGS. 49 and 50) or without adhesive and with protective tape 20 (FIGS. 51 and 52). These FIGS. 47 to 53 therefore do not necessarily show actual situations.

In FIGS. 47 and 48, the roller 21 is shown in the situation where there is no panel 5 present and it can be seen that there is a space E1 between the lower generatrix of the side parts 21*c* and 21*d* and the upper face of the conveyor 301 on which the panels 5 should be located in order to be driven.

This situation corresponds to the case where an interval between two successive panels 5 is at the roller 21, so that the motor 21*a* can be stopped. However, given that the roller 21 is not in contact with any element, it may continue to be driven by the motor 21*a*, that is to say it is then running idle.

In FIGS. 49 and 50, it can be seen that a panel 5 has arrived, driven by the conveyor 301, and that the space E1 is entirely filled by the panel 5 so that the treads 21*c* and 21*d* are in contact with the panel 5 and the speed of rotation of the roller 21 has to be set so that its tangential speed is exactly equal to the linear speed of the panels 5, in which case their relative speed is zero.

From the very start of the manufacturing process, the free end of the protective tape 20 has been engaged behind the roller 21, to the right of the central part 21*b*, and, since the difference in the diameters between the treads 21*c*-21*d* and the central part 21*b* is only 2/10ths of a millimeter, the space into which the protective tape 20 is introduced is 1/10th of a millimeter, which is slightly less than the thickness of said protective tape 20, for example 5/10ths of a millimeter.

Consequently, the central part 21*b* of the roller 21 exerts a vertical pressure from top to bottom on the protective tape 20, taken between the rotating roller 21 and the moving panel 5, the fortunate consequence of which is to securely tow the protective tape 20 by overcoming any resistance to advance to which it may be subjected on account of the application mechanism 600 and/or the reel 22.

Shown in FIG. 51 is the long-acting adhesive 2 arriving from the application head 6 via the orifice 4 but before it has reached the roller 21, which once again does not correspond to an actual situation but is useful for breaking down the various movements.

Finally, FIGS. 53 and 54 correspond to reality, namely the application of the long-acting adhesive 2 and the protective tape 20 to a panel 5.

It can be seen that all the elements present are driven positively: the panel 5 is driven by the conveyor 301, the adhesive 2 applied to the panel 5 obviously follows it, and the protective tape 20 is driven both by the panel 5 and by the roller 21.

However, as explained above, the panel 5—adhesive 2—protective tape 20 assembly must be rolled so that the relatively thick bead of adhesive 2 is to be spread laterally, at least partially.

Geometrically speaking, the space of 1/10th of a millimeter is intentionally too small to allow the bead of adhesive 2 and the protective tape 20 to pass, but the roller 21 is allowed a small latitude of displacement in terms of height in the amplitude x visible in FIGS. 53 and 54, that is to say that the roller 21 and its axle are mounted to move vertically, as has already been seen in FIGS. 1 and 22.

The top position of the roller 21 and of its axle can be rigidly fixed by a stop since it is necessary to calibrate as well as possible the total adhesive-protective tape thickness, but experience shows that an elastic vertical force exerted on the axle of the roller 21 is perfectly suitable, which can be obtained by using a pneumatic ram to exert this force, the elasticity of the air being sufficient to allow both sufficient displacement and permanent pressure of the roller 21.

FIG. 55 shows that the central part 21*b* of the roller 21 may be provided with reliefs, in particular knurling, so as to increase its drive coefficient with the protective tape 20.

FIG. 56 shows that the side parts forming treads 21*c* and 21*d* of the roller 21 may be provided with reliefs, in particular knurling, so as to increase their drive coefficient with the upper face of the panels 5.

Of course, one and the same roller 21 may be provided with reliefs both in its central part 21*b* and in its side parts 21*c* and 21*d*.

The reliefs may be of various types, in particular burrs, when the roller 21 is to cooperate with the protective tape 20 and/or with the actual support not only by rolling and friction but also by penetration into the material forming the protective tape 20 or the support.

FIG. 57 shows a variant of the method of the invention in which the protective tape 20 is wider than the bead of adhesive 2 after rolling, which makes it easier to remove the protective tape when it is desired to expose the long-acting adhesive when fixing the application and destination surfaces.

FIG. 58 shows a particular embodiment of the invention in which the protective tape 20 is much wider than the bead of adhesive 2 after rolling, in order that the side margins of this protective tape 20 which go beyond the edges of the bead of adhesive 2 can be inserted between the support and the treads 21*c* and 21*d*, which are then advantageously knurled in order to increase the drive coefficient.

FIG. 59 shows the drive of the roller 21 by a transmission belt acting as a more complex application mechanism 600 which will now be described with reference to FIGS. 60 to 62.

The pressure roller 21 may be made of metal (in particular steel) but may also be made of elastomer, in particular of the type having a structure comprising a peripheral tread and a solid central part, this being made in a single piece with essentially radial, usually curved tongues.

The diameter of the roller 21 may be more or less great, the dimensions given here by way of example not being in any way limiting in nature.

It will be understood that the actual problem that has to be solved is that of faultlessly applying protective tape 20, no tolerance being possible for slipping, swerving or absence of the protective tape relative to the already applied adhesive 2.

However, this adhesive 2 is applied to the support and there is no possibility of displacement of said adhesive 2 relative to the support. Consequently, the piloting of the protective tape 20 may be carried out with reference to the support rather than with reference to the adhesive, since it is easier and more reliable to refer to the support which is a solid material element, the position of which in space is easily determined or determinable, even individually panel 5 by panel 5.

This is why the invention provides a solution that is slightly different from that described above which, it should be recalled, consists in synchronizing the application of the protective tape 20 with the displacement of the panels 5.

This other solution consists in securing to one another the support on the one hand and the protective tape 20 on the other.

To do this, use may be made of an immediate-action glue which is deposited in a small amount (for example a single spot) on the support, in a small zone located close to the point where the protective tape 20 is to come alongside, that is to say close to its free end. This small zone is located close to the transverse edge upstream of each panel 5.

The immediate-action glue deposited on the support may be replaced with a product having affinity with the already deposited adhesive 2, in order to securely fix the protective tape 20 to the adhesive 2 despite the low voluntary adhesion of the silicone-coated face.

In order to implement this method, the machine must be provided with a reservoir and with a tube ending at an outlet orifice forming a device (not shown) for delivering product, immediate-action glue or the like, the practical design of which is within the capability of the person skilled in the art.

When the machine comprises a deposition station for depositing adhesive 2 and a deposition station for depositing protective tape 20, said deposition stations being offset from upstream to downstream with respect to the displacement of the panels 5, the outlet nozzle of the device for delivering product is located between these two stations.

Another solution consists in using the property of the protective tape 20 of having a face that is very insensitive to the adhesive 2, in particular because this face is coated with silicone, and an opposite face which is, on the other hand, sensitive to the adhesive 2, in particular because it is not coated with silicone.

This structure is found in particular with protective tapes made of paper that has been coated with silicone on just one side.

In order to secure the protective tape 20, it is folded transversely close to its free end so as to fold this protective tape 20 back on itself a little in order that, close to its free end, and there alone, the protective tape 20 presents the already deposited adhesive 2 with its face that is sensitive to retention of the latter, by virtue of which the positive fixing of the protective tape 20 to the adhesive 2 already deposited on the support is obtained.

Securing the protective tape 20 to the support, directly or via the adhesive 2, has the advantage of anchoring this protective tape 20, making it possible to tow it at the speed of travel of the panels 5 despite the great force that has to be developed in order to extract it turn by turn from the reel 22, even in rapid sequential operation, subjected to frequent jerks.

In order to synchronize the linear speed of the support and the tangential speed of the roller 21, use may be made of the motor 21*a*, although it is necessary to have a relatively complex and delicate piloting assembly which is a source of breakdown and which requires a minimum of monitoring and maintenance that can be saved by virtue of the method described below.

The application mechanism 600 comprises a mobile rig, the base element of which is a board 2000 mounted to pivot parallel to its plane and connected to the pneumatic ram 80 designed to make it pivot in two opposite directions, for a reason which will be explained below.

Mounted to rotate on the board 2000 are a number of rollers, including one drive roller 2001 designed to enter into contact with the successive panels 5 and to maintain this contact over the entire length of each panel 5. Thus, the linear displacement of the panels 5 by the conveyor of the machine (not visible in FIGS. 60 to 62) has the consequence of placing the drive roller 2001 in rotation.

A movement transmission member, in this case a belt 2002 which may be notched, is engaged in a groove of the drive roller 2001 and in a groove of a guide roller 2003 which at the same time forms the axis of pivoting of the board 2000.

A second belt 2006 engaged in another groove of the same guide roller 2003 is engaged with a groove of the pressure roller 21 (see also FIG. 59), so that the setting in rotation of the drive roller 2001 has the consequence of setting the pressure roller 21 in rotation in the same direction.

The free strand of the protective tape 20 passes over tensioning and guide rollers 2007 and is engaged below the central part 21*b* of the roller 21.

In FIG. 60, a panel 5 is present and the drive roller 2001 is rotating, the ram 80 has been supplied with compressed air so as to bring about the extension of its rod which has made the board 2000 pivot at an angle, the apex of which is in the axis of the guide roller 2003, as shown by arrow F18. The pressure roller 21 is not only also rotating but is moreover lowered until it is in contact with the panel 5 against which it exerts a pressure through the protective tape 20 and the bead of adhesive 2, as described in detail with reference to FIGS. 47 to 54.

In FIG. 61, it can be seen that at the pressure roller 21 there is an interval between two successive panels 5, and the supply to the ram 80 has been reversed so as to make the board 2000 pivot in the opposite direction, at the same angle, as shown by arrow F19, in the direction of raising the pressure roller 21.

It will be noted that the pivoting by a few degrees, in one direction and then in the opposite direction, of the guide roller 2003 has no effect on the transmission of the rotation of the drive roller 2001.

The latter being in contact with the panels 5 downstream of the assembly 500 for applying the adhesive 2, it is necessary for it to be positioned beside the bead of adhesive 2 as seen in FIG. 62 which also shows that, on account of the necessary alignments for the belts 2002 and 2006, the drive roller 2001 has a shaft 2008 of smaller diameter than that of the actual active part that is in contact with the panels 5, in order to be located markedly above the upper level of the bead of adhesive 2.

This mechanism 600 is extremely effective and very simple since the speed of the engaged rollers is always strictly equal to the linear speed of the panels 5, without any possible variation because they all have exactly the same diameter.

The device which has just been described is one example of motorization, which differs from the use of the electric motor 21*a* but which ends up giving the same result which is to move the application roller 21.

Shown in FIG. 63 is one embodiment which makes it possible to suppress the resistance to traction of the protective tape 20, due to the inertia of the reel 22.

This provision is particularly important for the simultaneous sequential application of long-acting adhesive 2 and of protective tape 20, that is to say to panels 5 which are separated by intervals which require that the application be started and stopped alternately at a rhythm which increases as the speed of the machine quickens to produce more. If, by contrast, the application is carried out continuously onto a strip of indefinite length, the problem of the traction of the protective tape 20 is less difficult because once it has been started at the start of the cycle by effective fixing of the end of the protective tape 20, the latter unwinds continuously from the reel and the problem of this type of installation is only that of changing the empty reel for a full reel.

It can be seen in FIG. 63 that an intermediate stock of unwound protective tape is created, which is in the form of long free loops, that is to say that the operation of unwinding from the reel and the application operation are dissociated.

The free strand of the protective tape 20 is engaged between two rollers that are associated to form a pair 2010, at least one of which is kinematically connected to a motor 2011 so as to drive the protective tape 20 to extract itself turn by turn from the reel 22.

After having been towed by the pair of rollers 2010, the free strand of the protective tape 20 is engaged in the inlet 2012 of a parallelepiped receptacle 2013 that is provided, opposite the inlet 2012, with an outlet 2014 via which the free strand of the protective tape 20 is extracted from the receptacle 2013, after which it is conducted by tensioning and guide rollers 2007 to the application mechanism 600 described above.

Inside the receptacle 2013, the protective tape 20 accumulates randomly, that is to say without tight winding, in stacked wide folds, alternately to the left and to the right, without any attachment so as not to oppose any resistance to traction of the protective tape 20 out of the receptacle 2013 via the outlet 2014.

According to the method of applying the protective tape 20 to the support provided with adhesive 2, there is provided between the outlet 2014 and the deposition assembly traction motor means where, as shown, this traction at the outlet of the receptacle 2013 is obtained by the deposition assembly itself, during the pinching action exerted by the pressure roller 21.

When a certain length of protective tape 20 has been extracted from the receptacle 2013, an equivalent length is introduced into the latter via the inlet 2012 in order that there remains in the receptacle 2013 a length of protective tape 20 that is essentially constant.

This introduction of protective tape 20 into the receptacle 2013 via the inlet 2012 is obtained by operating the pair of rollers 2010 by means of the motor 2011 and the power of this motor 2011 is calculated so that it substantially exceeds the resistance to pivoting of the reel 22.

It is thus possible to associate this reel 22 with a motor 2015 for setting in rotation, said motor 2015 being synchronized with the motor 2011 so that they operate in a coordinated manner, providing in particular the tension of the protective tape 20 between the reel 22 and the inlet 2012.

Another solution consists in providing the reel 22 with a braking mechanism 2016 which acts on its rotation axle, which mechanism may be, for example, an electromagnetic brake which functions intermittently to brake the reel 22 when the pair of rollers 2010 is stopped and to release the reel 22 when the motor 2011 is operated so as to drive the pair of rollers 2010.

It is thus possible to make the braking mechanism 2016 operate constantly but at a low braking value so that the traction force on the protective tape 20 is greater than the braking force, which makes it possible to unwind the turns from the reel 22 while ensuring the tension of the protective tape 20 between said reel 22 and the pair of rollers 2010.

In order to prevent any accident that could result from the reel 22 being released while the pair of rollers 2010 are not in a situation where they are driving the protective tape 20, there is a member for monitoring the tension of this protective tape 20.

In this case, this member is a pilot roller 2017 which is positioned such that the protective tape 20 stretched between the reel 22 and the inlet 2012 is necessarily in contact with it.

This pilot roller 2017 is associated with a control mechanism (not shown) which causes either activation of the braking mechanism 2016 or operation of the motor 2011 so as to gather up the slack of the protective tape 20 shown in dashed line in FIG. 63.

The slack of the protective tape 20 has the effect of breaking the contact between the protective tape 20 and the pilot roller 2017, and this event is detected:

- either by ascertaining that the pilot roller 2017 is no longer driven in rotation whereas, at the same time, the reel 22 is released and the pair of rollers 2010 is stopped,
- or by ascertaining that a mobile support (not shown) on which the pilot roller 2017 is mounted to rotate has changed position.

The receptacle 2013 has six faces, two large faces and four small faces, the latter having a width such that the two large faces are separated from one another over a distance that is slightly greater than the width of the protective tape 20, so that the latter can remain in the receptacle 2013 without substantially rubbing against its walls.

In order that the person operating the machine can judge de visu whether the receptacle 2013 does indeed contain a sufficient length of protective tape 20, the walls of this receptacle 2013, and in particular at least one of its two large faces, are transparent.

However, this evaluation by the person operating the machine is not sufficient since it is absolutely necessary to ensure continuous operation of the deposition assembly 600, so that it is necessary to provide automatic monitoring means.

In this case, the choice has been made to measure the weight of the receptacle 2013 containing the desired length of protective tape 20, the receptacle 2013 being placed on a support 2020 which is mounted pivoting on an axle 2021 located close to one of its ends, and which is provided with a suitably preloaded return spring 2022. Close to the end of the support 2020 opposite the first end there is a presence detector 2023 of any known type, in order that the latter can detect the movement of the receptacle 2013 as soon as the action of the return spring 2022 becomes greater than the action of the weight of the receptacle 2013.

As soon as this event occurs, this means that the receptacle 2013 has become lighter, that is to say that a length of protective tape 20 has been extracted via the outlet 2014 and that it is necessary to restock the receptacle 2013 by introducing into the latter a length of protective tape 20 that is equivalent to that which has exited. The detector 2023 then controls the action of the pair of rollers 2010 in order to introduce this missing length of protective tape and controls the stopping of this same pair 2010 as soon as the receptacle 2013 has regained its normal weight, this being detected by the detector 2023.

This mode of operation ensures the continuity of supply of protective tape 20 and guarantees that the correct length of this protective tape 20 is indeed present in the receptacle 2013.

It will be understood that the part of the protec tape 20 which is located in the receptacle 2013 is entirely free and does not oppose any resistance to its almost instantaneous traction and to its immediate stopping, which operations are repeated all the more often as the operating speed of the machine increases.

FIG. 64 shows another embodiment of the invention which also makes provision for suppressing the resistance to traction of the protective tape 20.

With the embodiment of FIG. 63, the inertia is suppressed by virtue of the protective tape 20 being untensioned as it exits the reel 22. In this case, the method consists in cutting the free end of the protective tape 20, which suppresses any direct connection between the traction member (the roller 21) and the reel 22.

As it exits the reel 22, the protective tape 20 passes over a guide roller 2007 before arriving at a precutting assembly 2100.

This assembly 2100 comprises a base 2101 on which there are rotatably mounted four rollers which are grouped into two pairs 2102 and 2103 and of which one of each pair is kinematically connected to a motor 2104-2105.

The two pairs of rollers 2102 and 2103 are arranged on either side of a central cutting mechanism 2106 which consists of a cutting cylinder 2107 kinematically connected to a motor 2108 and of a countercylinder 2109.

Fixed guides 2110 and 2111 are provided on either side of the central mechanism 2106 between the latter and the two pairs of rollers 2102 and 2103, and a fixed guide 2112 is provided between the pair of rollers 2103 and the application assembly which includes the roller 21.

After the guide roller 2007, the free end of the protective tape 20 is engaged between the two rollers of the pair 2102, then in the fixed guide 2110, then between the cutting cylinder 2107 and the countercylinder 2109, then in the fixed guide 2111, then between the two rollers of the pair 2103, then in the fixed guide 2112 and finally below the central part **21*b* of the roller 21**.

In order to ensure the tension of the protective tape 20 as it exits the reel 22, the latter is advantageously provided with a rotating mechanism 2015 or braking mechanism 2016 operating as explained with reference to FIG. 63, that is to say in synchronism with the traction members which in this case are the rollers of the pair 2102.

When the machine is started, the format of the panels 5 which will be used is exactly known, and the length of the segments of protective tape 20 that have to be applied is thus known very precisely.

The rate at which the machine operates is also known, so that the speed at which the protective tape 20 is to travel from the reel 22 to the deposition assembly is known.

Based on these parameters, the speed of rotation of the cutting cylinder 2107 is set so as to pass from the position which it occupies immediately after cutting to that which it must occupy just before a new cutting operation.

The mode of operation of this cutting assembly 2100 is as follows:

The protective tape 20 has been engaged as explained above.

At a given moment, the first cutting takes place by almost instantaneous rotation of the cutting cylinder 2107, which creates a segment which has two free ends and which extends downstream of the cutting mechanism 2106 and upstream of the deposition assembly, engaged between the two rollers of the pair 2103 which displace it until it is pinched by the roller 21, which operates as has already been described.

Thus, when the protective tape 20 is applied to the moving panel 5, it is in the form of a segment that has already been cut, which no longer forms part of the turns of the reel 22 and which, having an insignificant weight, does not oppose any resistance to being placed by the roller 21, all the more so since the segment has a length that is sufficient to still be engaged between the two rollers of the pair 2103 which aid its displacement.

Depending on the length of each segment, the cutting cylinder 2107 is in action more or less often, this data being easily maintained throughout the production of identical products. It can moreover easily be adjusted depending on requirements.

It will nevertheless be noted that the minimum permissible length L2 of a segment is essentially equal to the distance D2 which separates the axles of the rollers of the pair 2103 and the axle of the roller 21 since a shorter segment would no longer be engaged between the rollers of the pair 2103 and nor would it be pinched by the roller 21, so that it would be abandoned without the fixed guide 2112 and would cause the segments behind it to jam.

The method just described differs from a method which has been known for a long time and which consists in applying short or very short segments of protective tape, in particular to envelopes, and which is implemented in four phases:

the protective tape is cut so as to create a free segment, this segment is grasped and kept immobile, stretched in a straight manner, the segment is applied in its place, the segment is released.

It will be noted that there is no prior adjustable measurement because the cutting of the protective tape is carried out by means of a circular template of given diameter, an arc of which gives the length of the segment. For a different length, another circular template must be used.

It is clear from the above description that the invention allows very precise application of a long-acting adhesive, which is either pre-existing on a prefabricated support of the transfer tape type or applied directly to a support immediately upstream of the application of a protective tape, even when the support is not perfectly flat and even, so that this long-acting adhesive can be used a long time after it has been applied, with the same precision, despite random manual operations, by virtue of operations carried out in the factory on a machine.

The quality of the product obtained is accompanied by an additional advantage which is the high speed possible for the industrial machines used, both in continuous operation, of the corrugator type, and in discontinuous (or sequential) operation, of the folding-collecting machine type.

The invention claimed is:

1. A device for depositing an adhesive product onto a support, wherein the adhesive product includes a long-acting adhesive and a removable protective tape for delayed use of the adhesive, said device comprising:

a protective tape supply;

an adhesive supply;

a deposition station coupled to said supplies and configured to dispense the protective tape and the adhesive, said deposition station comprising:

means for delivering the adhesive to the support;

means for delivering the protective tape to the support;

at least one substantially flat rigid part forming a reference plane located substantially parallel to and offset a predetermined distance from a plane formed by an application surface of the support upon which in which adhesive and protective tape are delivered;

a member configured to exert a force in a direction substantially transverse to the surface of the support that receives the adhesive and protective tape thereon, said member comprising a moveable support-engaging active part arranged such that said active part keeps said application surface constantly pressed against said reference plane formed on said rigid part; and means for placing the support into relative movement with said deposition station.

2. The device of claim 1, wherein said rigid part and said member are configured as an assembly comprising a plate arranged transversely to said rigid part over the entire width of the course of the support, and of which one face that forms the active part is located beyond the plane in which one of the two faces of the support is to be located so that the strip is subjected over its entire width to a transverse force due to assembly.

3. The device of claim 1, wherein said rigid part and said member are arranged on opposing sides of the support that passes therebetween.

4. The device of claim 3, wherein said rigid part comprises an immobile stop and the member comprises a lever that is stressed elastically in the direction of the stop, wherein said active part is formed by a roller mounted idling at the end of a lever on said member.

5. The device of claim 4, wherein said lever is connected to a base that is mounted so as to be able to move between a first active position and a second withdrawn position, wherein during said first position, said lever is close enough to the course of the support for said roller to be in contact with one of the faces of said support, and during said second position, said lever is spaced away from its active position.

6. The device of claim 5, wherein said base is associated with an automatic control mechanism that is designed to place said base either in said active position or in said withdrawn position, depending on whether there is a support or an interval between two successive supports opposite said roller.

7. The device of claim 4, wherein said stop is located at the end of a head for applying adhesive at which there terminates a tube for supplying liquid adhesive from the adhesive supply, said head being affanged close to said plane in which one of the faces of the support is to be located.

8. The device of claim 1, wherein a destination surface on the supports defines a surface configured to engage the application surface, the destination surface being insufficiently able to retain said long-acting adhesive when the destination and application surfaces are brought together, said device further comprises means for making at least the destination surface undergo, before it joins the adhesive, at least one of a physical and chemical treatment capable of improving the adhesion through treatment to improve retention of the adhesive.

9. The device of claim 8, wherein said device is equipped with a rough surface which is to be in contact with the support so as to remove from it a surface layer without dissociation of the fibers.

10. The device of claim 8, wherein said device is equipped with a suction mechanism configured to remove waste created by said rough surface.

11. The device of claim 8, wherein said device is equipped with a heat treatment assembly which is to receive at least part of the tape immediately before it is applied to the support.

12. The device of claim 8, further comprising an electric treatment assembly configured to subject at least one of the destination and application surfaces to a high-frequency electric field prior to joining of the surfaces.

13. The device of claim 12, wherein said electric treatment assembly comprises two electrodes that are to generate between them a high-frequency electric field and between which at least one of the surfaces must pass.

14. The device of claim 12, further comprising means for printing the tape, said means being located downstream of said electric treatment assembly in a direction of relative displacement between the support and the printing means.

15. The device of claim 8, further comprising:

an inlet feeder for receiving the support that is in the form of separate stacked, cut panels stacked on said feeder;

a guideway for sequentially guiding the panels; and a transporter terminating in an outlet stacker and cooperative with said guideway to receive the panels, wherein the tape and adhesive supplies comprise a distributor for distributing the tape and adhesive, either alone or already associated in the form of a prefabricated assembly comprising a base, a mechanism for cutting the tape in a manner coordinated with the displacement of the panels so that the tape is cut adjacent opposing transverse ends of each panel, and wherein said means for applying said at least one of a physical and chemical treatment is configured to apply treatment either to the support alone or to both the support and the tape.

16. The device of claim 8, further comprising:

an inlet feeder for receiving the support that is in the form of separate stacked, cut panels;

a guideway for sequentially guiding the panels;

a transporter terminating in an outlet stacker and cooperative with said guideway to receive the panels; and a distributor for distributing the tape and the adhesive, wherein said means for delivering the tape is configured to apply the tape in segments having a length that is no greater than that of each panel, and comprises a mechanism for cutting the tape which is coordinated with the application mechanism for the purpose of cutting the tape into segments that are each located inside the contour of each panel, and wherein said means for applying said at least one of a physical and chemical treatment is configured to apply treatment either to the support alone or to both the support and the tape.

17. The device of claim 8, further comprising a corrugator comprising:

an assembly for forming the support from reels of paper;

a plurality of kinematic members for constantly or intermittently moving a continuous strip formed by the joined rolls;

a guideway for guiding the continuous strip;

an assembly for cutting of the continuous strip so as to create independent sheets; and at least one stacker for stacking the independent sheets, said corrugator configured to cooperate with the operation of said device such that the adhesive is applied separately to said support, after which the tape is applied and at least one distributor for distributing the tape to the adhesive, and wherein said means for applying said at least one of a physical and chemical treatment is configured to apply treatment either to the support alone or to both the support and the tape.

18. The device of claim 17, wherein said distributor and said means for applying a treatment are located vertically above the continuous strip such that the adhesive and the tape are applied to an upward-facing surface of the continuous strip.

19. The device of claim 17, wherein said distributor and means for applying a treatment are located vertically below the continuous strip such that the adhesive and the tape are applied to an upward-facing surface of the continuous strip.

20. The device of claim 1, wherein said means for delivering the adhesive to the support comprises an orifice, further wherein said means for delivering the tape comprises members for storing and unwinding the tape and a mechanism for applying the tape to the support such that the tape is at least partly on the adhesive, wherein said mechanism is arranged downstream of the orifice and includes at least one detector for detecting the presence of the tape and at least one sensitive element located downstream of the orifice and which is connected to an alarm and adhesive disabling mechanism.

21. The device of claim 20, further comprising an adhesive removing mechanism comprising at least one blade that can move between a waiting position in which it is located away from the support, and an active position in which it is situated beyond the plane of the support on which the adhesive has already been applied.

22. The device of claim 20, further comprising an adhesive removing mechanism comprising at least one cutting element that can move between a waiting position in which the cutting element is located away from the support and a position in which the cutting element passes through the thickness of the support.

23. The device of claim 20, further comprising at least one pump and a suction apparatus configured to remove waste from the continuous strip.

24. The device of claim 20, further comprising a distributor for distributing a material over the adhesive present on the support.

25. The device of claim 24, wherein said distributor comprises at least one reel for storing a reel of tape and a mechanism for delivering the support and applying the tape to the support.

26. The device of claim 24, wherein said distributor for distributing a material comprises a sprayer.

27. The device of claim 26, wherein said distributor comprises a portable canister with valve, said canister configured to contain a pressurized propellant gas.

28. The device of claim 26, wherein the distributor is fixed and comprises:

at least one of a nozzle or with a spraying ramp;

at least one tube connected to said at least one nozzle or spraying ramp; and an electrovalve configured to selective open said at least one nozzle or spraying ramp.

29. The device of claim 1, wherein said deposition station further comprises:

a distributor having one or more distribution orifices;

a distributor for distributing tape having at least one support for a reel of tape, means for unwinding and guiding a free strand of the tape and an applicator mechanism;

means for positively driving the free strand of the tape and a mechanism for controlling the driving speed so that, just before the tape comes alongside adhesive already applied to the support, the linear speed of the free strand of the tape is equal to the linear speed of the relative movement between the support and the deposition station;

a calendar formed of two rotating rollers disposed on either side of the plane in which the support equipped with the tape is to extend; and an adjustable spacing located between said rollers such that the support, the bead of adhesive and the tape are engaged to one another in said spacing so as to calendar the bead of malleable adhesive located between the tape and the support, both having a thickness that is not substantially modified by the calendaring, so that the bead of adhesive is laterally spread that its face located against the tape forms in a single plane extending above the highest raised point of the application surface.

30. The device of claim 29, further comprising an assembly for applying to the support at least one of an immediate-action glue, a solvent and a varnish, said assembly comprising a reservoir and at least one outlet nozzle fluidly connected to said reservoir such that the support can receive the at least one of an immediate-action glue, solvent and varnish stored therein.

31. The device of claim 30, wherein said means for delivering adhesive and tape are offset in the direction of movement of the support such that said adhesive delivering means is upstream of said tape delivering means.

32. The device of claim 29, further comprising a pressure roller situated adjacent where the tape is to come alongside the support adhesive deposited thereon such that said pressure roller exerts a pressure on the support through the tape and the adhesive.

33. The device of claim 32, wherein the pressure roller is kinematically connected to means for setting in rotation.

34. The device of claim 33, wherein the means for setting the pressure roller in rotation comprises an axle-mounted drive roller that is in contact with the moving support so that, by tangential friction, the linear movement of the support can be transmitted to said drive roller, which receives at least one transmission member connected to the pressure roller.

35. The device of claim 34, wherein the pressure roller has a central part of smaller diameter than that of two side parts.

36. The device of claim 35, wherein said side parts are configured to engage the support with direct contact.

37. The device of claim 35, wherein said side parts are configured to engage the tape located between said side parts and the support.

38. The device of claim 35, wherein the side parts have a non-smooth surface.

39. The device of claim 35, wherein the half-difference of the diameters of said central part and said side parts is less than the thickness of the tape so as to exert on the latter a driving traction between the moving support and the rotating central part.

40. The device of claim 35, wherein the half-difference of the diameters of said central part and said side parts is less than the total thickness of the tape and of the bead of adhesive previously deposited on the support, so as to determine by at least one of calendaring or rolling the thickness of said bead of adhesive.

41. The device of claim 32, wherein said pressure roller is mounted to rotate on a mobile rig comprising control means configured such that said pressure roller can be placed in one of two extreme positions including a first remote position in which said pressure roller is away from the support and a second active position in which said pressure roller is in contact with the support.

42. The device of claim 41, wherein said mobile rig is connected to a pneumatic control ram so that the thrust of said ram on said mobile rig is elastic.

43. The device of claim 29, further comprising means for fixing the protective tape to the support so as to secure them independently of the adhesive deposited on the support.

44. The device of claim 43, wherein the fixing means comprises a distributor for distributing immediate-action glue.

45. The device of claim 43, wherein the fixing means comprises a mechanism for cutting and transversely folding the tape, the latter including folding a length of the tape from a free end so that in the folded part, a face of the tape that is relatively less sensitive to the adhesive is folded back on itself and so that the opposite face that is relatively more sensitive to the adhesive has a certain length on the same side of the tape as the face that is relatively less sensitive to the adhesive.

46. The device of claim 1, further comprising:

a receptacle having a passage, one of which is an inlet in which a free strand of the tape coming from a storage reel is to be engaged and the other of which forms an outlet through which the free strand of the tape is to pass;

drive means provided to move and guide the tape from said storage reel to an inlet of said receptacle and from an outlet of said receptacle to said deposition station, said drive means coordinated so as to conduct from said storage reel to said inlet a length of tape that is substantially equal to that which is conducted from said outlet of said receptacle to said deposition station so that there is constantly in said receptacle a substantial length of tape in a substantially slack state but essentially aligned in terms of width by virtue of the two large faces of said receptacle.

47. The device of claim 46, wherein said drive means comprise a pair of rollers at least one of which is kinematically connected to a motor and which is located between said storage reel and said inlet of said receptacle.

48. The device of claim 47, wherein said drive means are further comprises a measuring instrument to determine the length of tape present in said receptacle and which controls the operation of said rollers so that the length driven towards said inlet is essentially equal to the length driven from said outlet.

49. The device of claim 47, wherein said storage reel is mounted to rotate on an axle and is cooperative with a braking mechanism.

50. The device of claim 48, wherein said drive means further comprises a pilot roller against which there bears the part of the tape located between said storage reel and said inlet of said receptacle when the tape is taut, said pilot roller in functional connection with said braking mechanism so that the latter is neutralized when the tape bears against said pilot roller and is made to have a braking action on said storage reel as soon as the tape is not taut and no longer bears against said pilot roller.

51. The device of claim 46, wherein said storage reel is mounted to rotate on an axle and is kinematically connected to a motor.

52. The device of claim 51, wherein said pilot roller is in functional connection with said motor so that motor speed is controlled when the tape bears against said pilot roller and is stopped as soon as the tape is not taut and no longer bears against said pilot roller.

53. The device of claim 49, wherein said braking mechanism of said storage reel releases upon application of said driving and re-release upon stoppage of driving.

54. The device of claim 1, wherein said device is configured to separately apply the adhesive and tape such that said tape supply comprises a reserve comprising a reel, a mechanism located between the reel and the deposition station, said mechanism for cutting the tape into successive segments, a measuring device for measuring the length of the application surface of the support which is to receive the adhesive and at least a segment of the tape, said mechanism for cutting and said measuring device cooperative so as to consequently cut the segment to the desired length before it is entirely placed on the support so that it is separated from the turns of the reel.

55. The device of claim 54, further comprising drive means for moving and guiding the tape from the reel to the cutting mechanism, said cutting mechanism comprising a cutting member that can move between a withdrawn position in which it is away from the course of the tape and an active position in which it is momentarily on this course, said cutting member secured to a mobile element such that the speed of displacement of said cutting mechanism from the active position of cutting one segment to that of the following segment is synchronized with the means for placing in relative movement the deposition station and the support, the distance which exists between the cutting mechanism and the deposition station being smaller than the length of the shortest permissible segment.

56. The device of claim 55, wherein said drive means comprises two pairs of rollers, at least one of each pair being kinematically connected to a motor, one of these two pairs being located between the reserve of tape and the inlet of the cutting mechanism, and the other being located between said outlet of said cutting mechanism and said deposition station.

57. The device of claim 55, further comprising a pressure roller located adjacent the spot where the tape is to come alongside the support and the bead of adhesive deposited thereon, the distance which exists between said pair of rollers located between the outlet of the cutting mechanism and the pressure roller is smaller than the length of the shortest permissible segment.

58. The device of claim 1, wherein said means for delivering the adhesive and said means for delivering the protective tape are configured to sequentially place the adhesive onto the support prior to the protective tape.

59. A device for depositing an adhesive product onto a support, wherein the adhesive product includes a long-acting adhesive and a removable protective tape for delayed use of the adhesive, said device comprising:

a protective tape supply;

an adhesive supply;

a deposition station coupled to said supplies and configured to dispense the protective tape and the adhesive, said deposition station comprising:

means for delivering the adhesive to the support;

means for delivering the protective tape to the support;

at least one substantially flat rigid part forming a reference plane located substantially parallel to and offset a predetermined distance from a plane formed by an application surface of the support upon which in which adhesive and protective tape are delivered;

a member configured to exert a force in a direction substantially transverse to the surface of the support that receives the adhesive and protective tape thereon, said member comprising a moveable support-engaging active part arranged such that said active part keeps said application surface constantly pressed against said reference plane formed on said rigid part; and means for placing the support into relative movement with said deposition station, and a receptacle having a passage, one of which is an inlet in which a free strand of the tape coming from a storage reel is to be engaged and the other of which forms an outlet through which the free strand of the tape is to pass;

drive means provided to move and guide the tape from said storage reel to an inlet of said receptacle and from an outlet of said receptacle to said deposition station, said drive means coordinated so as to conduct from said storage reel to said inlet a length of tape that is substantially equal to that which is conducted from said outlet of said receptacle to said deposition station so that there is constantly in said receptacle a substantial length of tape in a substantially slack state but essentially aligned in terms of width by virtue of the two large faces of said receptacle.

* * * * *